US012711535B2

(12) United States Patent
Sahoo

(10) Patent No.: US 12,711,535 B2
(45) Date of Patent: Aug. 18, 2026

(54) SYSTEMS AND METHODS FOR PERSONALIZING BUNDLES BASED ON PERSONAS

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/789,602

(22) Filed: Jul. 30, 2024

(65) Prior Publication Data

US 2024/0428318 A1 Dec. 26, 2024

Related U.S. Application Data

(63) Continuation-in-part of application No. 18/341,714, filed on Jun. 26, 2023, and a continuation-in-part of application No. 18/349,836, filed on Jul. 10, 2023.

(51) Int. Cl.
*G06Q 30/0601* (2023.01)
*G06Q 30/0201* (2023.01)

(52) U.S. Cl.
CPC ..... *G06Q 30/0631* (2013.01); *G06Q 30/0201* (2013.01); *G06Q 30/0635* (2013.01)

(58) Field of Classification Search
CPC ........... G06Q 30/0631; G06Q 30/0201; G06Q 30/0635
See application file for complete search history.

(56) References Cited

U.S. PATENT DOCUMENTS 5,237,495 A 8/1993 Morii
5,515,269 A 5/1996 Willis
(Continued)

FOREIGN PATENT DOCUMENTS

AU 2019101249 A4 11/2019
CN 101025799 A 8/2007
(Continued)

OTHER PUBLICATIONS

Zhu Sun, "Revisiting bundle recommendation: datasets, tasks, challenges and opportunities for intent aware product bundling", published by Association for Computing Machinery in 2022, all pages (Year: 2022).*
(Continued)

*Primary Examiner* — Omar Zeroual
(74) *Attorney, Agent, or Firm* — Ice Miller LLP

(57) ABSTRACT

Computerized systems and methods are described for executing personalized bundling processes. Methods include receiving user inputs specifying preferences for product bundles and utilizing a Real-Time Data Mesh (RTDM) to retrieve relevant real-time data. An Advanced Analytics and Machine Learning (AAML) Module analyzes these inputs alongside market data to generate personalized bundle recommendations. Recommendations are then displayed to the user via a Single Pane of Glass User Interface (SPoG UI) and, upon user confirmation, transferred as orders to a vendor system. Validation steps use algorithms within the AAML Module to ensure accuracy and relevance of the bundles. Real-time reports on user engagement and bundle success rates are generated. The system, accessible on multiple devices, integrates machine learning models that continually refine the bundling process based on evolving data patterns and user feedback, enhancing personalization and efficiency.

7 Claims, 28 Drawing Sheets

(56) References Cited

U.S. PATENT DOCUMENTS

| | | | |
|---|---|---|---|
| 5,870,717 A | 2/1999 | Wiecha | |
| 5,870,719 A | 2/1999 | Maritzen et al. | |
| 6,093,559 A | 7/2000 | Bookbinder et al. | |
| 6,167,383 A | 12/2000 | Henson | |
| 6,272,472 B1 | 8/2001 | Danneels | |
| 6,385,543 B1 | 5/2002 | Keiser | |
| 7,024,459 B2 | 4/2006 | McNamara et al. | |
| 7,039,604 B1 | 5/2006 | Srinivasan | |
| 7,065,499 B1 | 6/2006 | Seth | |
| 7,085,729 B1 | 8/2006 | Kennedy | |
| 7,130,853 B2 | 10/2006 | Roller et al. | |
| 7,151,438 B1 | 12/2006 | Hall et al. | |
| 7,188,075 B1 | 3/2007 | Smirnov | |
| 7,302,405 B2 | 11/2007 | Hoskin | |
| 7,471,990 B2 | 12/2008 | Hotta | |
| 7,548,612 B2 | 6/2009 | Weissman et al. | |
| 7,584,155 B1 | 9/2009 | Carter, III | |
| 7,698,170 B1 | 4/2010 | Darr | |
| 7,720,720 B1 | 5/2010 | Sharma et al. | |
| 7,912,899 B2 | 3/2011 | Beauchamp | |
| 8,015,021 B2 | 9/2011 | Boyle | |
| 8,024,059 B2 | 9/2011 | Kienzle | |
| 8,024,217 B2 | 9/2011 | Sadre | |
| 8,069,435 B1 | 11/2011 | Lai | |
| 8,091,065 B2 | 1/2012 | Mir et al. | |
| 8,127,278 B2 | 2/2012 | Bohle | |
| 8,237,792 B2 | 8/2012 | Uehara | |
| 8,255,454 B2 | 8/2012 | Broda | |
| 8,301,522 B2 | 10/2012 | Sun | |
| 8,311,863 B1 | 11/2012 | Kemp | |
| 8,386,296 B2 | 2/2013 | Hage | |
| 8,386,299 B2 | 2/2013 | Kumble | |
| 8,443,036 B2 | 5/2013 | Li et al. | |
| 8,452,636 B1 | 5/2013 | Verastigui | |
| 8,589,444 B2 | 11/2013 | Alcorn et al. | |
| 8,738,421 B1 | 5/2014 | Ali | |
| 8,781,882 B1 | 7/2014 | Arboletti et al. | |
| D718,324 S | 11/2014 | Lee et al. | |
| 8,914,544 B2 | 12/2014 | Lalji et al. | |
| 9,063,943 B1 | 6/2015 | Smith | |
| 9,317,807 B1 | 4/2016 | Staddon et al. | |
| 9,390,089 B2 | 7/2016 | Pitzo et al. | |
| 9,390,428 B2 | 7/2016 | Rehman et al. | |
| 9,652,530 B1 | 5/2017 | Bendersky et al. | |
| 9,727,906 B1 * | 8/2017 | Sarmento | G06Q 30/0631 |
| 9,727,909 B2 | 8/2017 | MacKay | |
| 9,781,212 B2 | 10/2017 | Briere et al. | |
| 9,792,597 B1 | 10/2017 | Jen et al. | |
| 9,805,412 B1 | 10/2017 | Joseph | |
| 9,958,291 B1 | 5/2018 | Shunturov et al. | |
| 9,959,551 B1 | 5/2018 | Schermerhorn et al. | |
| 9,965,526 B1 * | 5/2018 | Chanda | G06Q 30/0269 |
| 10,108,974 B1 | 10/2018 | Shariff et al. | |
| 10,114,964 B2 | 10/2018 | Ramesh et al. | |
| 10,134,003 B1 | 11/2018 | Loyens | |
| 10,146,751 B1 | 12/2018 | Zhang | |
| 10,277,672 B2 | 4/2019 | Kung | |
| D851,110 S | 6/2019 | Bang et al. | |
| 10,373,105 B2 | 8/2019 | Feng et al. | |
| 10,410,125 B1 | 9/2019 | Finkelstein et al. | |
| 10,417,728 B1 | 9/2019 | Yoggi et al. | |
| 10,489,845 B2 * | 11/2019 | Mullakkara Azhuvath | G06Q 30/0631 |
| 10,592,852 B1 | 3/2020 | Karipides | |
| D880,498 S | 4/2020 | Shahidi et al. | |
| 10,616,347 B1 | 4/2020 | Van Oort et al. | |
| 10,650,449 B2 | 5/2020 | Courbage et al. | |
| 10,664,799 B2 | 5/2020 | O'Brien et al. | |
| 10,693,824 B2 | 6/2020 | Silva | |
| 10,699,329 B2 | 6/2020 | Zakula | |
| 10,718,632 B1 | 7/2020 | Platt et al. | |
| 10,757,154 B1 | 8/2020 | Jacobs et al. | |
| D898,759 S | 10/2020 | Carrigan et al. | |
| 10,839,029 B2 | 11/2020 | Lawrence | |
| 10,861,077 B1 | 12/2020 | Liu | |
| 10,891,105 B1 | 1/2021 | Gates et al. | |
| 10,893,036 B2 | 1/2021 | Chang et al. | |
| D912,694 S | 3/2021 | Clarke et al. | |
| D920,351 S | 5/2021 | Zhang | |
| 11,036,713 B2 | 6/2021 | Inturi | |
| 11,062,319 B1 | 7/2021 | Hecht et al. | |
| 11,074,643 B1 | 7/2021 | Ellithorpe et al. | |
| 11,080,239 B2 | 8/2021 | Demoor | |
| 11,113,770 B1 | 9/2021 | Magoon et al. | |
| 11,120,038 B1 | 9/2021 | Ossher et al. | |
| 11,151,608 B1 | 10/2021 | Guo | |
| D937,299 S | 11/2021 | Varga et al. | |
| 11,163,846 B1 | 11/2021 | Kadayam et al. | |
| 11,171,950 B1 | 11/2021 | Zhuravlev et al. | |
| 11,176,693 B1 * | 11/2021 | Gonzalez-Nicolas | G06V 10/82 |
| D937,851 S | 12/2021 | Patel et al. | |
| 11,205,147 B1 | 12/2021 | Anderson | |
| 11,222,003 B1 | 1/2022 | Jones et al. | |
| 11,282,145 B2 | 3/2022 | Ehrhart | |
| 11,334,554 B2 | 5/2022 | Andreakis | |
| 11,343,142 B1 | 5/2022 | Wang et al. | |
| 11,379,219 B2 | 7/2022 | Bhalla et al. | |
| 11,386,456 B1 | 7/2022 | Lightbody | |
| 11,487,797 B2 | 11/2022 | Shukla | |
| 11,556,864 B2 | 1/2023 | Yuan | |
| 11,620,310 B1 | 4/2023 | Akidau | |
| 11,714,537 B2 | 8/2023 | Lin et al. | |
| 11,714,698 B1 | 8/2023 | Curtis | |
| 11,729,058 B1 | 8/2023 | Agarwal et al. | |
| 11,770,304 B1 | 9/2023 | McNally | |
| 11,798,058 B2 * | 10/2023 | Silverstein | G06Q 30/0641 |
| 11,811,928 B2 | 11/2023 | Shaaban et al. | |
| 11,816,721 B2 * | 11/2023 | Ksyta | G06Q 30/0631 |
| D1,009,077 S | 12/2023 | Matlin et al. | |
| D1,011,377 S | 1/2024 | Ye | |
| 11,860,613 B2 * | 1/2024 | Maury | G06F 16/906 |
| 11,886,965 B1 | 1/2024 | Schwartz | |
| D1,013,709 S | 2/2024 | Callanta et al. | |
| 11,892,817 B2 | 2/2024 | Jacobs, II | |
| 11,899,678 B2 | 2/2024 | Kadel | |
| 11,906,415 B1 | 2/2024 | Galburt et al. | |
| 11,977,964 B1 | 5/2024 | Winstead | |
| 11,983,806 B1 | 5/2024 | Ramesh et al. | |
| 12,014,375 B2 | 6/2024 | Brakob et al. | |
| 12,077,313 B1 | 9/2024 | Whaley et al. | |
| D1,044,841 S | 10/2024 | Shriniwar | |
| 12,106,621 B2 | 10/2024 | Boerger | |
| 12,107,934 B1 | 10/2024 | Bailey et al. | |
| 12,142,091 B2 | 11/2024 | Fang et al. | |
| 12,204,323 B1 | 1/2025 | Malviya et al. | |
| D1,061,571 S | 2/2025 | Arora | |
| 12,242,491 B2 | 3/2025 | Li | |
| 12,248,962 B2 * | 3/2025 | Qu | G06N 5/01 |
| 12,271,491 B2 | 4/2025 | Cameron et al. | |
| D1,078,763 S | 6/2025 | Arora | |
| D1,080,661 S | 6/2025 | Shope | |
| 12,333,412 B1 | 6/2025 | Mazed | |
| 12,346,702 B1 | 7/2025 | Burbine et al. | |
| D1,091,608 S | 9/2025 | Li et al. | |
| D1,101,762 S | 11/2025 | Gordonov et al. | |
| D1,102,464 S | 11/2025 | Varga et al. | |
| 12,474,936 B2 | 11/2025 | Dostie, Jr. et al. | |
| D1,110,338 S | 1/2026 | Goodrich et al. | |
| 12,537,998 B1 | 1/2026 | Perelli-Minetti et al. | |
| 2001/0042036 A1 | 11/2001 | Sanders | |
| 2002/0015480 A1 | 2/2002 | Daswani et al. | |
| 2002/0023046 A1 | 2/2002 | Callahan | |
| 2002/0042755 A1 | 4/2002 | Kumar | |
| 2002/0059201 A1 | 5/2002 | Work | |
| 2002/0062262 A1 | 5/2002 | Vasconi | |
| 2002/0087438 A1 | 7/2002 | Kunieda et al. | |
| 2002/0091991 A1 | 7/2002 | Castro | |
| 2002/0120521 A1 | 8/2002 | Forth et al. | |
| 2002/0138358 A1 | 9/2002 | Scheer | |
| 2002/0165747 A1 | 11/2002 | Shriver | |
| 2002/0188514 A1 | 12/2002 | Kritt | |
| 2002/0198743 A1 | 12/2002 | Ariathurai et al. | |
| 2003/0009397 A1 | 1/2003 | Whitenack et al. | |

(56) References Cited

U.S. PATENT DOCUMENTS

2003/0018546 A1 1/2003 Ayala et al.
2003/0028451 A1 2/2003 Ananian
2003/0050819 A1 3/2003 Koenigbauer et al.
2003/0055700 A1* 3/2003 Hoffman .......... G06Q 10/06393 705/28
2003/0070061 A1 4/2003 Wong et al.
2003/0074248 A1 4/2003 Braud et al.
2003/0078846 A1 4/2003 Burk et al.
2003/0084053 A1 5/2003 Govrin et al.
2003/0130863 A1 7/2003 Grey et al.
2003/0144858 A1* 7/2003 Jain .................... G06Q 10/0875 705/29
2003/0149608 A1 8/2003 Kall
2003/0163513 A1 8/2003 Schaeck et al.
2003/0171962 A1 9/2003 Hirth et al.
2003/0173403 A1 9/2003 Vogler
2003/0216950 A1 11/2003 Chen
2003/0229550 A1 12/2003 DiPrima
2003/0233264 A1 12/2003 Jones et al.
2004/0006516 A1 1/2004 Anagol-Subbarao
2004/0019494 A1* 1/2004 Ridgeway .......... G06Q 30/0601 705/26.1
2004/0044565 A1 3/2004 Kumar et al.
2004/0044582 A1 3/2004 Chowdhary
2004/0054800 A1 3/2004 Shah et al.
2004/0102981 A1 5/2004 Schuh
2004/0111304 A1 6/2004 Meka
2004/0111327 A1 6/2004 Kidd
2004/0267674 A1 12/2004 Feng et al.
2005/0049938 A1 3/2005 Venkiteswaran
2005/0138642 A1 6/2005 Breh et al.
2005/0144082 A1 6/2005 Coolman
2005/0163951 A1 7/2005 Oles et al.
2005/0262196 A1 11/2005 Mueller
2005/0283410 A1 12/2005 Gosko
2006/0100889 A1 5/2006 Gosko
2006/0178918 A1 8/2006 Mikurak
2006/0277086 A1 12/2006 Ball
2006/0287932 A1 12/2006 Wulteputte
2007/0033569 A1 2/2007 Davidson et al.
2007/0050229 A1 3/2007 Tatro et al.
2007/0192216 A1 8/2007 Arnold et al.
2007/0203798 A1 8/2007 Caballero et al.
2007/0233574 A1 10/2007 Koegler
2007/0250545 A1 10/2007 Surlaker et al.
2008/0052205 A1* 2/2008 Dolley ................... G06Q 10/06 705/28
2008/0082426 A1 4/2008 Gokturk et al.
2008/0133569 A1 6/2008 Vu et al.
2008/0228657 A1 9/2008 Nabors
2008/0270256 A1 10/2008 Caballero
2008/0319849 A1 12/2008 Rapoport
2009/0063305 A1 3/2009 Kreifels
2009/0063309 A1 3/2009 Stephens
2009/0112727 A1 4/2009 Chi
2009/0150663 A1 6/2009 Perry
2009/0171816 A1 7/2009 Del Rosario
2009/0177714 A1 7/2009 Obermeyer et al.
2010/0005085 A1 1/2010 Millmore
2010/0145831 A1 6/2010 Esfandiari et al.
2010/0161364 A1 6/2010 Lokowandt
2010/0211550 A1 8/2010 Daniello
2010/0250598 A1 9/2010 Brauer et al.
2011/0029345 A1 2/2011 Kienzle
2011/0156651 A1 6/2011 Christensen
2011/0238484 A1 9/2011 Toumayan
2011/0313882 A1 12/2011 Barthes
2012/0036089 A1 2/2012 Washington et al.
2012/0054642 A1 3/2012 Balsiger et al.
2012/0071999 A1 3/2012 Trammell
2012/0084215 A1 4/2012 Trier
2012/0209824 A1 8/2012 Morimoto
2012/0226573 A1* 9/2012 Zakas ................ G06Q 30/0601 705/26.7
2012/0226612 A1 9/2012 Kurtis
2012/0232952 A1 9/2012 Leonard
2012/0259675 A1 10/2012 Roehrs
2012/0316935 A1 12/2012 Feuerstin
2012/0323933 A1 12/2012 He et al.
2012/0330918 A1 12/2012 Carey et al.
2012/0330973 A1 12/2012 Ghuneim et al.
2013/0013346 A1 1/2013 O'Connor
2013/0018651 A1 1/2013 Djordjevic et al.
2013/0041781 A1 2/2013 Freydberg
2013/0066745 A1 3/2013 De Heer et al.
2013/0091033 A1 4/2013 Goodman
2013/0110860 A1 5/2013 Taranov et al.
2013/0117080 A1 5/2013 Madsen et al.
2013/0159145 A1* 6/2013 Stevens .................. G06Q 30/08 705/26.81
2013/0166403 A1 6/2013 Jin et al.
2013/0191185 A1 7/2013 Galvin
2013/0191481 A1 7/2013 Prevost
2013/0246215 A1 9/2013 Faith et al.
2013/0290234 A1 10/2013 Harris et al.
2013/0311271 A1 11/2013 Agrawal
2014/0025529 A1 1/2014 Honeycutt et al.
2014/0052491 A1 2/2014 Narayanan
2014/0052840 A1 2/2014 Shukla
2014/0059144 A1 2/2014 Lehmann
2014/0095265 A1 4/2014 Steinman
2014/0095343 A1 4/2014 Daniel
2014/0095488 A1 4/2014 Malone et al.
2014/0122377 A1 5/2014 Goodman
2014/0156329 A1 6/2014 Hwang et al.
2014/0200965 A1 7/2014 McConnell
2014/0222453 A1 8/2014 Wills
2014/0222641 A1 8/2014 Kober
2014/0278804 A1 9/2014 Lanxner
2014/0279254 A1 9/2014 Hastman
2014/0322678 A1 10/2014 Briancon et al.
2014/0324530 A1 10/2014 Thompson
2014/0324549 A1 10/2014 Chelap et al.
2014/0358723 A1 12/2014 Ballaro et al.
2014/0379422 A1 12/2014 Chapman et al.
2015/0032526 A1 1/2015 Calman et al.
2015/0066570 A1 3/2015 Hellen et al.
2015/0189014 A1 7/2015 Grunenberger
2015/0203673 A1 7/2015 Alric et al.
2015/0281148 A1 10/2015 Masterson
2015/0286645 A1 10/2015 Sinha
2015/0295766 A1 10/2015 Dickey
2015/0302303 A1 10/2015 Hakim
2016/0092474 A1 3/2016 Stojanovic et al.
2016/0203319 A1 7/2016 Coen
2016/0232624 A1 8/2016 Goldberg et al.
2016/0239855 A1 8/2016 Feng et al.
2016/0267102 A1 9/2016 Klein
2016/0300144 A1 10/2016 Santhanam
2016/0321344 A1 11/2016 Aragone
2016/0335345 A1 11/2016 Wang
2017/0006135 A1 1/2017 Siebel
2017/0017677 A1 1/2017 Jolfaei
2017/0017969 A1 1/2017 Noursalehi et al.
2017/0053558 A1 2/2017 Zhou
2017/0060641 A1 3/2017 Ramaswamy
2017/0063750 A1 3/2017 Vardhan et al.
2017/0091327 A1 3/2017 Bostic
2017/0109675 A1 4/2017 Hosny
2017/0134516 A1 5/2017 Gutman et al.
2017/0147941 A1 5/2017 Bauer et al.
2017/0193412 A1 7/2017 Easton
2017/0193433 A1 7/2017 Qin et al.
2017/0193527 A1* 7/2017 Backer ............... G06Q 30/0201
2017/0243465 A1 8/2017 Bourne, Jr. et al.
2017/0255903 A1 9/2017 Chowdhry et al.
2017/0255987 A1 9/2017 Bacharach
2017/0278173 A1* 9/2017 Ettl .................... G06Q 30/0631
2017/0286909 A1 10/2017 Baynes
2017/0287038 A1 10/2017 Krasadakis
2017/0364046 A1 12/2017 Westrick, Jr. et al.
2017/0364534 A1 12/2017 Zhang
2017/0364796 A1 12/2017 Wiebe et al.

(56) References Cited

U.S. PATENT DOCUMENTS

2018/0005296 A1 1/2018 Eades
2018/0024986 A1 1/2018 Singh et al.
2018/0136992 A1 5/2018 Solinger
2018/0143975 A1 5/2018 Casal
2018/0165604 A1 6/2018 Minkin
2018/0210937 A1 7/2018 Shi
2018/0218322 A1 8/2018 Bhargava et al.
2018/0240158 A1 8/2018 Peng
2018/0285790 A1 10/2018 Huynh
2018/0288363 A1 10/2018 Amengual Galdon
2018/0293640 A1 10/2018 Krappe
2018/0308151 A1* 10/2018 Ainsworth, III ... G06Q 30/0631
2018/0314925 A1 11/2018 Gauci et al.
2018/0315141 A1 11/2018 Hunn
2018/0332102 A1 11/2018 Sheidaei
2018/0336514 A1 11/2018 Ranjanghatmuralidhar et al.
2018/0337798 A1 11/2018 Ilic
2018/0343491 A1 11/2018 Loheide et al.
2018/0349793 A1 12/2018 Triolo et al.
2019/0034838 A1* 1/2019 Canis ................ G06F 16/24578
2019/0050688 A1 2/2019 Iyer
2019/0095992 A1 3/2019 Soh
2019/0102162 A1 4/2019 Pitre
2019/0102418 A1 4/2019 Vasudevan
2019/0102753 A1 4/2019 Harrison et al.
2019/0114689 A1 4/2019 Wang
2019/0147400 A1 5/2019 Knight
2019/0149725 A1 5/2019 Adato et al.
2019/0163985 A1* 5/2019 Wang ..................... G06Q 30/00
2019/0192074 A1 6/2019 Smets
2019/0215424 A1 7/2019 Adato et al.
2019/0220914 A1 7/2019 Flannery et al.
2019/0243836 A1 8/2019 Nanda et al.
2019/0251457 A1 8/2019 Byrnes et al.
2019/0286620 A1 9/2019 Al-Haimi et al.
2019/0286759 A1 9/2019 Wilkins
2019/0303487 A1 10/2019 Mehta et al.
2019/0303579 A1 10/2019 Reddy et al.
2019/0377807 A1 12/2019 Dean et al.
2020/0026552 A1 1/2020 Zhang et al.
2020/0045519 A1 2/2020 Raleigh et al.
2020/0073642 A1 3/2020 Koryakin
2020/0117757 A1 4/2020 Yanamandra et al.
2020/0126013 A1 4/2020 Hochheiser et al.
2020/0134683 A1 4/2020 Boren
2020/0143313 A1 5/2020 Ohlsson et al.
2020/0184416 A1 6/2020 Javaheri
2020/0210947 A1* 7/2020 Devarakonda ... G06Q 10/06312
2020/0219159 A1 7/2020 Choudhary
2020/0235941 A1 7/2020 Nguyen et al.
2020/0265512 A1* 8/2020 James .................... G06Q 40/03
2020/0272981 A1 8/2020 Kirkegaard
2020/0279200 A1* 9/2020 Makhija ................. G06N 3/049
2020/0320095 A1 10/2020 Haase et al.
2020/0327252 A1 10/2020 McFall et al.
2020/0334608 A1 10/2020 Ramanathan
2020/0349624 A1 11/2020 Ramanathan
2020/0394398 A1 12/2020 Pamarthi et al.
2020/0394455 A1 12/2020 Lee
2021/0012329 A1 1/2021 Gandhi
2021/0012358 A1* 1/2021 Wical ..................... G06Q 30/02
2021/0036889 A1 2/2021 Jain et al.
2021/0065134 A1 3/2021 Chhabra et al.
2021/0065294 A1 3/2021 Trevathan
2021/0117384 A1 4/2021 Leite Pinheiro De Paiva
2021/0125144 A1 4/2021 Liu
2021/0133788 A1 5/2021 Jacobs
2021/0133850 A1 5/2021 Ayush
2021/0142385 A1* 5/2021 Alahmady ......... G06Q 30/0631
2021/0144250 A1* 5/2021 Mahar ..................... H04L 51/02
2021/0158259 A1* 5/2021 Evans .................... G06Q 10/04
2021/0166179 A1* 6/2021 Pande ................ G06Q 30/0643
2021/0166251 A1 6/2021 Mehmanpazir et al.
2021/0182730 A1 6/2021 Clarke
2021/0182746 A1 6/2021 Muthukrishnan
2021/0201346 A1 7/2021 Dejardins
2021/0226573 A1 7/2021 George
2021/0233129 A1 7/2021 Bikumala
2021/0241299 A1 8/2021 Ramini et al.
2021/0241301 A1 8/2021 Christensen et al.
2021/0241337 A1 8/2021 Bikumala
2021/0248151 A1 8/2021 Kadel
2021/0269244 A1 9/2021 Ahmann
2021/0287275 A1* 9/2021 Karlan-Mason ... G06Q 30/0282
2021/0303420 A1 9/2021 Willoughby
2021/0334871 A1 10/2021 Quinn et al.
2021/0350429 A1 11/2021 Gangadarappa
2021/0350432 A1 11/2021 Kushner
2021/0357959 A1 11/2021 Cella et al.
2021/0377203 A1 12/2021 Hou et al.
2021/0378779 A1 12/2021 Lenzenhuber
2021/0383316 A1* 12/2021 Mimassi ........ G06Q 10/063118
2021/0397989 A1 12/2021 Mayers
2022/0019204 A1 1/2022 Maury et al.
2022/0051183 A1 2/2022 Franzo
2022/0058723 A1 2/2022 Swett
2022/0067085 A1 3/2022 Nihas
2022/0114509 A1 4/2022 Pinheiro et al.
2022/0116470 A1 4/2022 Sethi
2022/0122134 A1 4/2022 Hoffman et al.
2022/0122142 A1* 4/2022 Cao .................... G06Q 30/0283
2022/0129477 A1 4/2022 Son
2022/0129803 A1* 4/2022 Bikumala ............. G06F 16/906
2022/0156275 A1 5/2022 Burke et al.
2022/0197246 A1 6/2022 Cella et al.
2022/0198431 A1* 6/2022 Foster, Jr. ............ G06Q 20/322
2022/0210141 A1 6/2022 Parekh et al.
2022/0245008 A1 8/2022 Deljavan Farshi et al.
2022/0245115 A1 8/2022 Kulkarni et al.
2022/0245727 A1 8/2022 Roll
2022/0253775 A1 8/2022 Burkhead
2022/0270160 A1* 8/2022 Sadhankar ........... G07G 1/0036
2022/0284459 A1 9/2022 Kwok
2022/0292160 A1 9/2022 Mehta
2022/0309436 A1* 9/2022 Evans .............. G06Q 10/06375
2022/0319504 A1 10/2022 Owhadi
2022/0327119 A1* 10/2022 Gasper ................ G06F 16/9024
2022/0327597 A1* 10/2022 Griesmer ........... G06Q 30/0631
2022/0329595 A1 10/2022 Wynter et al.
2022/0357971 A1 11/2022 Feliciano
2022/0373346 A1* 11/2022 Abhishek ........... G01C 21/3453
2022/0374737 A1 11/2022 Dhara
2022/0383400 A1* 12/2022 Wade ...................... G06F 30/10
2022/0405775 A1 12/2022 Siebel et al.
2023/0005330 A1 1/2023 Hartwig
2023/0012041 A1 1/2023 Holloran
2023/0012650 A1 1/2023 Aggarwal
2023/0030234 A1 2/2023 Fichuk et al.
2023/0030262 A1 2/2023 Springer
2023/0032447 A1 2/2023 Mackie
2023/0051934 A1 2/2023 Devan et al.
2023/0055677 A1 2/2023 Dhelaria
2023/0058148 A1 2/2023 Chen et al.
2023/0059565 A1 2/2023 Ravindran
2023/0064747 A1 3/2023 Inoue Sardenberg
2023/0067777 A1* 3/2023 Hadar ..................... G06F 9/455
2023/0074782 A1 3/2023 Tendulkar et al.
2023/0075794 A1 3/2023 Muttreja
2023/0091441 A1 3/2023 Go
2023/0094635 A1 3/2023 Meng et al.
2023/0099557 A1 3/2023 Thapliyal et al.
2023/0102048 A1 3/2023 Cella
2023/0113006 A1 4/2023 Liu et al.
2023/0125533 A1 4/2023 Estes
2023/0162258 A1 5/2023 Das Gupta
2023/0185878 A1 6/2023 Makhija et al.
2023/0206251 A1 6/2023 Acharya et al.
2023/0206265 A1 6/2023 Girija
2023/0214773 A1 7/2023 Ha
2023/0214854 A1 7/2023 Colombier et al.
2023/0214864 A1 7/2023 Colombier et al.
2023/0222536 A1 7/2023 Hoang et al.
2023/0259521 A1 8/2023 Alfons
2023/0273915 A1 8/2023 Dev

(56) References Cited

U.S. PATENT DOCUMENTS

| | | | | |
|---|---|---|---|---|
| 2023/0275973 | A1 | 8/2023 | Sakamoto et al. | |
| 2023/0316377 | A1 | 10/2023 | Bacharach | |
| 2023/0325900 | A1* | 10/2023 | Edwards | G06Q 30/0631 705/26.7 |
| 2023/0342344 | A1 | 10/2023 | Brown et al. | |
| 2023/0350963 | A1 | 11/2023 | Saad | |
| 2023/0359161 | A1 | 11/2023 | O'Rourke | |
| 2023/0367696 | A1 | 11/2023 | Liu et al. | |
| 2023/0385288 | A1 | 11/2023 | Kulkarni et al. | |
| 2023/0394426 | A1 | 12/2023 | Bauders | |
| 2023/0410095 | A1 | 12/2023 | Cella | |
| 2023/0418980 | A1 | 12/2023 | Abrougui | |
| 2023/0419387 | A1 | 12/2023 | Ballaro | |
| 2024/0004860 | A1 | 1/2024 | Soundararajan et al. | |
| 2024/0022492 | A1 | 1/2024 | Nanda | |
| 2024/0037115 | A1 | 2/2024 | Simanjuntak et al. | |
| 2024/0062099 | A1 | 2/2024 | Crockett | |
| 2024/0070750 | A1* | 2/2024 | Smith, Jr. | G06Q 30/0635 |
| 2024/0095788 | A1 | 3/2024 | Vaishnav | |
| 2024/0095789 | A1 | 3/2024 | Vaishnav | |
| 2024/0106828 | A1 | 3/2024 | Jain et al. | |
| 2024/0107122 | A1 | 3/2024 | Akhoury | |
| 2024/0118702 | A1 | 4/2024 | Cella | |
| 2024/0144170 | A1 | 5/2024 | Kim et al. | |
| 2024/0169410 | A1* | 5/2024 | Zhao | G06Q 30/0631 |
| 2024/0184650 | A1 | 6/2024 | O'Kelley | |
| 2024/0211828 | A1 | 6/2024 | Iwamoto | |
| 2024/0232941 | A1* | 7/2024 | Vajge | G06Q 30/0252 |
| 2024/0248919 | A1 | 7/2024 | Kumar | |
| 2024/0266010 | A1 | 8/2024 | Adhikari | |
| 2024/0281419 | A1 | 8/2024 | Alfaras | |
| 2024/0281423 | A1 | 8/2024 | Perrin | |
| 2024/0311853 | A1* | 9/2024 | Rendahl | G06Q 10/087 |
| 2024/0330983 | A1 | 10/2024 | Isaacs | |
| 2024/0354423 | A1 | 10/2024 | Mardikar | |
| 2024/0354686 | A1 | 10/2024 | Hegde | |
| 2024/0354867 | A1 | 10/2024 | Young | |
| 2024/0362576 | A1 | 10/2024 | Rajagopal | |
| 2024/0370902 | A1 | 11/2024 | Miglani | |
| 2024/0372856 | A1 | 11/2024 | Black et al. | |
| 2024/0419678 | A1 | 12/2024 | Sharma | |
| 2024/0420012 | A1 | 12/2024 | Austin | |
| 2024/0427789 | A1 | 12/2024 | Sahoo | |
| 2024/0428166 | A1 | 12/2024 | Sahoo | |
| 2024/0428318 | A1* | 12/2024 | Sahoo | G06Q 30/0201 |
| 2025/0005479 | A1 | 1/2025 | Sahoo | |
| 2025/0036648 | A1 | 1/2025 | Hunter | |
| 2025/0047663 | A1 | 2/2025 | Brennan et al. | |
| 2025/0062949 | A1 | 2/2025 | Nimmagadda | |
| 2025/0077601 | A1 | 3/2025 | Liu | |
| 2025/0139656 | A1* | 5/2025 | Durvasula | G06N 20/00 |
| 2025/0217114 | A1 | 7/2025 | Roper, Jr. et al. | |
| 2025/0259032 | A1 | 8/2025 | Crabtree et al. | |
| 2025/0301489 | A1 | 9/2025 | Gabizon et al. | |
| 2025/0328341 | A1 | 10/2025 | Gutierrez | |
| 2025/0355656 | A1 | 11/2025 | Khalil et al. | |

FOREIGN PATENT DOCUMENTS

| | | | | |
|---|---|---|---|---|
| CN | 108122157 | A | 6/2018 | |
| CN | 110570245 | A | 12/2019 | |
| CN | 118297564 | A | 7/2024 | |
| CN | 118536118 | A | 8/2024 | |
| CN | 118734829 | A | 10/2024 | |
| JP | 2001005863 | A | 1/2001 | |
| JP | 2002108668 | A | 4/2002 | |
| JP | 2004538542 | A | 12/2004 | |
| JP | 2019101725 | A | 6/2019 | |
| JP | 2020514860 | A | 5/2020 | |
| JP | 2020514860 | A5 | 2/2021 | |
| JP | 2021532444 | A | 11/2021 | |
| JP | 2022175317 | A | 11/2022 | |
| JP | 2023508188 | A | 3/2023 | |
| KR | 20070057806 | A | 6/2007 | |
| WO | 9425161 | A1 | 11/1994 | |
| WO | 0233581 | A2 | 4/2002 | |
| WO | 02063530 | A2 | 8/2002 | |
| WO | 2004104739 | A2 | 12/2004 | |
| WO | 2006026673 | A2 | 3/2006 | |
| WO | 2010107730 | A1 | 9/2010 | |
| WO | 2010151368 | A2 | 12/2010 | |
| WO | 2012019097 | A2 | 2/2012 | |
| WO | 2013181736 | A1 | 12/2013 | |
| WO | 2014060050 | A1 | 4/2014 | |
| WO | 2016013972 | A1 | 1/2016 | |
| WO | 2016118979 | A2 | 7/2016 | |
| WO | 2018116252 | A1 | 6/2018 | |
| WO | WO-2018231850 | A1* | 12/2018 | H04W 4/38 |
| WO | 2019157399 | A1 | 8/2019 | |
| WO | WO-2021171250 | A1* | 9/2021 | H04L 51/02 |
| WO | WO-2021262530 | A1* | 12/2021 | G06Q 30/0627 |
| WO | 2022008567 | A1 | 1/2022 | |
| WO | 2022132040 | A1 | 6/2022 | |
| WO | 2023026313 | A1 | 3/2023 | |
| WO | WO-2023174562 | A1* | 9/2023 | G06T 17/00 |
| WO | 2024073505 | A1 | 4/2024 | |
| WO | 2024226421 | A1 | 10/2024 | |
| WO | 2024233674 | A2 | 11/2024 | |
| WO | 2025038523 | A1 | 2/2025 | |

OTHER PUBLICATIONS

Saloni Agarwal, "Improving bundles recommendation coverage in sparse product graphs", published by WWW 22 companion in 2022, all pages (Year: 2022).*

Yurii Kohut, "Recommendation system for purchasing goods based on the decision tree algorithm", published by Advances in cyber-physical systems in 2021, all pages (Year: 2021).*

Zhamak Dehghani, "How to move beyond a monolithic data lake to a distributed data mesh", published by martinfowler.com on May 20, 2019 (Year: 2019).*

Zhu Sun, "Revisiting bundle recommendation: datasets, tasks, challenges and opportunities for intent aware product bundling", published by Association for Computing Machinery in 2022 (Year: 2022).*

Saloni Agarwal, "Improving bundles recommendation coverage in sparse product graphs", published by WWW 22 companion in 2022 (Year: 2022).*

Carlos Costa, "Data Mesh: Concepts and Principles of a Paradigm Shift in Data Architectures", published by Science Direct in 2022 (Year: 2022).*

Said Sryheni, "introduction to depth first search algorithm", published by baeldung.com Mar. 24, 2023 (Year: 2023).*

Okan Tunali, "targeted personalized product bundle generation", published by IEEE in 2021 (Year: 2021).*

Yurii, Kohut, "Recommendation System for Purchasing Goods Based On the Decision Tree Algorithm", published by Advances in cyber-physical systems in 2021 (Year: 2021).*

Basumallic, "What is a Software Engine? Types, Applications, and Importance." Oct. 7, 2022. URL Link: <https://www.spiceworks.com/tech/devops/articles/what-is-software-engine/>.

Holzer et al., "Developing a Framework for Linking Design Intelligence from Multiple Professions in the AEC Industry," 2007. URL Link: <https://link.springer.com/content/pdf/10.1007/978-1-4020-6528-6_23.pdf>.

PCMag. "engine" definition. Dec. 1, 2020 snapshot via Archive.org URL Link: <https://www.pcemag.com/encyclopedia/term/engine>.

Techopedia. "Engine" definition. Oct. 19, 2012. URL Link: <https://www.techopedia.com/definition/24155/engine>.

Biswas S., et al., "A Proposed Architecture for Big Data Driven Supply Chain Analytics," ICFAI University Press (IUP) Journal of Supply Chain Management, 2016, vol. 13, No. 3, pp. 7-34 (24 Pages), Retrieved from URL: https://arxiv.org/abs/1705.04958.

European Search Report for European Application No. 24186933, dated Nov. 25, 2024, 09 Pages.

Extended European Search Report for European Application No. 24184819.1, dated Nov. 27, 2024, 10 Pages.

(56) References Cited

OTHER PUBLICATIONS

Extended European Search Report for European Application No. 24187943.6, dated Nov. 19, 2024, 8 Pages.
Extended European Search Report for European Application No. 24187967.5, dated Nov. 25, 2024, 7 Pages.
International Search Report and Written Opinion for International Application No. PCT/US2024/037624, dated Oct. 28, 2024, 9 Pages.
Machado I.A., et al., "Data Mesh: Concepts and Principles of a Paradigm Shift in Data Architectures," Procedia Computer Science, Amsterdam, NL, Jan. 10, 2022, vol. 196, pp. 263-271, DOI: 10.1016/j.procs.2021.12.013, ISSN: 1877-0509, XP093050267, Retrieved from URL: https://www.sciencedirect.com/science/article/pii/S1877050921022365.
Office Action for Japanese Application No. 2024-101794, dated Sep. 13, 2024, 21 Pages.
Office Action for Japanese Application No. 2024-108629, dated Oct. 29, 2024, 10 Pages.
Suzumura K., "Latest IT Trends by Field: Inter-System Integration: The Key Lies in the Use of Open Technology, Performance and Reliability," Nikkei Computer, Japan, Nikkei BP, Sep. 23, 2002, No. 557, pp. 28-29 (6 Pages), ISSN 0285-4619.
Wikipedia: "Data Mesh," May 25, 2023, 3 Pages, XP093199672, Retrieved from URL: https://en.Wikipedia.org/w/index.php?title=Data_mes&holdid=1157039904.
Office Action for Japanese Application No. 2024-112073, dated Oct. 15, 2024, 9 Pages.
Carlos, Rafael et al., "Framework for Continuous Agile Technology Roadmap Updating," Emeraldinsight.com, 2017, all pages.
Decision of Refusal issued in Japanese Patent Application No. 2024-108629, dated Apr. 11, 2025, 5 pgs.
English Translation of Decision of Refusal issued in Japanese Patent Application No. 2024-108629, dated Apr. 11, 2025, 7 pgs.
Office Action issued in Japanese Patent Application No. 2024-101794, dated May 16, 2025, 6 pgs.
English Translation of Office Action issued in Japanese Patent Application No. 2024-101794, dated May 16, 2025, 5 pgs.
European Search Report issued in European Patent Application No. 25163362.4 , dated May 2, 2025, 10 pgs.
European Search Report issued in European Patent Application No. EP25156175.9, dated Mar. 13, 2025.
Examination Report issued in Australian Patent Application No. 2024204660, dated Apr. 16, 2025, 4 pgs.
Examination Report issued in Australian Patent Application No. 20244204340, dated Feb. 28, 2025, 5 pgs.
Examination Report issued in Australian Patent Application No. 2025200528, dated Mar. 6, 2025, 5 pgs.
Examination Report issued in Australian Patent Application No. 2025200535, dated Apr. 7, 2025, 7 pgs.
Examination Report issued in Australian Patent Application No. 2025200793, dated Apr. 1, 2025, 9 pgs.
Examination Report issued in Australian Patent Application No. 2025201639, dated Apr. 30, 2025, 6 pgs.
Examination Report issued in Australian Patent Application No. 2025201740, dated Mar. 18, 2025, 5 pgs.
Palo, Joonas, "Product Roadmapping Tool and Process Unification as part of a Global End-to-End Repeatability Operating Model Development," Haaga-helia, 2023, all pgs.
Sutton, Rowan et al., "A Reinforcement Learning and Synthetic Data Approach to Mobile Notification Management," ACM, 2019, all pgs.
Johnson, Renee, "Everything you Need to Know About Global Distribution System", Mar. 2, 2022, itilite.com, 6 pages (Year: 2022).
Pfefferle, J.," Moving from data lakes to data mesh", Oct. 18, 2022, medium.com, 22 pages (Year: 2022).
Agarwal S., et al., "Improving Bundles Recommendation Coverage in Sparse Product Graphs," WWW 22 Companion, Virtual Event, Lyon, France, Apr. 25-29, 2022, pp. 1037-1045 (09 Pages).
Channelpro Network: "Ingram Micro's New Xvantage Mobile Application is Simplifying How the IT Channel Works," Ingram Macro Inc, Dec. 20, 2023, 2 Page, [Retrieved on Sep. 18, 2025] Retrieved from URL: https://www.channelpronetwork.com/2023/12/20/ingram-micros-new-xvantage-mobile-application-is-simplifying-how-the-it-channel-works/.
Costa C., "Data Mesh: Concepts and Principles of a Paradigm Shift in Data Architectures," published by ScienceDirect in 2022 (Year: 2022), 9 pages.
Dehghani Z., "Data Mesh Principles and Logical Architecture", published by martinfowler.com on May 20, 2019 (Year: 2019), 9 pages.
Dey D., et al., "Appraise: A Governance Framework for Innovation with Artificial Intelligence Systems," ACM, 2024, 13 Pages.
Extended European Search Report for European Application No. 25154210.6, dated Jun. 11, 2025, 09 Pages.
Extended European Search Report for European Application No. 25154230.4, dated Jul. 10, 2025, 9 Pages.
Extended European Search Report for European Application No. 25161920.1, dated Jul. 24, 2025, 15 Pages.
Gately E., "Ingram Micro Debuts Xvantage Mobile App," Channel Futures, Dec. 20, 2023, 1 Page, [Retrieved on Sep. 2, 2025] Retrieved from URL: https://www.channelfutures.com/channel-sales-marketing/ingram-micro-debuts- xvantage-mobile-app.
He Z., et al., "Enhancing Web Accessibility: Automated Detection of Issues with Generative Al," Proceedings of the ACM on Software Engineering, Jul. 2025, vol. 2, No. FSE, Article FSE101, pp. 1-24.
Ingram Industries Inc: "Ingram Micro," Registered Trademark U.S. Appl. No. 86/365,487, filed May 30, 2017, 3 Pages, [Retrieved on Aug. 13, 2025] Retrieved from URL: https://tsdr.USPTO.gov/#caseNumber=86365487&caseSearchType=US_APPLICATION&caseType=DEFAULT&searchType=statusSearch.
Kohut Y., et al., "Recommendation System for Purchasing Goods Based on the Decision Tree Algorithm," Advances in Cyber-physical Systems, 2021, vol. 6, No. 2, pp. 1-7.
Kundu S., et al., "Detecting Functional Safety Violations in Online Al Accelerators," IEEE, 2022, pp. 1-4.
Machado I.A., et al., "Data Mesh: Concepts and Principles of a Pardigm Shift in Data Architectures," Procedia Computer Science, Amsterdam, NL, Jan. 10, 2022, vol. 196, pp. 263-271 (10 Pages), ISSN: 1877-0509, DOI: 10.1016/j.procs.2021.12.013, XP093050267, Retrieved from URL: https://www.sciencedirect.com/science/article/pii/S1877050921022365.
Mailparser, "Enter Mailparser: Your Solution for Data Entry," 2024, 7 Pages, [Retrieved on Dec. 2, 2025] Retrieved from URL: https://mailparser.io/email-to-erp.
Robert J.E., "Applying Generative Al to Detect Document Incompleteness, Inconsistencies, and Discrepancies," Acm, Fse Companion'25, Jun. 23-28, 2025, pp. 1381-1385.
Sryheni S., "Introduction to Depth First Search Algorithm (DFS)," Baeldung.com, Mar. 24, 2023, 6 Pages.
Sun Z., et al., "Revisiting Bundle Recommendation: Datasets, Tasks, Challenges and Opportunities for Intent-aware Product Bundling," Published by Association for Computing Machinery, SIGIR'22, Jul. 11-15, 2022, pp. 2900-2911.
Wolfart D., et al., "Modernizing Legacy Systems with Microservices: A Roadmap," Association for Computing Machinery, Jun. 21-23, 2021, 11 Pages.
Youtube.com: "Welcome to Xvantage Mobile-Your Anywhere, Anytime App," Ingram Micro USA, Oct. 24, 2023, 3 Pages, [Retrieved on Aug. 13, 2025] Retrieved from URL: https://www.youtube.com/watchv=QyZOeBLJODM.
European Search Report for European Application No. 25201138.2, dated Jan. 7, 2026, 12 Pages.
Rahm E., et al., "A survey of approaches to automatic schema matching," the VLDB Journal, vol. 10, No. 4, 2001, pp. 334-350.
Sahay T., et al., "Schema Matching using Machine Learning," 2019, 07 Pages, arXiv: 1911.1154 [5].
Aksu E., et al., "Is Personalization the Future of User Interfaces A Systematic Mapping and Review," Proceedings of the 2025 11th International HCI and UX Conference, 2025, pp. 67-72.
Ingram Micro Inc., "Pending Trademark U.S. Appl. No. 97/331,192," U.S. Patent and Trademark Office, Published Mar. 21, 2023 [Retrieved

(56) References Cited

OTHER PUBLICATIONS on 2026-06-11], 1 page, Retrieved from the Internet: URL: https://tsdr.USPTO.gov/#caseNumber=97331192&caseSearchType=US_APPLICATION&caseType=DEFAULT&searchType=status-Search.

Nallamothu T.K., "Enhance Cross-Device Experiences Using Smart Connect Ecosystem," International Journal of Technology , Management and Humanities, Aug. 30, 2023, vol. 9 No. 03, 5 pages.

Sivagnanasothy L., "How Change Data Capture is used for Real-Time Data Integration and Analytics," medium. com, May 22, 2019, 7 pages.

Van De Wiel., M., "Change Data Capture (CDC): Tools, Benefits, and Best Practices," fivetran. com, Aug. 4, 2022, 10 pages.

Extended European Search Report for European Application No. 25227599.5, dated Apr. 14, 2026, 09 Pages.

Office Action for Canadian Patent Application No. 3244397, mailed on Apr. 28, 2026, 09 pages.

Office Action issued in Japanese Patent Application No. 2025-151910, mailed Apr. 21, 2026, 9 pgs.

* cited by examiner

INGRAM XVANTAGE

Search by keyword(s), VPN or IM SKU

SK

Office Cart

End customer: ABC Technology

Creat a quote

Add products

| Line # | Item description | MSRP | Unit price | Quantity | Extd. price |
| --- | --- | --- | --- | --- | --- |
| 01 | **Dell Latitude 7420 Core I7-1165 G7 16GB 512GB W10P W11PLICS 14IN**<br>Dell Latitude 7000 7420 14" Notebook - Full HD - 1920 x 1080 - Intel Core i7 11th Gen i7-1185G7 Quad-core (4 Core) 3 GHz - 16 GB Total RAM - 51...<br>**VPN:** 42CFC **SKU:** 01GR54 **UPC:** 0884116413066<br>943 In stock | $2,828.39 | $1,760.53 | − 10 + | **$17,605.30**<br>Weight 70.00kg |
| 02 | **Microsoft 365 E5 (NCE COM MTH)**<br>**Subscription period:** 1 Year<br>Microsoft 365 E5<br>**VPN:** CFQ7TTC0LFLZ:0002 | $57.00<br>per license/month | $45.60<br>per license/month | − 10 +<br>4990 available | **$456.00** |
| 03 | Volume pricing<br>**Acrobat Pro for teams - Multiple Platforms - Multi NorthAmerican Language**<br>**Subscription period:** 1 Year<br>Volume pricing<br>Acrobat Pro for teams - Multiple Platforms - Multi NorthAmerican Language<br>**VPN:** MNT-SGL-MFF-D9-BK | $193.68 ⓘ<br>per user/month | $177.77 ⓘ<br>per user/month | − 10 +<br>4990 available | **$1,777.70** |

Continue shopping

Estimated total $19,839.00

Checkout

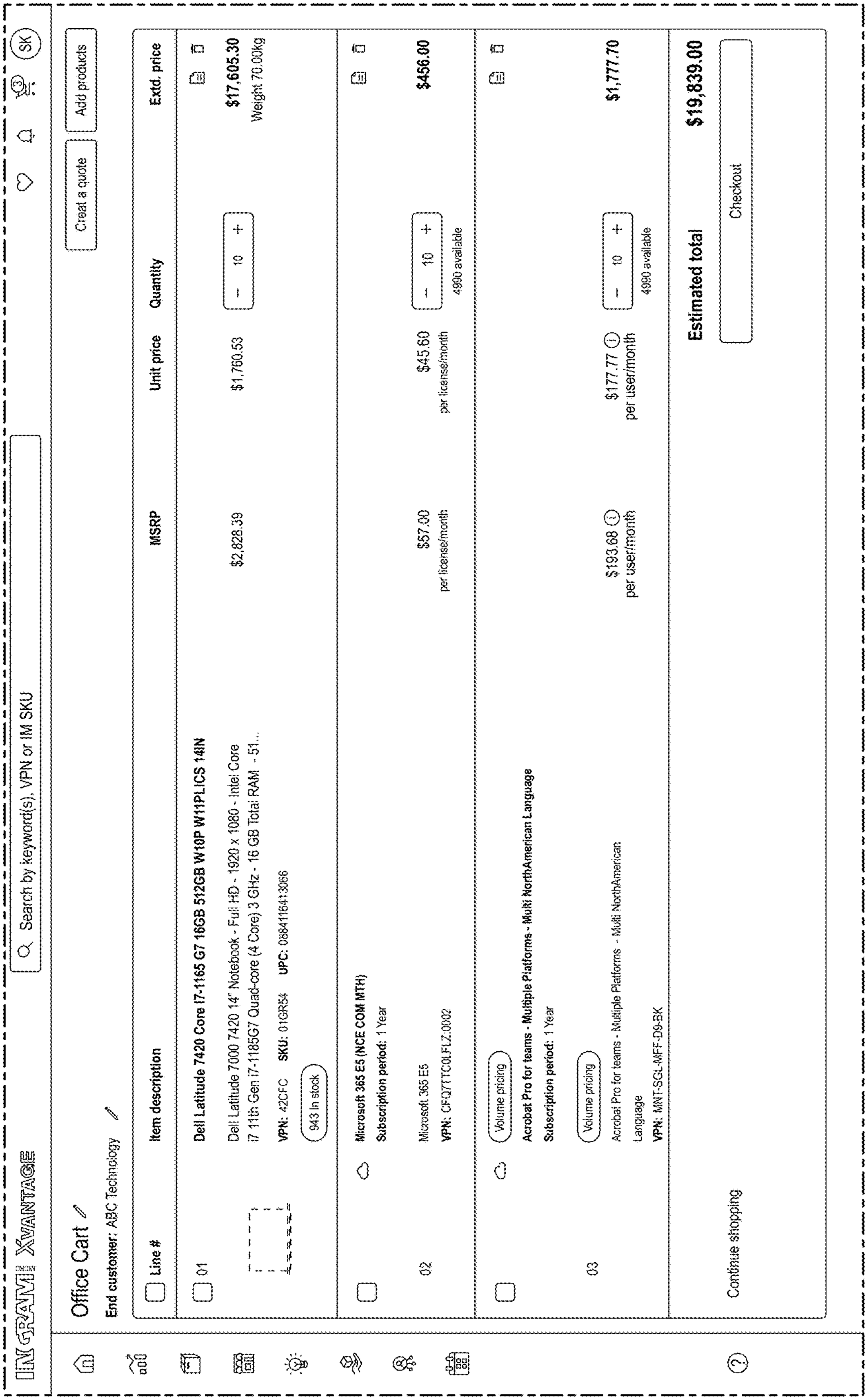

FIG. 12H

INGRAM XVANTAGE

Search by keyword(s), VPN or IM SKU

SK

Home > Orders > Order details

Reseller PO #: 2134566

Download

Order date: 05/16/2023 | End customer: ABC Technologies | Confirmation #: 2323234 | View more details All order lines    Tracking details IM order #: 70-35432 (Shipped)

Packing slip    Notification settings

Sub-order #: 70-35431-11 | Shipped from Mira Loma, CA

| Line | Description | Status | Estimated to deliver | Quantity | Unit price | Line price |
|---|---|---|---|---|---|---|
| 1 | Dell Latitude 7420 Core i7-1185 G7 16GB 512GB W10P W1...<br>VPN: 42CFC SKU: 01GR54<br>View serial numbers | Shipped | 05/25/2023<br>View more | Total: 10<br>Shipped: 10 | $1,760.53 | $17,605.30 |

Invoice #: 20-VJ70-11 | View summary

| | |
|---|---|
| Order subtotal | $17,605.30 |
| Shipping charges | $0.00 |
| Taxes | $0.00 |
| Order total | $17,605.30 |

IM order #: SO000518 (Completed)

| Plan & options | Quantity | Reseller cost | Total reseller cost | Margin | End customer price | Total end customer price |
|---|---|---|---|---|---|---|
| **Microsoft 365 E5 (NCE COM MTH)** | | | | | | |
| Microsoft 365 E5 | 10 | $45.60/License | $456.00 | 20.00% | $57.00/License | $570.00 |
| **Acrobat Pro for teams - Multiple Platforms - Multi North...** | | | | | | |
| Acrobat Pro for teams - Multiple Platforms - Multi North... | 10 | $177.77/License | $1,777.70 | 8.21% | $193.68/License | $1,936.80 |

| | | | |
|---|---|---|---|
| Fees | $2,233.70 | Customer total fees | $2,506.80 |
| Taxes | $0.00 | Taxes | $0.00 |
| **Order total** | **$2,233.70** | **Total customer price** | **$2,506.80** |

Order total $19,839.00

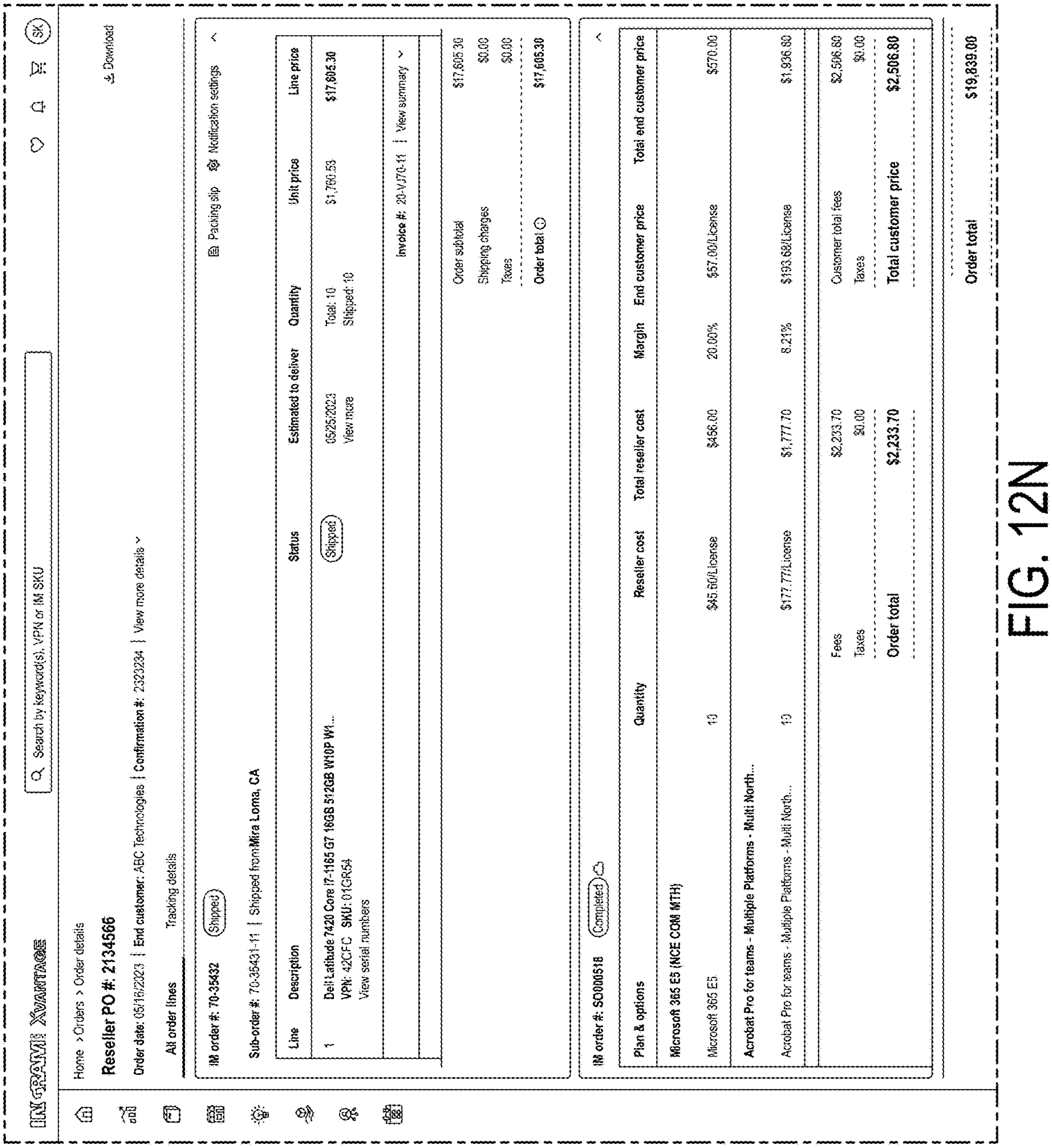

FIG. 12N

INGRAM XVANTAGE

Search by keyword(s), VPN or IM SKU

SK

My business › Subscriptions

Subscriptions

Search

Filter

| Active | Pending | Expire within **30 days** | Auto-renewal within **30 days** | Trial | All |
|---|---|---|---|---|---|
| 10 | 40 | 40 | 115 | 14 | 150 |

| End customer | Subscription | Reseller PO | Status | | |
|---|---|---|---|---|---|
| eNet system Inc.<br>1234509890 | Google Workspace Enterprise Plus (Annual) - Promo<br>1728376 | 1234567890 | Active<br>Renews on: 09/12/23 | Change | ⋮ |
| BEACON HEALTH MANAGEMENT<br>1234509890 | Adobe VIP Marketplace - Only Commercial<br>1728376 | 1234567890 | Active<br>Renews on: 09/12/23 | Change | ⋮ |
| eNet system Inc.<br>1234509890 | Microsoft 365 Business Standard (NCE COM ANN)<br>1524775 | 1234567890 | Active<br>Renews on: 09/12/23 | Change | ⋮ |
| UT ARLINGTON<br>1234509890 | Google Workspace Business Starter (Annual) - Promo<br>1728376 | 1234567890 | Active<br>Renews on: 09/12/23 | Change | ⋮ |
| PAWLING CENTRAL SCHOOL DISTRICT<br>1234509890 | Adobe VIP Seamless move to VIP Marketplace Enabler<br>1728376 | 1234567890 | Active<br>Renews on: 09/12/23 | Change | ⋮ |
| PAWLING CENTRAL SCHOOL DISTRICT<br>1234509890 | Google Workspace Enterprise Plus (Annual/Monthly) - Promo<br>1728376 | 1234567890 | Active<br>Renews on: 09/12/23 | Change | ⋮ |
| UT ARLINGTON<br>1234509890 | Adobe VIP Marketplace - Only Commercial<br>1728376 | 1234567890 | Active<br>Expires on: 01/12/23 | Change | ⋮ |
| Art institute trustees<br>1234509890 | Google Workspace Additonal Storage Annual<br>1728376 | 1234567890 | Active<br>Renews on: 09/12/23 | Change | ⋮ |
| RGV university<br>1234509890 | Adobe VIP Seamless move to VIP Marketplace Enabler<br>1728376 | 1234567890 | Active<br>Renews on: 09/12/23 | Change | ⋮ |
| Accord financials<br>1234509890 | Google Workspace Business Starter (Annual) - Promo<br>1728376 | 1234567890 | Active<br>Renews on: 09/12/23 | Change | ⋮ |

Page 1 of 10 Items per page: 10 ‹ 1 2 3 ... 8 9 10 ›

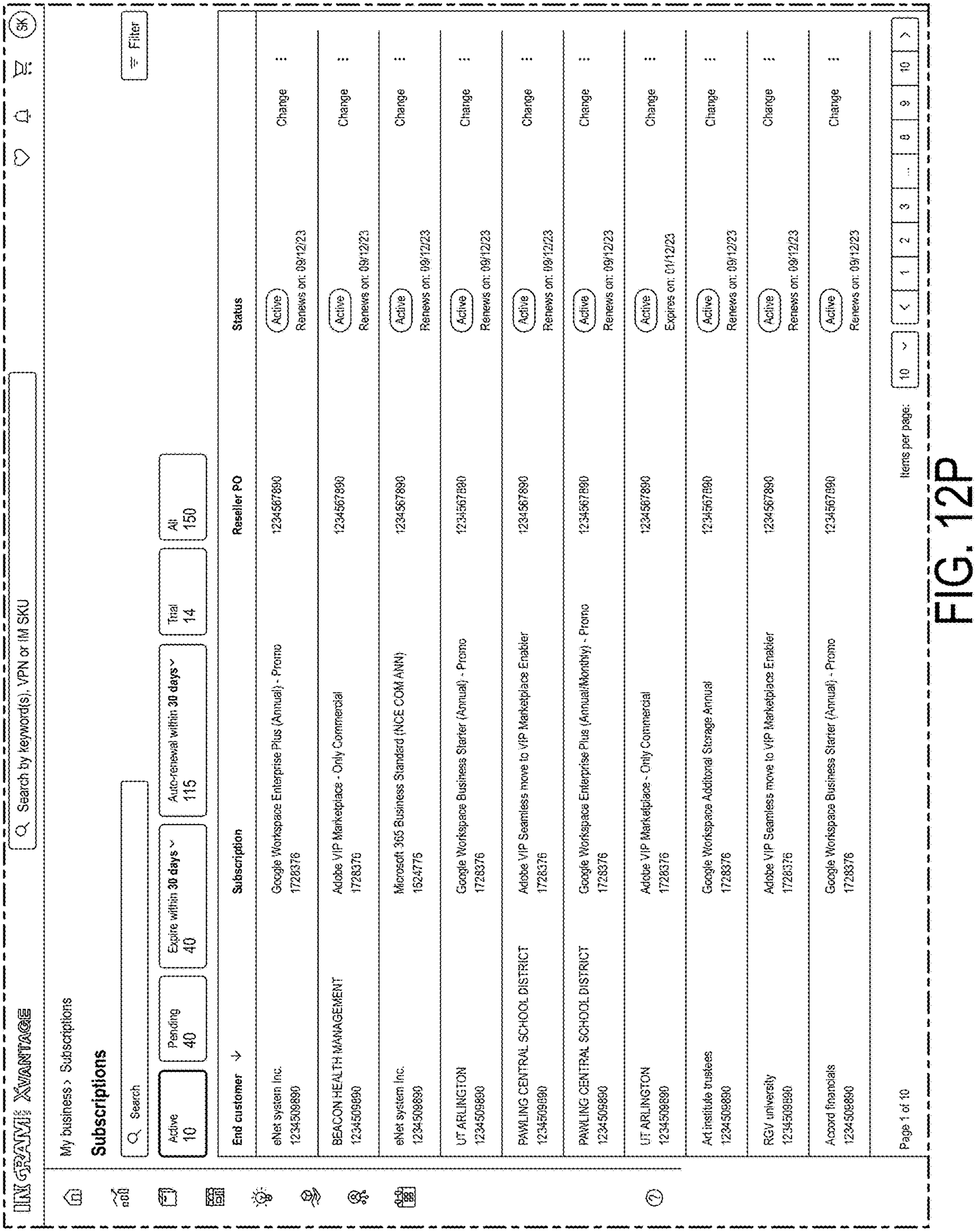

FIG. 12P

SYSTEMS AND METHODS FOR PERSONALIZING BUNDLES BASED ON PERSONAS

CROSS REFERENCE TO RELATED APPLICATIONS

This application is a Continuation-In-Part (CIP) of U.S. patent application Ser. No. 18/341,714, filed on Jun. 26, 2023 and U.S. patent application Ser. No. 18/349,836, filed on Jul. 10, 2023; U.S. Provisional Application No. 63/513,073, filed on Jul. 11, 2023; U.S. Provisional Application No. 63/513,078, filed on Jul. 11, 2023; U.S. Provisional Application No. 63/515,075, filed on Jul. 21, 2023; and U.S. Provisional Application No. 63/515,076, filed on Jul. 21, 2023. Each of these applications is incorporated herein by reference in its entirety.

BACKGROUND

Traditional ordering processes in distribution and supply-chain platforms are challenged with inefficiencies, delays, and inaccuracies. In the conventional landscape, multiple systems and vendors usually perform each activity independently, from creating a bill of materials to registering deals, applying pricing, generating quotes, and submitting orders. This approach leads to inefficiencies and a high likelihood of errors.

Enterprise Resource Planning (ERP) systems have served as the mainstay in managing business processes, including distribution and supply chain. These systems act as central repositories where different departments such as finance, human resources, and inventory management can access and share real-time data. While ERPs are comprehensive, they present several challenges in today's complex distribution and supply chain environment. One of the primary challenges is data fragmentation. Data silos across different departments or even separate ERP systems make real-time visibility difficult to achieve. Users lack a comprehensive view of key distribution and supply chain metrics, which adversely affects decision-making processes.

Moreover, ERP systems often do not offer effective data integration capabilities. Traditional ERP systems are not designed to integrate efficiently with external systems or even between different modules within the same ERP suite. This design results in a cumbersome and error-prone manual process to transfer data between systems and affects the flow of information throughout the supply chain. Data inconsistencies occur when information exists in different formats across systems, hindering accurate data analysis and leading to uninformed decision-making.

Data inconsistency presents another challenge. When data exists in different formats or units across departments or ERPs, standardizing this data for meaningful analysis becomes a challenging process. Businesses often resort to time-consuming manual processes for data transformation and validation, which further delays decision-making. Additionally, traditional ERP systems often lack the capabilities to handle large volumes of data effectively. These systems struggle to provide timely insights for operational improvements, particularly problematic for businesses dealing with complex and expansive distribution and supply chain networks.

Data security is another concern, especially considering the sensitive nature of supply chain data, which includes customer details, pricing, and contracts. Ensuring compliance with global regulations on data security and governance adds an additional layer of complexity. Traditional ERP systems often lack robust security features agile enough to adapt to the continually evolving landscape of cybersecurity threats and compliance requirements.

BRIEF SUMMARY OF THE INVENTION

Automated Personalized Bundling processes are designed to address deficiencies in the distribution industry by providing a unified platform experience. This platform integrates various activities and systems into a single interface, enabling users to streamline the entire bundling process. It reduces the time required for activities like product and service selection, bundle customization, pricing application, and order placement. A technology solution that effectively integrates, streamlines, and accelerates these complex processes, while ensuring data security and compliance, is critically needed.

The distribution platform transitions from traditional model of selling individual Stock Keeping Units (SKUs) to adopting a more integrated approach focused on delivering comprehensive solutions. The transformation described herein is driven by the rapidly evolving nature of technology, which encompasses a wide array of hardware, software, and subscription-based services. Systems and methods automatically bridge this complexity to meet the diverse needs of users, leveraging automated personalized bundling processes. Systems and methods utilize advanced AI models to correlate and analyze user preferences and behavior, enabling the dynamic assembly of tailored bundles that include a mix of products and services. This approach simplifies the user experience by providing a single, coherent solution and also enhances the platform's ability to stay current with technological advancements and market trends. By integrating real-time data analytics, these systems ensure that the bundled offerings are relevant and appealing, addressing the challenge of maintaining compatibility and synergy across different technology variants. The systems and methods are configured to adopt a shift towards solutions over individual SKUs in response to a changing landscape, maximizing utility for users while accommodating continuous innovation inherent in technology products and services.

In the global distribution industry, challenges such as inefficient distribution management, SKU management, and the transition to direct-to-consumer models necessitate innovative solutions. Traditional distribution methods are increasingly insufficient, particularly with shifts in consumer expectations and regulations. The invention addresses these challenges by integrating a comprehensive set of functionalities focused on distribution management, supply chain management, and customer visibility into one platform.

A significant challenge in the technology distribution is how to discern compatibility and synergy among vast arrays of products and SKUs across hardware, software, As-a-Service (AaS), and other technology offerings. Systems and methods in embodiments described herein leverage integration of an interface, data layer, and analytical engine described in detail below to provide a scalable solution. The complexity of accurately bundling diverse technology solutions to meet individual user needs, while being scalable commensurate with the rapid pace of technological advancements, presents a necessity for an advanced, adaptive platform. Traditional methods struggle to filter the relevant signal regarding appropriate technology solutions, from noise. Embodiments described herein can provide effective personalization.

According to some embodiments, a Personalized Bundling Module can be integrated with a Real-Time Data Mesh (RTDM) and a Single Pane of Glass User Interface (SPoG UI). This module uses algorithms to optimize product and service selections based on real-time market data and customer preferences. It employs advanced algorithms to intelligently combine products and services into tailored bundles.

In a non-limiting example, a Bundle Recommendation Engine within the Personalized Bundling Module employs decision tree algorithms and entropy minimization techniques to offer compatible and customized choices to users. An alternative embodiment employs machine learning models like neural networks for more tailored and nuanced bundle recommendations. A Pricing Engine uses a multi-variable linear regression model to predict bundle costs, with an alternative embodiment using more advanced machine learning models like Random Forest.

In an embodiment, the Personalized Bundling Module interacts with the RTDM and SPoG UI. Upon receiving a user request, a Bundle Recommendation Engine can fetch real-time market and customer data from RTDM. The module can utilize decision tree algorithms with entropy minimization for optimizing bundle choices. Alternatively, machine learning models like neural networks can be employed to refine user choices based on nuanced data patterns. A Bundle Pricing Engine can perform cost prediction and customization. In some embodiments, the Pricing Engine employs a multi-variable linear regression model for cost prediction, taking into account variables like base price, customer-specific discounts, and market conditions. An alternative option can implement a Random Forest algorithm for more complex pricing structures.

In some embodiments, the Personalized Bundling Module can initiate a bundling request via the SPoG UI. An Authorization Checker can verify user permissions against role-based access control policies. A Bundle Configuration Aggregator can query the RTDM for current product and service options. In a non-limiting example, the Bundle Configuration Aggregator can assemble bundles using a weighted scoring algorithm. In some embodiments, a Bundle Template Filler can populate a bundle template based on user preferences and market data. An Error-Check Integrator reviews the bundle configuration for errors using predefined rules and algorithms.

Additionally, or alternatively, Error-Check Integrators in the module can use sets of validation algorithms. These could include support vector machines trained on historical data for bundle accuracy. Real-time data can be fetched from various systems via the RTDM, ensuring synchronization. SQL queries pull account-specific data, such as customer preferences or previously identified bundle patterns, directly from integrated databases via RTDM.

Embodiments disclosed herein integrate multiple systems, automate processes, and validate bundle configurations based on intelligent rules. This enables efficient execution of complex tasks without specialized knowledge, reducing time and minimizing errors. Moreover, the invention is adaptable and configurable to meet evolving market and customer demands, thereby maintaining the relevance and sustainability of the distribution model. The invention thus provides an efficient, integrated, and adaptable solution for automating personalized bundling processes in the distribution industry.

Automating personalized bundling based on personas provides sophisticated, data-driven methodology for creating customized combinations of diverse product categories, such as hardware, software, cloud services, and other related offerings, customized to the unique preferences and requirements of different user archetypes or personas. This method involves assembly of various products and services into cohesive bundles that align with the specific characteristics, behaviors, and needs of distinct customer segments. In embodiments disclosed herein, automating personalized bundling can account for rapid technological changes that challenge static algorithms and human analysis. By leveraging data-driven methodologies in real-time, systems and methods described herein dynamically generate personas and personalized bundles based on real-time technology and inventory updates, market research, user data, and evolving technology trends. Processes are provided to enable the assembly of product and service bundles that are not coherent and up-to-date with the latest technological advancements, ensuring relevance and appeal to various customer segments.

In this process, personas are automatically generated based on comprehensive market research and real user data, broadly encompassing attributes including demographics, purchasing patterns, digital engagement, and preferences across various product categories. The identification of personas allows for a nuanced understanding of customer needs in areas such as technology, software applications, cloud computing solutions, and hardware requirements.

Leveraging advanced machine learning algorithms and predictive analytics, the system analyzes a rich array of data, including historical purchases across different product categories, user browsing activities, and interaction data. This analysis helps in discerning the unique preferences and potential needs of each persona, facilitating the creation of highly relevant and appealing bundles.

Some embodiments are directed to a platform that employs advanced machine learning algorithms and dynamic data analysis to address inherent variability and frequent updates in technology product features, (e.g., addressing which laptop has an appropriate battery life, which peripherals have a sought functionality, etc.). By continuously analyzing up-to-date product information and user interaction data, the systems and methodologies can adapt its bundling recommendations in real-time. This ensures the delivery of the most relevant, compatible, and current technology solutions customized to each persona.

automated personalized bundling integrates products and services from different categories, such that each bundle both coherent and comprehensive in meeting a specific user's technological and service needs. This could involve combining current hardware with compatible software solutions, aligning cloud service offerings with user data requirements, integrating a suite of products that collectively enhance user productivity and efficiency, etc. The system is configured to deliver a highly personalized user experience, facilitating increased engagement, customer satisfaction, and loyalty by providing bundles curated and relevant to the individual's specific professional or personal technology needs.

Single Pane of Glass

The Single Pane of Glass (SPoG) can provide a comprehensive solution that is configured to address these multi-faceted challenges. It can be configured to provide a holistic, user-friendly, and efficient platform that provides a distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers an innovative solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, to facililitate personalized bundling and manage user personas, SPoG integrates data from various OEMs into a single platform. This not only ensures data consistency but also significantly reduces the potential for errors. Furthermore, it provides capabilities to perform personalized bundling efficiently, thereby aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, streamlining inventory management, ensuring compliance, simplifying personalized bundling, and delivering a superior customer experience, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can be include implementation(s) of a Real-Time Data Mesh (RTDM), according to some embodiments. The RTDM offers an innovative solution to address these challenges. RTDM, a distributed data architecture, enables real-time data availability across multiple sources and touchpoints. This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM also simplifies SKU management and localization by integrating data from various OEMs, ensuring data consistency and reducing error potential. Its capabilities for personalized bundling align with specific market needs efficiently.

The RTDM enhances customer experience with its intuitive interface, allowing easy access and purchase of technology, meeting the expectations of the new generation of tech buyers.

Advantages of SPoG and RTDM Integration

Integrating SPoG platform with the RTDM provides a myriad of advantages. Firstly, it offers a holistic solution to the longstanding problems in the distribution industry. With the RTDM's capabilities, SPoG can enhance supply chain visibility, streamline inventory management, ensure compliance, simplify SKU management, and deliver a superior customer experience.

The real-time tracking and analytics offered by RTDM improve SPoG's ability to manage the supply chain and inventory effectively. It provides accurate and current information, enabling distributors to make informed decisions quickly.

Integrating SPoG with RTDM also ensures data consistency and reduces errors in SKU management. By providing a centralized platform for managing data from various OEMs, it simplifies product localization and helps to align with market needs.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can leverage the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
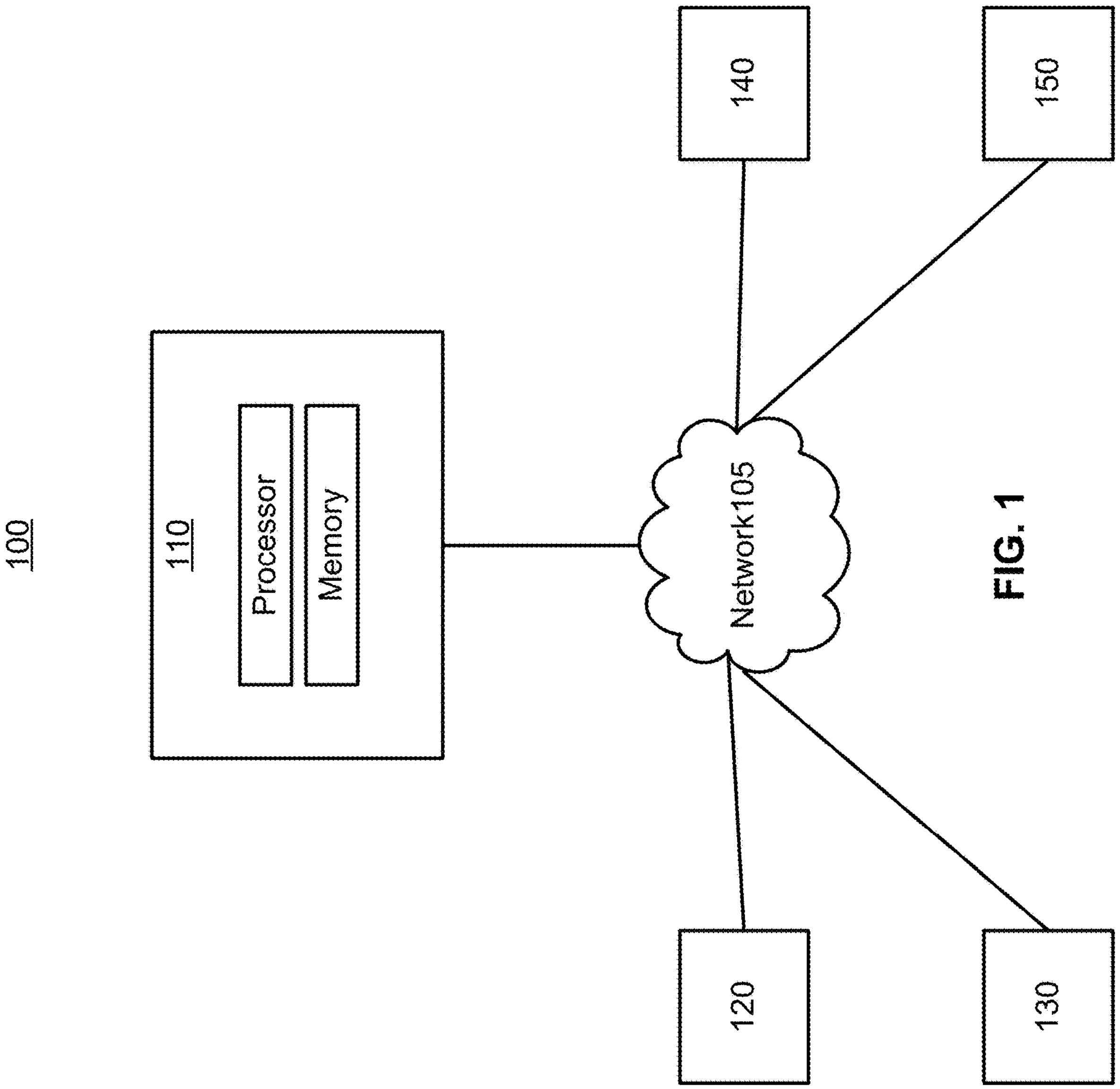
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, empowering them to make informed decisions and optimize their IT infrastructure.

End customers 130 can be the ultimate beneficiaries of the IT solutions provided by System 110. They may include businesses or individuals who utilize IT products and services to enhance their operations, productivity, or daily activities. End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of System 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can leverage System 110 to streamline their supply chain operations, manage pricing and promotions, and gain insights into customer preferences and market trends. By integrating with System 110, vendors can expand their reach, access new markets, and enhance their overall visibility and competitiveness.

Resellers 150 can be intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging System 110, resellers can enhance their customer relationships, optimize their product offerings, and increase their revenue streams.

Within the operating environment of System 110, there can be various dynamics and characteristics that contribute to its effectiveness. These dynamics include real-time data exchange, integration with existing enterprise systems, scalability, and flexibility. System 110 ensures that relevant data can be exchanged in real-time between users, enabling accurate decision-making and timely actions. Integration with existing enterprise systems such as enterprise resource planning (ERP) systems, customer relationship management (CRM) systems, and warehouse management systems allows for communication and interoperability, eliminating data silos and enabling end-to-end visibility.

System 110 can achieve scalability and flexibility. It can accommodate the growing demands of the IT distribution model, whether it involves an expanding customer base, an increasing number of vendors, or a wider range of IT products and services. System 110 can be configured to handle large-scale data processing, storage, and analysis, ensuring that it can support the evolving needs of the distribution platform. Additionally, System 110 leverages a technology stack that includes .NET, Java, and other suitable technologies, providing a robust foundation for its operations.

In summary, the operating environment of System 110 within the IT distribution model encompasses customers 120, end customers 130, vendors 140, resellers 150, and other entities involved in the distribution process. System 110 serves as a centralized platform that facilitates efficient collaboration, communication, and transactional processes between these users. By leveraging real-time data exchange, integration, scalability, and flexibility, System 110 empowers users to optimize their operations, enhance customer experiences, and drive business success within the IT distribution ecosystem.

Figure 2:
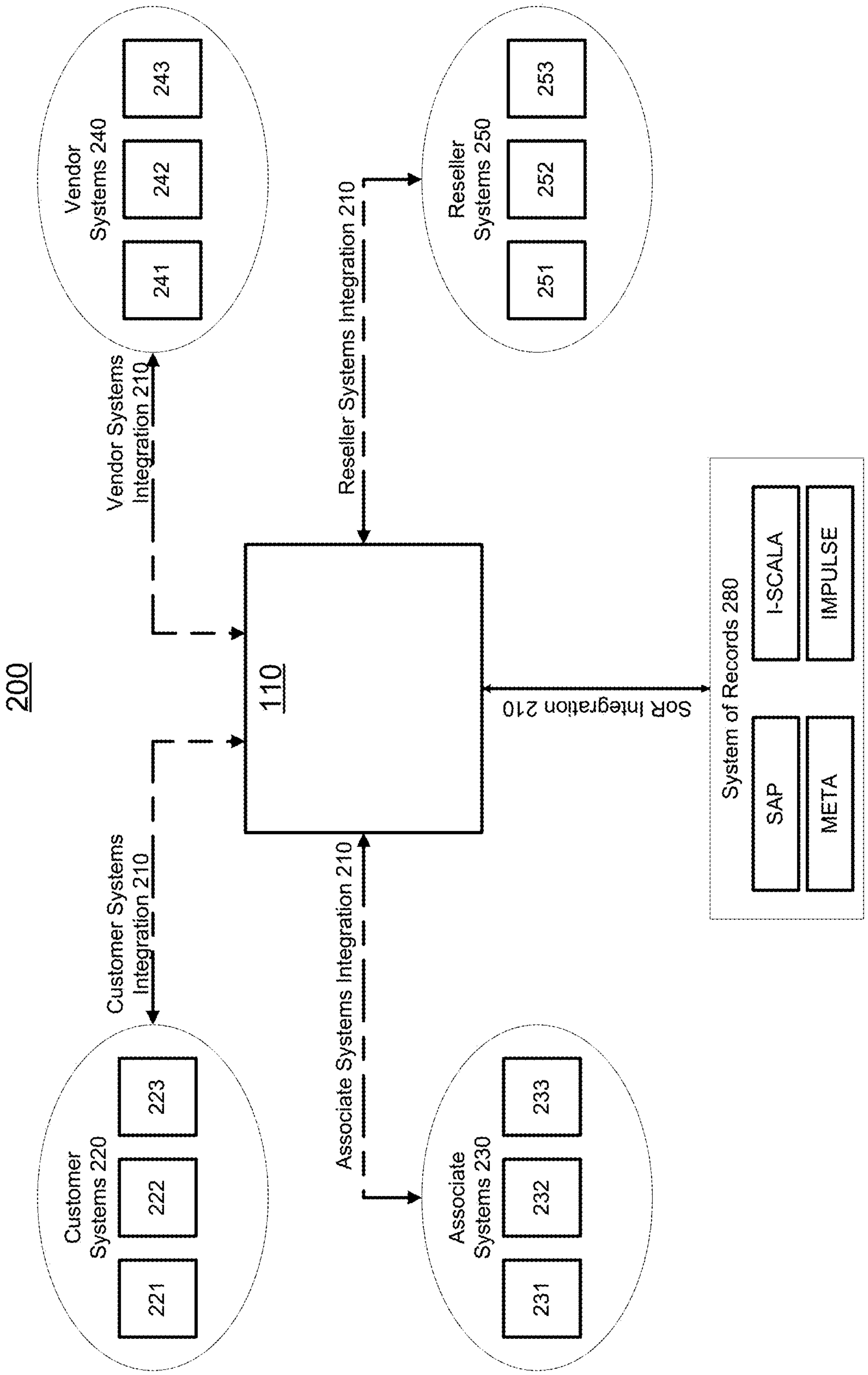
FIG. 2 illustrates one embodiment of an operating environment of the distribution platform, which builds upon the elements introduced in FIG. 1.

FIG. 2 illustrates an operating environment 200 of the distribution platform, which builds upon the elements introduced in FIG. 1. Within this operating environment, integration points 210 facilitate data flow and connectivity between various customer systems 220, vendor systems 240, reseller systems 260, and other entities involved in the distribution process. The diagram showcases the interconnectedness and the mechanisms that enable efficient collaboration and data-driven decision-making. This operating environment is configured to automate personalized bundling processes utilizing advanced Artificial Intelligence (AI) and Machine Learning (ML) technologies to integrate, process, and analyze data.

In some embodiments, an automated process for personalized bundling is a systematized approach designed to create and offer customized product or service bundles to users, with minimal human intervention. This process integrates several key technological components: The process can include the collection of diverse user data, including demographic information, browsing habits, purchase history, and user interactions. This data is aggregated from various sources such as CRM systems, web analytics tools, and other platforms. Utilizing a Real-Time Data Mesh (RTDM), the system processes and standardizes the collected data, ensuring its readiness for analysis. The RTDM serves as a centralized repository that facilitates the real-time updating and retrieval of user data. Advanced analytics and machine learning algorithms within an AAML Module analyze the aggregated data to identify distinct user personas. This involves segmenting the user base into groups based on shared characteristics and predicted behavior patterns. The Personalized Bundling Module, utilizing the insights gained from the AAML Module, generates customized bundle recommendations for each identified persona. This module applies predictive models and heuristic algorithms to select products or services that align with the specific preferences and needs of each persona. The recommended bundles are presented to the users through an interactive and user-friendly Single Pane of Glass User Interface (SPoG UI). This interface allows users to view, customize, and confirm their bundle choices. The system can incorporate a feedback loop, where user responses to the recommended bundles are collected and analyzed. This feedback is used to continually refine and optimize the bundling algorithms, ensuring that the recommendations remain relevant and effective.

In some embodiments, AI algorithms can be applied for real-time inventory management, customization options, and user choice optimization in a personalized bundling process. Machine learning models such as neural networks and decision trees can be employed to provide more refined and personalized options to the user. Similarly, personalized bundling processes can use ML-based algorithms for real-time generation of personalized bundles. Advanced analytics in the form of ensemble learning or reinforcement learning can be conducted to continually optimize personalized bundling processes. AI and ML technologies in operating environment 200 utilize either or both of supervised and unsupervised learning algorithms. These include convolutional neural networks for pattern recognition and logistic regression models for decision-making processes. AI aspects and components can dynamically adapt to changing data inputs, such as user preferences and market trends, employing reinforcement learning to optimize decision pathways. ML aspects can leverage decision trees and clustering algorithms for predictive analytics, continuously refining its output by assimilating new data, thereby enhancing the accuracy and relevance of personalized bundling processes Operating environment 200 can include System 110 as a distribution platform that serves as the central hub for managing and facilitating the distribution process. System 110 can be configured to perform functions and operations as a bridge between customer systems 220, vendor systems 240, reseller systems 260, and other entities within the ecosystem. It can integrate communication, data exchange, and transactional processes, providing users with a unified and streamlined experience. Moreover, operating environment 200 can include one or more integration points 210 to ensure smooth data flow and connectivity. Integration Points 210 can employ a hybrid architecture combining RESTful APIs, WebSockets, and the like to facilitate real-time data exchange and synchronization. This architecture can be secured through SSL/TLS encryption protocols, ensuring data confidentiality and integrity during transit. These integration points include:

Customer System Integration: Integration point 210 enables System 110 to connect with customer systems 220, facilitating efficient data exchange and synchronization. Customer systems 220 may include entities like customer system 221, customer system 222, and customer system 223. These systems represent internal systems used by customers, such as ERP or CRM systems. Integration with customer systems 220 allows customers to access real-time information on personalized bundles, pricing details, order tracking, and other relevant data, enhancing their decision-making capabilities. This integration offers an automated, real-time solution for creating and managing personalized bundles, improving operational efficiency for customers.

Data exchange among customer systems 220, vendor systems 240, and reseller systems 260 is enabled by a robust ETL (Extract, Transform, Load) described below in reference to the real-time data mesh architecture, in ensuring data consistency and reliability. This interaction can be governed by predefined business rules and logic, which dictate the data flow and processing methodologies. Advanced mapping and transformation tools are employed to harmonize disparate data formats, allowing for integration and utilization of data across these systems. Orchestrated data exchange supports synchronized operations, enabling efficient and informed decision-making across the distribution network.

Associate System Integration: Integration point 210 enables System 110 to connect with associate systems 230, facilitating efficient data exchange and synchronization. These systems contribute to the overall efficiency of personalized bundling by providing relevant market and product data.

Vendor System Integration: Integration point 210 facilitates the connection between System 110 and vendor systems 240. Vendor systems 240 may include entities like vendor system 241, vendor system 242, and vendor system 243, representing inventory management, pricing systems, and product catalogs. Integration with vendor systems 240 ensures vendors can efficiently update their offerings and receive real-time notifications, to facilitate the personalized bundling process.

Reseller System Integration: Integration point 210 allows reseller systems 260 to connect with System 110. Reseller systems 260 encompass entities such as reseller system 261, reseller system 262, and reseller system 263, handling sales, customer management, and service delivery. Integration empowers resellers to access up-to-date product information and manage customer relationships effectively.

Other Entity System Integration: Integration point 210 also connects other entities involved in the distribution process, facilitating collaboration and efficient distribution. This integration ensures real-time data exchange, for personalized bundling and decision-making in the distribution ecosystem.

System 110's configuration includes sophisticated AI and ML capabilities to tailor product offerings and bundles according to individual customer personas, ensuring relevance and optimization in the distribution process.

Integration points 210 also enable connectivity with System of Records 280, for additional data management and integration. Representing System of Records 280 can represent enterprise resource planning (ERP) systems or customer relationship management (CRM) systems, including both future systems as well as legacy ERP systems such as SAP, Impulse, META, I-SCALA, and others. System of Records can include one or more storage repositories of critical and legacy business data. It facilitates integration of data exchange and synchronization between the distribution platform, System 110, and the ERPs, enabling real-time updates and ensuring the availability of accurate and up-to-date information. Integration points 210 establish connectivity between the System of Records 280 and the distribution platform, allowing stakeholders to leverage rich data stored in the ERPs for efficient collaboration, data-driven decision-making, and streamlined distribution processes. These systems represent the internal systems utilized by customers, vendors, and others.

Integration points 210 within the operating environment 200 can be facilitated through standardized protocols, APIs, and data connectors. These mechanisms ensure compatibility, interoperability, and secure data transfer between the distribution platform and the connected systems. System 110 employs industry-standard protocols, such as RESTful APIs, SOAP, or GraphQL, to establish communication channels and enable data exchange.

In some embodiments, System 110 can incorporate authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable users to operate within a connected ecosystem. Data generated at various stages of the distribution process, including customer orders, inventory updates, shipment details, and sales analytics, flows between customer systems 220, vendor systems 240, reseller systems 260, and other entities. This data exchange facilitates real-time visibility, enables data-driven decision-making, and enhances operational efficiency throughout the distribution platform.

In some embodiments, System 110 leverages advanced technologies such as Typescript, NodeJS, ReactJS, .NET Core, C#, and other suitable technologies to support the integration points 210 and enable communication within the operating environment 200. These technologies provide a robust foundation for System 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 enable users to operate within a connected ecosystem. Data generated at various touchpoints, including customer orders, inventory updates, pricing changes, or delivery status, flows between the different entities, systems, and components. The integrated data can be processed, harmonized, and made available in real-time to relevant users through System 110. This real-time access to accurate and current information empowers users to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, could include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI) provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Thereby, operating environment 200 can couple a distribution platform with one or more integration points 210 and data flow to enable efficient collaboration and streamlined distribution processes.

Figure 3:
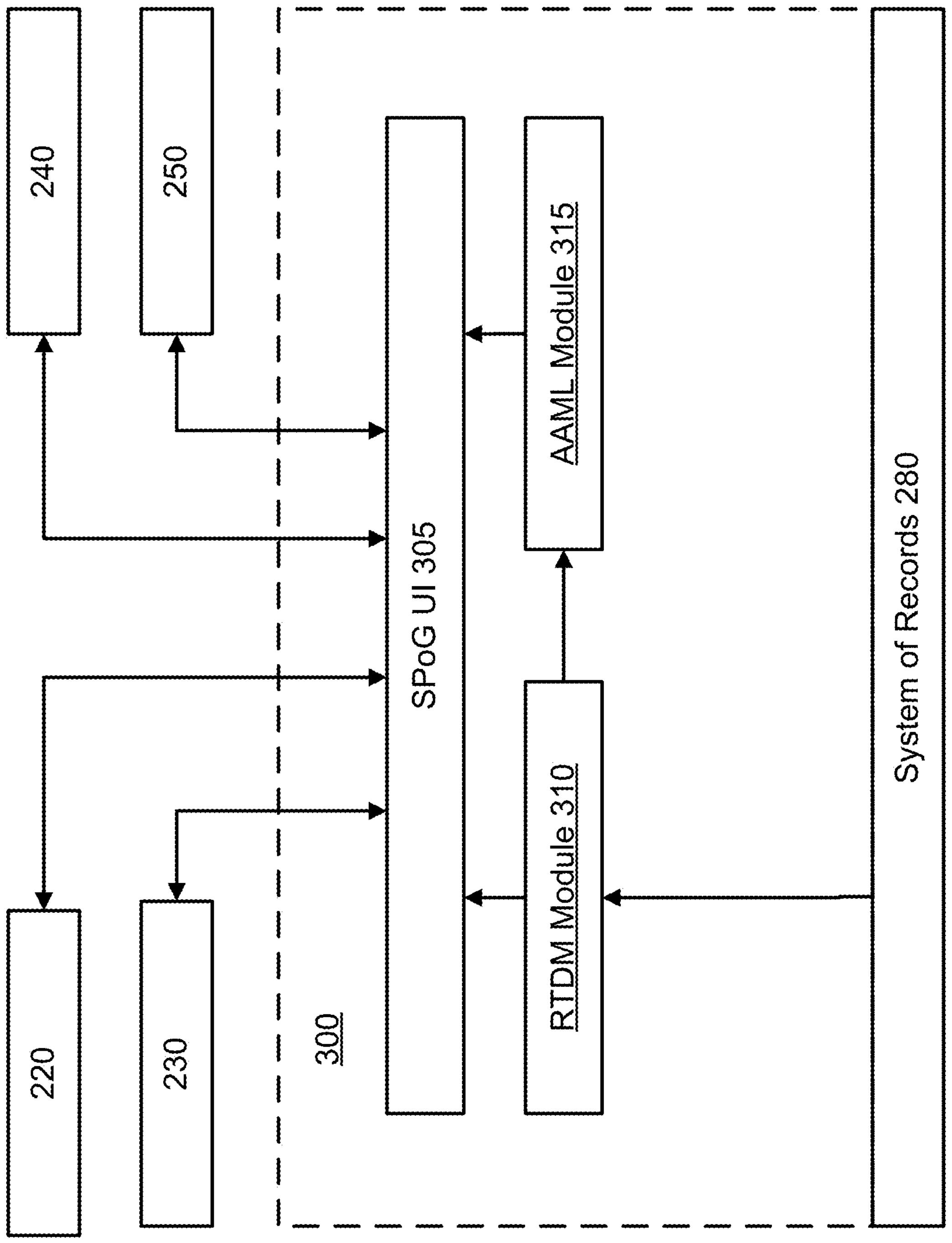
FIG. 3 illustrates an embodiment of a system for distribution management.

FIG. 3 illustrates a system 300 for supply chain and distribution management. System 300 (FIG. 3) is a supply chain and distribution management solution configured to address the challenges faced by fragmented distribution ecosystems in the global distribution industry. System 300 can include several interconnected components and modules that work in harmony to optimize supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, empowering them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

The SPoG UI 305 integrates with other modules of System 300, facilitating real-time data exchange, synchronized operations, and streamlined workflows. Through API integrations, data synchronization mechanisms, and event-driven architectures, SPoG UI 305 ensures smooth information flow and enables collaborative decision-making across the distribution ecosystem. SPoG UI 305 is designed with a user-centric approach, featuring an intuitive and responsive layout. It utilizes front-end technologies to render dynamic and interactive data visualizations. Customizable dashboards allow users to tailor their views based on specific roles and requirements. The UI supports drag-and-drop functionality for ease of use, and its adaptive design ensures compatibility across various devices and platforms. Advanced filtering and search capabilities enable users to efficiently navigate and access relevant supply chain data and insights.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

The Real-Time Data Mesh (RTDM) module 310 is another component of System 300, responsible for ensuring the flow of data within the distribution ecosystem. It aggregates data from multiple sources, harmonizes it, and ensures its availability in real-time.

In a distribution network, the RTDM module collects data from various systems, including inventory management systems, point-of-sale terminals, and customer relationship management systems. It harmonizes this data by aligning formats, standardizing units of measurement, and reconciling any discrepancies. The harmonized data can be then made available in real-time, allowing users to access accurate and current information across the supply chain.

The RTDM module 310 can be configured to capture changes in data across multiple transactional systems in real-time. It employs a sophisticated Change Data Capture (CDC) mechanism that constantly monitors the transactional systems, detecting any updates or modifications. The CDC component can be specifically configured to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging powerful analytics tools and algorithms such as Apache Spark, TensorFlow, or scikit-learn, the AAML module extracts valuable insights from the collected data. It enables advanced analytics, predictive modeling, anomaly detection, and other machine learning capabilities.

For instance, the AAML module can analyze historical sales data to identify seasonal patterns and predict future demand. It can generate forecasts that help optimize inventory levels, ensure stock availability during peak seasons, and minimize excess inventory costs. By leveraging machine learning algorithms, the AAML module automates repetitive tasks, predicts customer preferences, and optimizes supply chain processes.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a holistic and connected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a comprehensive and innovative solution that addresses the challenges faced by fragmented distribution ecosystems. It combines the power of the SPoG UI 305, the RTDM module 310, and the AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain and distribution management.

Figure 4:
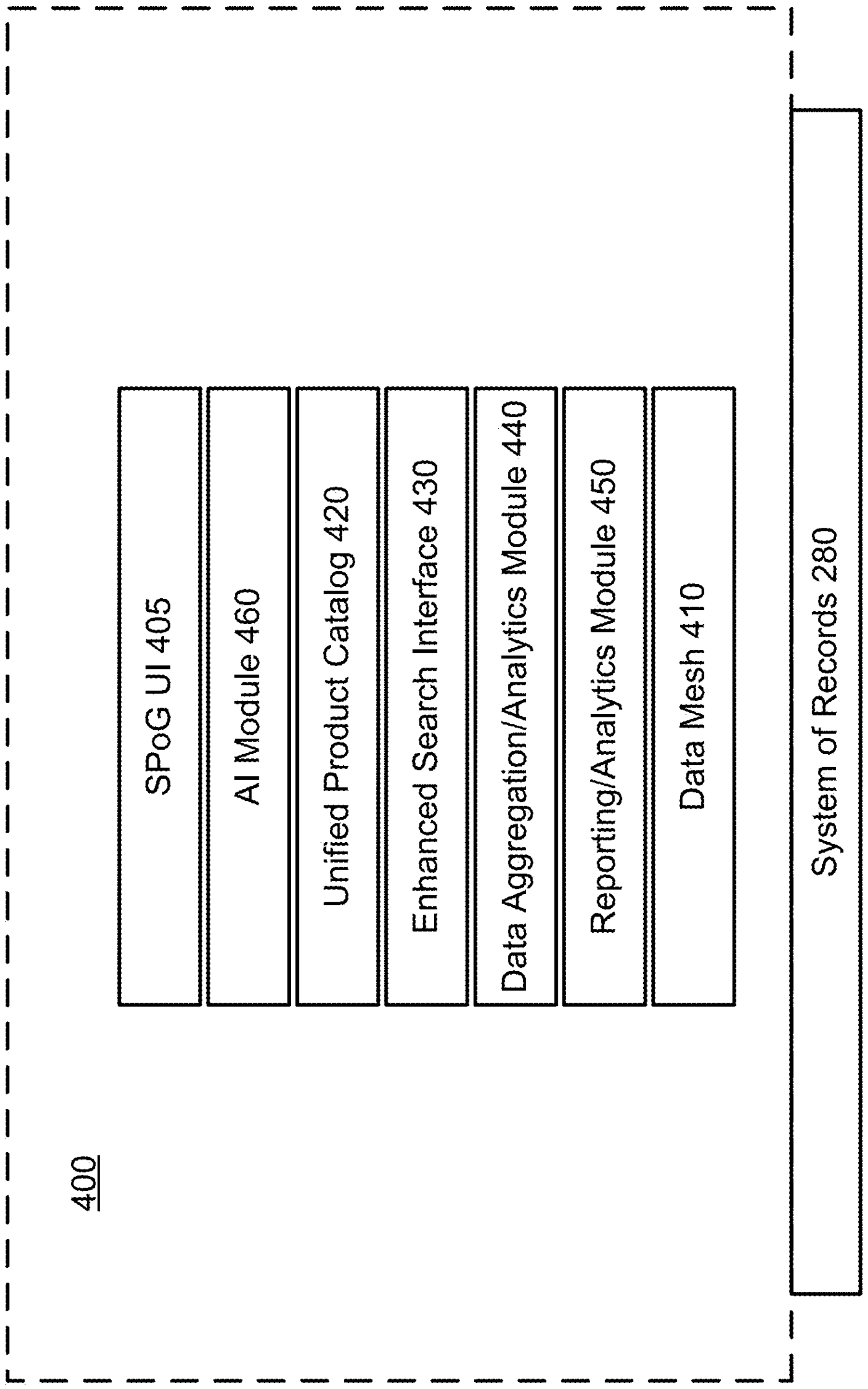
FIG. 4 depicts a system for automated personalized bundling processes, according to an embodiment.

FIG. 4 depicts an embodiment of System 400 for personalized bundling, based on specific user personas. System 400 is configured for integration with existing reseller systems, ensuring efficient data exchange and system synchronization. The embodiment of System 400 enables the creation of customized product and service bundles personalized to specific user requirements and preferences. The system leverages real-time data aggregation and analytics to adaptively configure bundles that incorporate various technology products, including hardware, software, and subscription-based services. This adaptability ensures that the bundling process remains relevant in the face of rapidly evolving technology landscapes and user needs. By integrating AI-driven insights and user interaction data, the system facilitates dynamic bundling strategies that not only address current market trends but also anticipate future shifts. This approach enhances the correlation capabilities with AI models, enabling users to make informed decisions and access comprehensive solutions that align with their unique technological and operational objectives.

The SPoG UI 405 serves as the primary user interface. Users interact with this interface to perform various tasks provides straightforward interaction and customization. It displays information and options that are relevant to the distinct business models and customer demographics of the resellers. It displays real-time data from the Data Mesh 410 and provides controls for initiating actions in System 400. For example, a user can generate a personalized bundle directly from the SPoG UI 405. The SPoG UI is developed using web-based technologies, allowing it to be accessed from various types of devices such as desktop computers, laptops, tablets, and smartphones. SPoG UI 405 provides a comprehensive view of the entire distribution ecosystem, consolidating data and functionalities from various modules into a centralized, easy-to-navigate platform. SPoG UI 405 simplifies the management of complex distribution tasks, offering a streamlined experience for resellers.

Data Mesh 410 is a sophisticated data management layer. It aggregates and harmonizes data from various sources, including ERPs, Vendor platforms, third-party databases, etc. This component ensures that all operational modules in System 400 access consistent and up-to-date information. System 400 can synchronize with existing reseller systems, ensuring efficient data exchange and system functionality System 400 includes the Unified Product Catalog 420, which maintains an extensive and constantly updated list of IT products and services. Integrated with the AI Module 460, it ensures that the catalog reflects the latest market demands and user preferences. This catalog offers a broad spectrum of choices across hardware, software, and cloud solutions, catering to the diverse needs of resellers.

The Enhanced Search Interface 430 optimizes the product and service discovery process. Leveraging natural language processing and user-specific data, this interface facilitates efficient and relevant search outcomes. Enhanced Search Interface 430 can be a component of SPoG UI 405 or a separate component, which is designed for efficient and relevant product and service discovery. Utilizing natural language processing and user data, it streamlines the search process, helping resellers quickly locate the items they need.

Data Aggregation and Analytics Module 440 can be configured for collecting and processing data from diverse sources, including vendor and reseller systems, and external market intelligence to generate insights. The insights generated by this module inform the operations of the AI Module 460 and the Unified Product Catalog 420, helping to understand market dynamics and customer needs. System 400 incorporates the Data Aggregation and Analytics Module 440, responsible for collecting and processing data from various sources. This module supports the Personalization Engine 410 and the Unified Product Catalog 420 with insights, aiding in understanding market dynamics and customer needs.

Data Aggregation and Analytics Module 440 in System 400 plays a pivotal role in maintaining the system's responsiveness to the rapid changes in technology and user needs. This module is designed to continuously gather and analyze data from multiple sources, including real-time market trends, customer feedback, and global technological advancements. It integrates data from enterprise resource planning (ERP) systems, vendor platforms, third-party databases, and direct customer inputs, creating a comprehensive data pool. The module employs sophisticated data processing techniques, such as predictive analytics and sentiment analysis, to extract actionable insights from this vast dataset. For example, if there's a surge in demand for a particular type of software solution in the market, the module quickly identifies this trend and reflects it in the system's recommendations and catalog updates. Similarly, customer feedback, whether it's about product preferences or service experiences, is analyzed and used to refine the product offerings and user interface. This integration ensures that System 400 remains agile and adaptive, effectively responding to the evolving technological landscape and nuanced customer requirements. As a result, resellers using System 400 can confidently navigate the fast-paced IT market, armed with up-to-date insights and a platform that evolves in tandem with industry trends and customer expectations.

AI Module 460 automates various distribution processes, including personalized bundling. According to some embodiments, AI Module 460 can be provided as a Personalized Bundling Module integrated with SPoG UI 405 and Data Mesh 410. AI Module 460 automates and enhances the bundling process. By analyzing purchasing patterns, customer preferences, and market data, this module intelligently suggests bundles that are likely to meet the specific needs of different user personas within the reseller organization. For example, it might suggest a bundle combining specific models of laptops with suitable software suites and cloud services, based on the purchasing history and preferences of the reseller's customers. AI Module 460 uses algorithms to optimize product and service selections based on real-time market data and customer preferences. It employs advanced algorithms to intelligently combine products and services into tailored bundles.

In a non-limiting example, AI Module 460 can include Personalized Recommendation Engine 465 to employ decision tree algorithms and entropy minimization techniques to offer compatible and customized choices to users. In an additional or alternative embodiment Personalized Recommendation Engine 465 can employ machine learning models like neural networks for more tailored and nuanced bundle recommendations. Personalized Recommendation Engine 465 can include Pricing Engine 466 to predict bundle costs, for example, utilizing a multi-variable linear regression model, Random Forest, or other methodologies.

In an embodiment, the Personalized Recommendation Engine 465 interacts with the Data Mesh 410 and SPoG UI 405. Upon receiving a user request, Personalized Recommendation Engine 465 can fetch real-time market and customer data from RTDM. The module can utilize decision tree algorithms with entropy minimization for optimizing bundle choices. Alternatively, machine learning models like neural networks can be employed to refine user choices based on nuanced data patterns. Personalized Recommendation Engine 465 can perform cost prediction and customization. In some embodiments, Pricing Engine 466 employs a multi-variable linear regression model for cost prediction, taking into account variables like base price, customer-specific discounts, and market conditions. An alternative option can implement a Random Forest algorithm for more complex pricing structures.

In some embodiments, Personalized Recommendation Engine 465 can initiate a bundling request via the SPoG UI 405. An Authorization Checker can verify user permissions against role-based access control policies. Bundle Configuration Aggregator 467 can query Data Mesh 410 for current product and service options. In a non-limiting example, the Bundle Configuration Aggregator 467 can assemble bundles using a weighted scoring algorithm. In some embodiments, a Bundle Template Filler 468 can populate a bundle template based on user preferences and market data. An Error-Check Integrator 469 can be configured to review bundle configurations for errors using predefined rules and algorithms.

In some embodiments, Personalized Recommendation Engine 465 can analyze user profiles and historical interaction data utilizing machine learning and pattern recognition algorithms via AI Module 460 to match the one or more bundles with a potential consumer of the matched bundle(s). This can be achieved by employing a compatibility scoring system that evaluates each bundle against patterns associated with a user's preferences, past purchases, etc., and/or patterns associated with forecasting potential future needs. For instance, a technology startup showing interest in scalability and innovation might be recommended a bundle that includes cloud computing services, novel cybersecurity solutions, and collaborative work tools. Personalized Recommendation Engine 465 can analyze associated data to recognize a potential conversion involving that user.

In this regard, AI Module 460 can function as a personalization engine to analyze reseller activities and market trends to generate user-specific offerings, dynamically adapting to changes in user behavior and market conditions. AI Module 460 in operation with Personalized Recommendation Engine 465 can also incorporate advanced filtering algorithms to distinguish between essential and non-essential features of technology solutions, personalizing bundles that align with specific operational requirements and strategic goals of the user. For example, for a small business focused on digital marketing, AI Module 460 can utilize filtering algorithms to prioritize solutions with strong CRM and analytics capabilities, effectively filtering out unrelated enterprise-level infrastructure services.

AI Module 460 can be configured to customize the reseller experience, as described above, facilitating the creation of personalized bundles of hardware, software, and services. AI Module 460 provides a sophisticated engine that harnesses real-time data analytics and user behavior patterns to create personalized product and service bundles. This module utilizes advanced algorithms that analyze a vast array of data points, including historical purchase data, browsing history, and specific user interactions within the platform. By interpreting this data, the AI Module 460 can discern subtle trends and preferences unique to each user persona within the reseller's organization.

For instance, if a user frequently explores cloud storage solutions and cybersecurity software, AI Module 460 correlates these interests with current market offerings and user-specific requirements. It then intelligently combines compatible and complementary products, such as pairing a popular cloud storage service with highly-rated cybersecurity software, thus creating a customized bundle. This process is dynamic, allowing the module to continuously learn and adapt to changing user preferences and market conditions. As a result, AI Module 460 can proactively suggest bundles that are personalized for current needs but also anticipate future requirements, ensuring that the resellers are ahead in meeting customer demands.

AI Module 460 is configured to support a personalized user experience for various personas within a reseller's organization. Each user's interaction with the system is tailored based on their role, preferences, and actions. For instance, a user focused on procurement and finance will see different options and recommendations compared to a user engaged in sales or IT management. AI Module 460 performs generation of personalized bundles based on user personas. This functionality enables System 400 to implement IT distribution via a cloud and software-focused approach. AI Module 460 utilizes AI and ML algorithms to understand the specific needs and preferences of different user personas within a reseller's organization.

For instance, if a user persona within the reseller organization predominantly deals with cloud-based solutions, AI Module 460 identifies and suggests bundles that combine relevant cloud services with complementary hardware and software products. This not only enhances the user experience by providing relevant options but also streamlines the procurement process. Moreover, System 400's ability to offer an agnostic marketplace is integral in addressing the industry's challenge of hyperscalers operating isolated marketplaces. Unlike traditional marketplaces, System 400 provides a platform where resellers can access a wide range of products and services, irrespective of the hyperscaler or manufacturer.

To facilitate access to an extensive array of technology solutions, System 400 integrates with multiple vendor platforms through standardized APIs, ensuring that the most current products and services are available in the Unified Product Catalog 420. Thereby, System 400 supports an agnostic marketplace and generates bundles can be dynamically updated with the most current and relevant solutions, addressing the fast-paced evolution of technology needs.

System 400 also includes a Reporting and Analytics Module 450 that provides detailed insights into customer behavior, market trends, and the effectiveness of the personalized bundles. This module enables resellers to make informed decisions based on data-driven insights, further optimizing their offerings and operations.

System 400 facilitates a scenario where a reseller can cater to diverse customer needs through a single platform. A reseller's representative, for example, can quickly identify and procure bundles that are best suited for that segment, based on the recommendations and data provided by System 400. This process not only enhances efficiency but also ensures that the offerings are aligned with the market demand and customer preferences. System 400 provides a solution for IT distribution combining AI/ML technologies to identify and comply with reseller requirements and market trends. By offering a platform that integrates the creation of personalized bundles based on user personas, System 400 addresses the need for an agnostic marketplace and provides a comprehensive suite of tools for efficient IT distribution.

Figure 5:
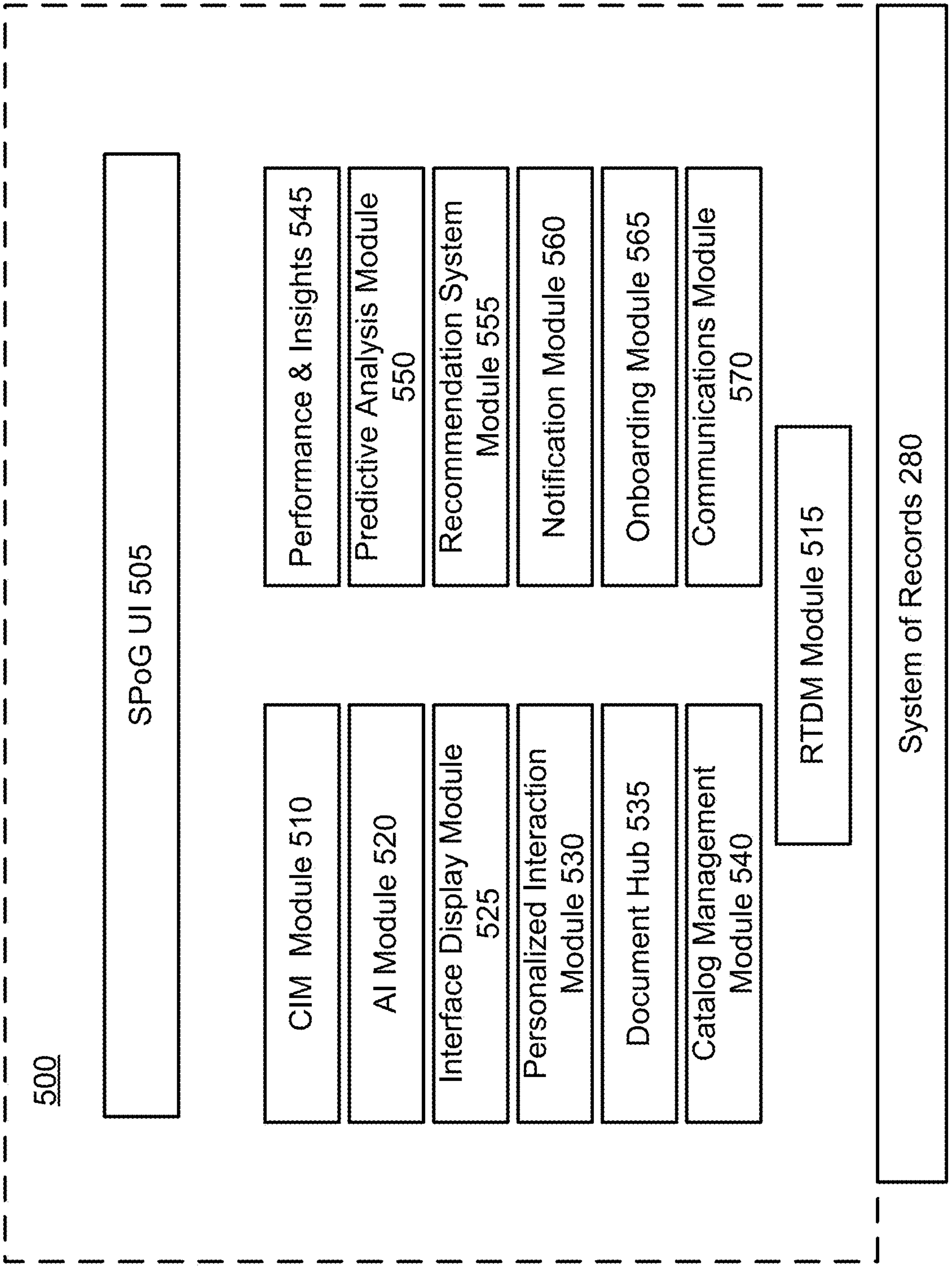
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, can use a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access current and accurate information for informed decision-making.

The AI module 520 within System 500 can use advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of current product catalogs. It ensures that users have access to the latest product information, including specifications, pricing, availability, and promotions. Technologies like Kentico and Akamai can be employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark can be employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico can be employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch can be employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
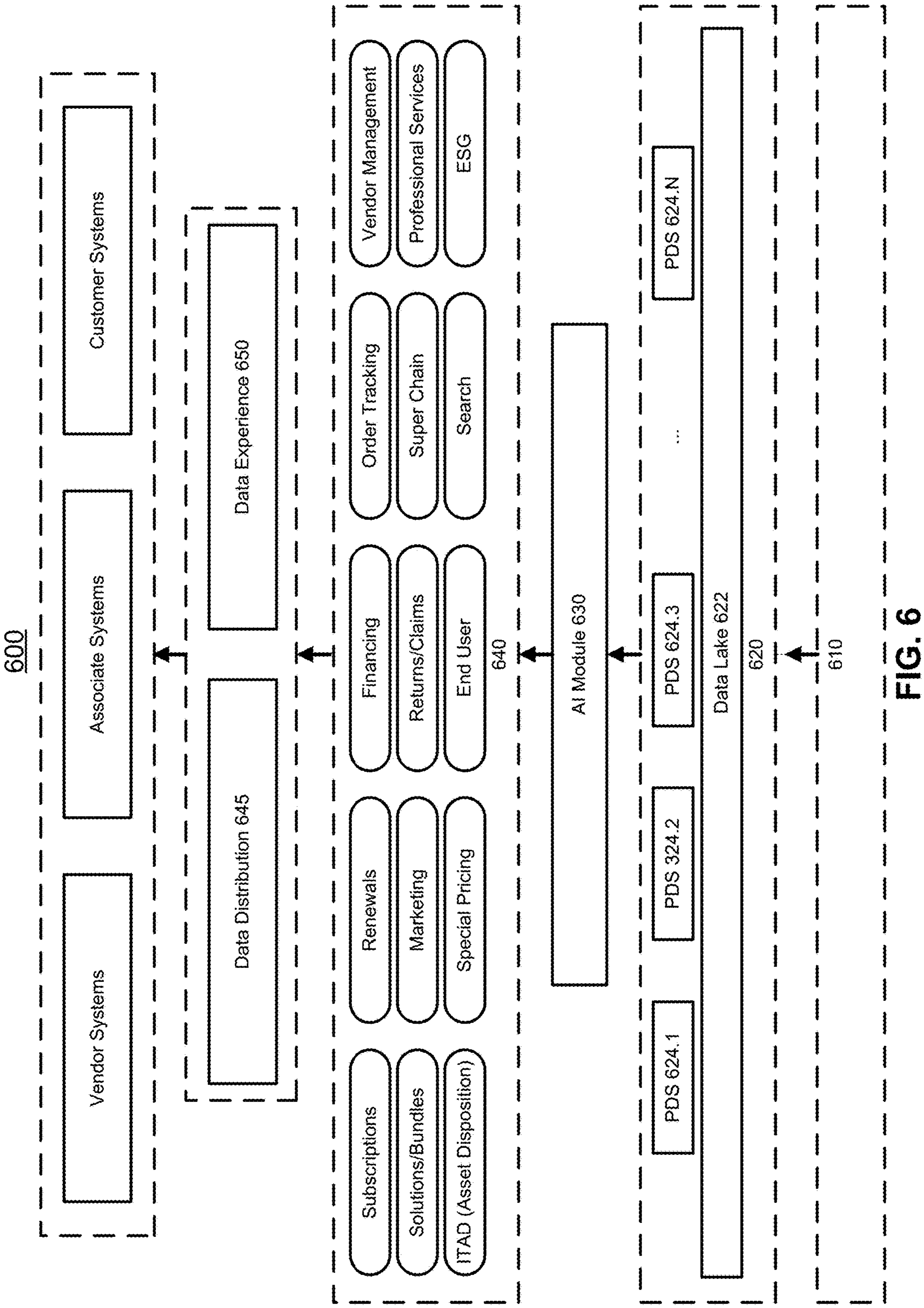
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module can be configured to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds can be established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. Data layer 620 includes data mesh, a cloud-based infrastructure configured to provide scalable and fault-tolerant data storage capabilities. Within the data mesh, multiple Purposive Datastores (PDS) can be deployed to store specific types of data, such as customer data, product data, or inventory data. Each PDS can be optimized for efficient data retrieval based on specific use cases and requirements. The PDSes can be configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data can then be processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability.

Data layer 620 incudes data lake 622, a state-of-the-art storage and processing infrastructure configured to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms can be integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as .NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 can use the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as .NET or Java, and/or distributed computing frameworks like Apache Spark, enables powerful data processing, advanced analytics, and machine learning capabilities. With robust data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and current insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine can be configured to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms can be applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, current information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

Personalized Bundling Based on Personas

Figure 7:
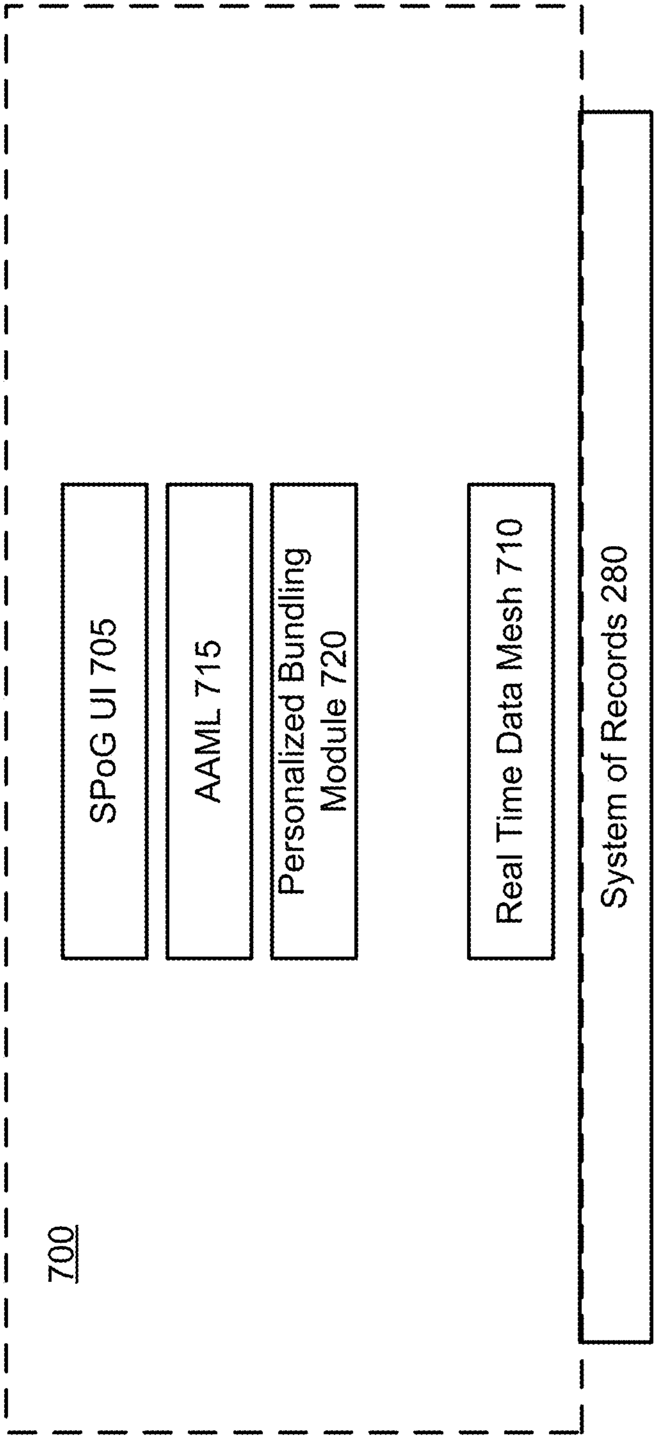
FIG. 7 illustrates a system for automated personalized bundling processes, according to an embodiment.

In an embodiment, FIG. 7 depicts System 700 for personalized bundling based on specific user personas. System 700 includes the Real-Time Data Mesh 710, Single Pane of Glass User Interface (SPoG UI) 705, Advanced Analytics and Machine-Learning (AAML) Module 715, and the Personalized Bundling Module 720. System 700 provides a framework for real-time data processing and analysis, underlining its adaptability to changing technology and user demands. System 700 implements AI and machine learning processes to dynamically curate bundles that personalized to users' current needs but also scalable to accommodate future technological advancements. System 700 can be implemented to integrate hardware, software, and subscription services into cohesive solutions, offering users an intuitive platform to access personalized technology solutions. The integration complies with market adaptations increasingly focused on delivering value through complete solutions rather than individual products, enhancing user engagement and satisfaction through a solution-centric distribution model.

RTDM 710 aggregates and standardizes real-time data from various sources, ensuring that the Personalized Bundling Module 720 operates with the most current and relevant information. This includes data on product availability, user behavior patterns, and market trends. RTDM 710 provides a centralized, unified data hub, aggregating and standardizing data from multiple sources including ERPs, CRM systems, and market intelligence. It employs a combination of data warehousing and data lakes to manage structured and unstructured data. RTDM 710 uses ETL processes and data normalization techniques to ensure data uniformity and accessibility. This standardized data enables the operation of Personalized Bundling Module 720, providing the necessary inputs for accurate and efficient bundle generation. RTDM 710's maintains data integrity and relevance, enabling and facilitating the automated processes of personalized bundling.

In an embodiment, the Personalized Bundling Module 720 includes various functional sub-components designed for the personalized bundling process. These components closely interact with other system components, namely the Single Pane of Glass User Interface (SPoG UI) 705, the Real-Time Data Mesh (RTDM) 710, and the Advanced Analytics and Machine Learning (AAML) Module 715.

Personalized Bundling Module 720 is dedicated to creating customized product and service bundles. It contains sub-routines and algorithms for tasks such as analyzing user behavior, generating personalized product combinations, and applying dynamic pricing. When a user initiates a bundling action from the SPoG UI 705, the request is routed to the Personalized Bundling Module 720 within the AAML 715. The module processes the request, interacts with the Real-Time Data Mesh 710 for the required data, and executes the bundling configuration. The results are then displayed on the SPoG UI 705. Additionally, the Personalized Bundling Module 720 includes a logging mechanism for tracking all configuration changes and user interactions for auditing and optimization purposes.

Personalized Bundling Module 720 employs a combination of machine learning models and heuristic algorithms for bundle recommendation and pricing. It uses decision tree models for determining optimal product combinations and linear regression for dynamic pricing strategies. The module incorporates real-time error-checking algorithms, ensuring the accuracy and feasibility of each bundle. It dynamically adjusts recommendations based on user feedback and market trends, utilizing a feedback mechanism to continually improve its bundling accuracy. This module is essential for delivering customized, relevant, and error-free bundles to users, enhancing customer satisfaction and operational efficiency.

Personalized Bundling Module 720 can employ AAML Module 715 to filter and discern relevant data from irrelevant data in real-time. Personalized Bundling Module 720 can thereby employ advanced filtering algorithms and noise reduction techniques to process vast amounts of data received from the RTDM 710. In one non-limiting example, it may distinguish between vital signals, such as emerging market trends and user engagement metrics, and noise, such as outdated or irrelevant product information. By prioritizing data that accurately reflects current market dynamics and user preferences, Personalized Bundling Module 720 can recognize and recommend potential bundles that are customized to a user's immediate needs and also aligned with offerings and trends that improve conversion. This optimization engine integrates with the Advanced Analytics and Machine Learning (AAML) Module 715, leveraging both historical and real-time data to continuously improve its filtering algorithms and enhance the precision of bundle recommendations Personalized Bundling Module 720 can integrate critical sub-components such as the Bundle Recommendation Engine 720.1, which guides users through the product selection process based on their profiles and preferences. Bundle Recommendation Engine 720.1 can be activated when a user explores products in the SPoG UI 705 and fetch real-time data from the RTDM 710, ensuring that all recommendations are based on current availability and user preferences. This engine can use decision tree algorithms to offer compatible and complementary choices, optimizing the bundling process.

Another sub-component, the Bundle Composition Generator 720.2, assembles a detailed list of products and services for each personalized bundle. It matches user preferences and market trends against real-time inventory data from the RTDM 710, using RESTful APIs or similar data connectors. This component ensures that each bundle is optimally configured to meet user needs and market demands.

Personalized Pricing Adjuster 720.3 dynamically calculates the overall cost for personalized bundles. It fetches real-time pricing data from the RTDM 710 and applies user-specific discounts or promotional offers. This component ensures that the pricing of each bundle is competitive and tailored to individual user profiles.

Personalized Bundling Module 720 also includes an Error-Check Integrator 720.4. This component validates all user selections and bundle configurations using algorithms stored in the AAML 715. It ensures that each personalized bundle is free from errors and inconsistencies before finalization.

Personalized Bundling Module 720 supports JSON and XML data formats for bundle generation and customization. This flexibility allows it to cater to a wide range of user preferences and system requirements.

AAML Module 715 operates like the central processing unit for the personalized bundling process. It contains intelligent rules and algorithms designed for specific tasks in the bundling process, such as analyzing user behavior, optimizing product combinations, and applying dynamic pricing. AAML Module 715 can utilize analytics tools for big data processing and for deep learning. AAML Module 715 can conduct sentiment analysis, trend forecasting, and behavioral analytics to understand and anticipate user needs. AAML Module 715 incorporates and trains machine learning algorithms based on historical data sets to identify patterns and make predictive recommendations. It adapts its algorithms based on continuous feedback loops, refining its predictive accuracy over time. This module performs functions corresponding to the automated bundling process, ensuring that recommendations are tailored to individual user profiles and preferences.

Thereby, System 700 is configured to integrate data from multiple sources into a unified interface via the SPoG UI 705, automate various tasks in the personalized bundling process via the AAML 715, and maintain a real-time, standardized data repository via the RTDM 710. This architecture enables efficient, accurate, and user-specific bundling processes, enhancing the overall customer experience in the IT distribution industry.

Figure 8:
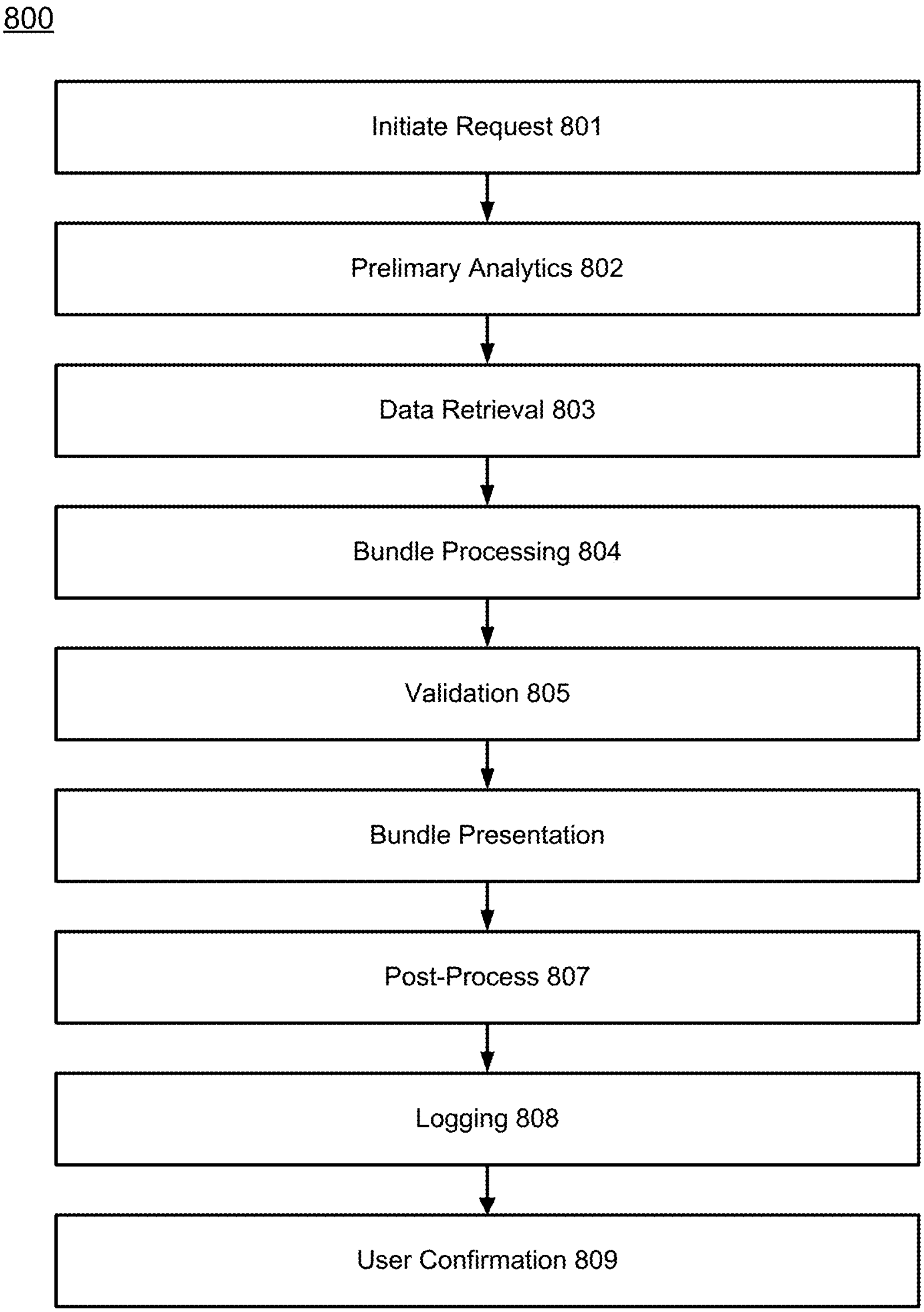
FIG. 8 is a flow diagram of a method for automated personalized bundling processes, according to some embodiments of the present disclosure.

FIG. 8 depicts a flow diagram of method 800 for personalized bundling processes, according to embodiments of the present disclosure. This flow details operations from initiation to completion, focusing on the Personalized Bundling Module 720 in System 700.

At Operation 801, the user initiates the bundling process by interacting with the Single Pane of Glass User Interface (SPoG UI) 705. Operation 801 includes collection of user inputs such as product preferences and specific requirements. SPoG UI 705 then communicates with the Advanced Analytics and Machine Learning (AAML) Module 715 to process these inputs.

At Operation 802, the AAML Module 715 conducts preliminary analytics to discern the user's specific needs for bundling. Algorithms within AAML 715 analyze the user's input to determine the optimal bundle recommendations, taking into account factors such as past purchasing behavior and current market trends.

At Operation 803, the request is forwarded to the Real-Time Data Mesh (RTDM) 710. RTDM 710 retrieves data pertinent to the user's preferences, including real-time inventory status and related product information, utilizing RESTful APIs for these operations.

At Operation 804, the Personalized Bundling Module 720 processes the request. This module, utilizing components like the Bundle Recommendation Engine 720.1 and Bundle Composition Generator 720.2, creates a customized bundle. The Bundle Recommendation Engine 720.1 employs algorithms to select products and services that align with the user's preferences, while the Bundle Composition Generator 720.2 assembles these into a coherent bundle.

Operation 804 can include Personalized Bundling Module 720 using filtering and/or pattern recognition processes to refine a proposed bundle. The operation can leverage the advanced filtering algorithms and noise reduction techniques to evaluate a preliminary bundle configuration against current market trends and user-specific data, ensuring the inclusion of only the most relevant and compatible products and services. Personalized Bundling Module 720 processes aggregated data from RTDM 710, identifying and prioritizing key signals, such as user preference trends, compatibility of selected products, and real-time market data, while effectively filtering out irrelevant information. This optimization ensures that each bundle is not only tailored to the specific needs and preferences of the user but also reflects the latest available technology solutions, thereby enhancing the value and appeal of the personalized bundle.

In some embodiments, Personalized Bundling Module 720 can cross-reference the optimized bundle against a set of predefined rules and criteria to ensure compatibility and compliance with industry standards. In a non-limiting example, this may include checking for the latest versions of software, hardware compatibility, and service agreement terms, ensuring that the bundle meets all necessary requirements for a seamless user experience. Such adjustment can ensure that a final bundle recommendation is personalized and relevant for immediate implementation by associated users.

At Operation 805, a validation step by the Error-Check Integrator 720.4 ensures the accuracy and feasibility of the proposed bundle. This integrator uses algorithms stored in the AAML 715 to verify the integrity of the bundle.

At Operation 806, the personalized bundle, including detailed components and pricing, is presented back to the user on the SPoG UI 705 for review and confirmation.

At Operation 807, machine learning models within the Personalized Bundling Module 720 conduct a post-process analysis. These models, using techniques like predictive analytics, refine the bundling process, enhancing future recommendations based on evolving user data and market conditions.

At Operation 808, a logging mechanism within the Personalized Bundling Module 720 records transaction details, including user preferences and the final bundle composition, for future analysis and continuous improvement of the system.

At Operation 809, the user reviews and confirms or modifies the bundle presented on the SPoG UI 705. Upon user confirmation, the personalized bundling process is completed.

This operational flow integrates SPoG UI 705, RTDM 710, AAML 715, and the Personalized Bundling Module 720, each performing specific functions to automate and optimize the personalized bundling process. Alternative embodiments could include variations in machine learning algorithms, data retrieval methods, and user interaction interfaces, providing adaptability and scalability to System 700.

Figure 9:
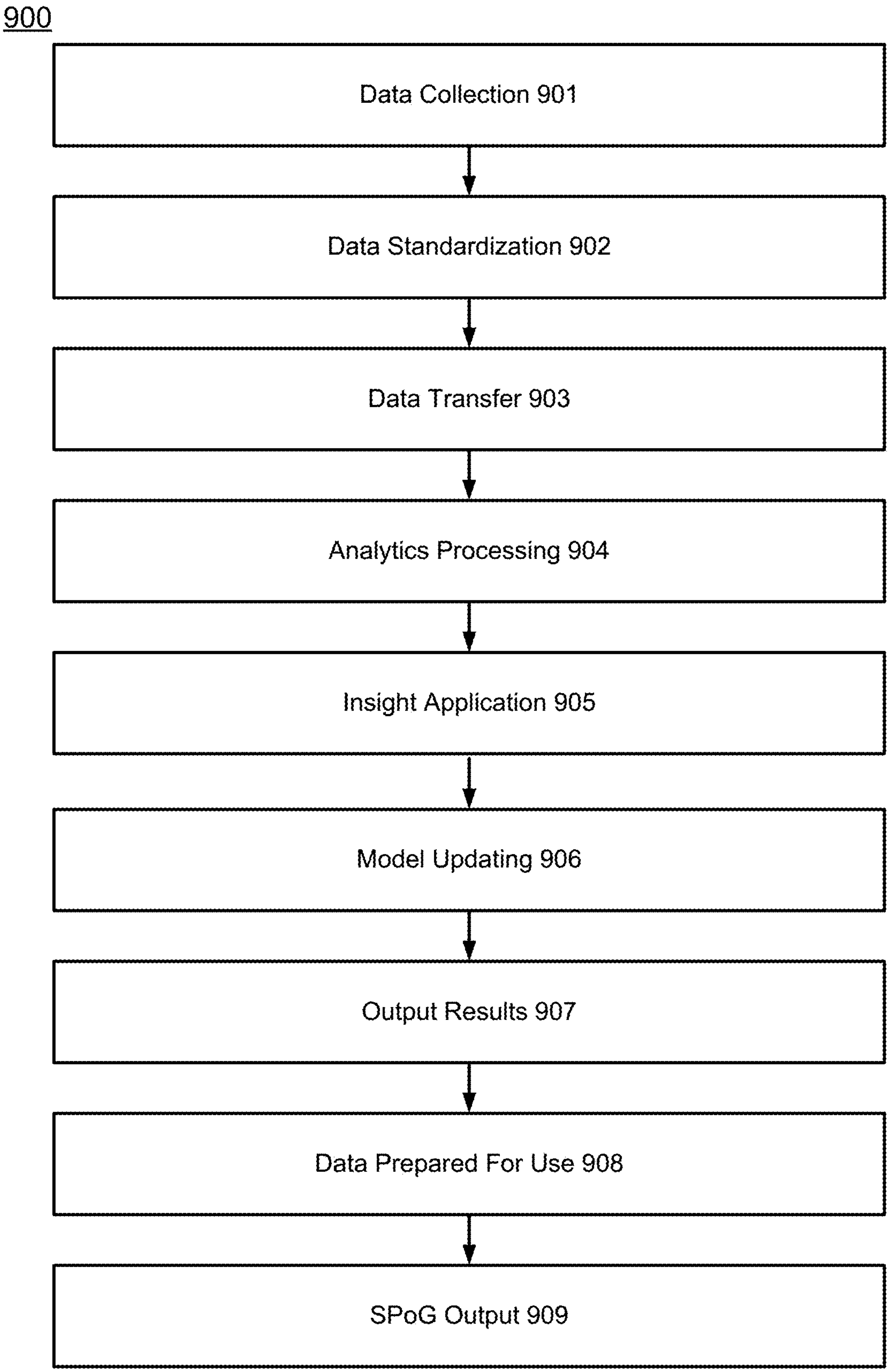
FIG. 9 is a flow diagram for automated data processing and analytics processes in a personalized bundling system, according to some embodiments of the present disclosure.

FIG. 9 illustrates a flow diagram of method 900 for data processing and analytics, for example, utilizing system 700 including Real-Time Data Mesh 710 and the Advanced Analytics and Machine Learning (AAML) Module 715. Method 900 illustrates the sequence of operations involved in aggregating, transforming, and utilizing data for real-time analytics and insight generation.

At Operation 901, the process begins with data collection. Various data sources, such as enterprise resource planning (ERP) systems, vendor platforms, third-party databases, and direct user inputs, feed into the Real-Time Data Mesh 710.

This step involves aggregating diverse data types, including inventory levels, user behavior data, market trends, and product information.

At Operation 902, the aggregated data undergoes standardization and transformation within the Real-Time Data Mesh 710. This includes aligning data formats, normalizing measurements, and resolving data discrepancies. The RTDM 710 ensures that the data is processed into a uniform format suitable for subsequent analytics.

At Operation 903, the standardized data is transferred from the RTDM 710 to the AAML Module 715. This transfer is facilitated through secure and efficient data communication protocols, ensuring the integrity and reliability of the data.

At Operation 904, the AAML Module 715 begins its analytics process. Advanced algorithms and machine learning models within this module analyze the incoming data to extract meaningful insights. This includes identifying patterns, predicting market trends, and understanding user behavior.

Given the diverse nature of the data (user behaviors, market trends, inventory data), some embodiments can include performing segmentation at operation 904 based on both user characteristics (demographics, purchase history) and product categories. This segmentation can be performed to enable or improve targeted and relevant analysis. In some embodiments, operation 904 can include predictive modeling, wherein AAML Module 715 can implement one or more statistical methods (such as regression analysis for sales forecasting, for example) and/or machine learning techniques (such as neural networks for complex pattern recognition and demand prediction). As described herein, these models can be continuously refined with incoming data to improve their accuracy.

In some embodiments, operation 904 can include sentiment analysis, such as processing customer feedback and market sentiment data using NLP models trained on large text corpora, for example. Sentiment analysis can enable an understanding of customer satisfaction and market perceptions for personalizing the offerings in the Personalized Bundling Module 720.

At Operation 905, the AAML Module 715 uses the derived insights to inform various functions within System 700. Specifically, these insights contribute to the operational efficiency of the Personalized Bundling Module 720. In some embodiments, predictive analytics and trend analysis can enhance the accuracy and relevance of product bundle recommendations.

In some embodiments, Operation 905 can include generation by Personalized Bundling Module 720 and/or retrieval of detailed customer profiles based on behavioral analytics to tailor product and service bundles. Customization can utilize deep insights such as customer lifestyle indicators, past purchasing patterns, time-sensitive factors like recent browsing history, and the like. In a non-limiting example, if analytics indicate a customer's growing interest in sustainable products, the bundling module adjusts its algorithms to prioritize eco-friendly options in their product bundles.

In some embodiments, Operation 905 can include translating data-driven insights and analysis into practical implementations by AAML Module 715 to create tailored product and service bundles applicable to different user personas. Insights generated by AAML Module 715 based on patterns, trends, and the like, identified at Operation 904. Operation 905 can include leveraging this information to dynamically adjust product and bundle offerings in real-time. For example, if AAML Module 715 detects a surge in a particular product or category, the Personalized Bundling Module 720 can immediately incorporate such trends into bundling options. Real-time integration ensures that the bundling recommendations remain relevant and meaningful to users, enhancing user engagement.

In some embodiments, Operation 905 can include Personalized Bundling Module 720 implementing dynamic pricing models based on insights into market demand and/or customer price sensitivity. For example, Operation 905 can include adjusting prices in response to various factors such as inventory levels, competitor pricing, and customer willingness to pay. Personalized Bundling Module 720 may, for example, use machine learning models via AAML Module 715 to predict an optimal price point for each bundle, maximizing both revenue and customer satisfaction.

Secondly, trend analysis conducted by AAML Module 715 informs the Personalized Bundling Module 720 about current market dynamics. This analysis includes evaluating user engagement metrics, purchase histories, and feedback patterns to identify what combinations of products or services are resonating with different customer segments. For instance, if a rising trend in eco-friendly products is detected among a certain user demographic, the Personalized Bundling Module 720 can adjust its algorithms to prioritize these products in its bundle recommendations for that segment.

Moreover, the insights from AAML Module 715 enable the Personalized Bundling Module 720 to fine-tune its recommendation engine. This involves adjusting the weightage of different user attributes and behaviors in its algorithm. For example, if the insights indicate a higher correlation between recent browsing history and purchasing decisions, the recommendation engine might be calibrated to give more weight to browsing data.

In addition to influencing product bundle recommendations, the insights from AAML Module 715 also guide dynamic pricing strategies within the Personalized Bundling Module 720. By understanding the price sensitivity of different user groups and market demand curves, the module can dynamically adjust prices for personalized bundles, enhancing sales potential and customer satisfaction.

Furthermore, these insights contribute to improving the user interface and experience of the SPoG UI 705. By understanding user preferences and behaviors, the UI can be optimized to present the most relevant information and options to the users, enhancing their engagement and simplifying their decision-making process.

In summary, Operation 905 within System 700 is a pivotal process where the analytical outcomes of the AAML Module 715 are translated into actionable strategies and operational enhancements, particularly for the Personalized Bundling Module 720. This operation ensures that the system remains agile, responsive, and aligned with the evolving needs and behaviors of its users.

At Operation 906, the AAML Module 715 continuously updates its algorithms and models based on the latest data. This iterative learning process ensures that the analytics component of the system remains dynamic and adapts to changing market conditions and user needs.

At Operation 907, the AAML Module 715 communicates the analytics results back to the Real-Time Data Mesh 710. This step involves updating the RTDM 710 with new insights, ensuring that the data mesh always contains the most current and processed information.

At Operation 908, the Real-Time Data Mesh 710, now updated with the latest insights, becomes ready to support subsequent data requests from various components of System 700. This ensures a continuous cycle of data processing and utilization, maintaining the system's effectiveness and responsiveness.

At Operation 909, the SPoG UI 705 accesses the updated data from the RTDM 710. This enables the user interface to reflect the most current data and insights, enhancing user experience and decision-making capabilities.

Method 900, as depicted in FIG. 9, integrates the Real-Time Data Mesh 710 and the AAML Module 715 for efficient data processing, analytics, and utilization. This methodology ensures that the system is informed by real-time data and insights, significantly contributing to the personalized bundling process and overall system performance. Alternative embodiments of this method could include variations in data sources, analytical models, and communication protocols, offering adaptability and scalability to the data processing and analytics operations within System 700.

Figure 10:
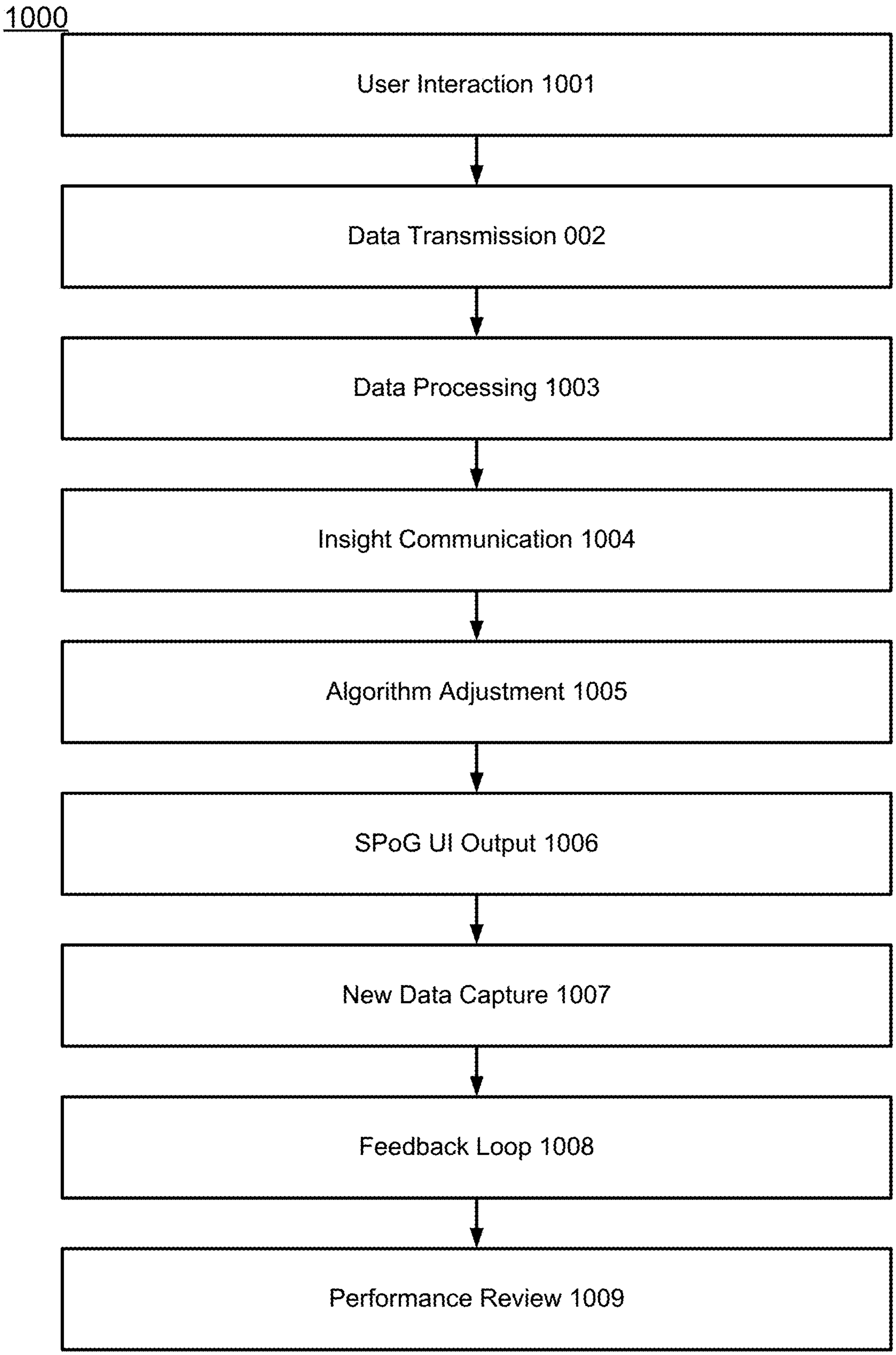
FIG. 10 is a flow diagram for automated user interaction and feedback processes in a personalized bundling system, according to some embodiments of the present disclosure.

FIG. 10 depicts a flow diagram of method 1000 for user interaction and feedback in System 700. Method 1000 performs functions for incorporating user interactions to enable the system's continuous improvement and training.

At Operation 1001, the process begins with user inputs and selections made in the SPoG UI 705. Users interact with the interface by selecting products, indicating preferences, and providing feedback. Operation 1001 can include capturing real-time user behavior and preferences.

At Operation 1002, the collected user data from SPoG UI 705 is transmitted to the Real-Time Data Mesh 710. Here, the data is aggregated with other relevant information, such as current market trends and inventory status, preparing it for analysis.

At Operation 1003, the enriched data is forwarded from the RTDM 710 to the AAML Module 715. The AAML Module 715 then processes this data, using advanced analytics and machine learning algorithms to derive insights about user behavior, preferences, and feedback.

At Operation 1004, the AAML Module 715 communicates the processed insights to the Personalized Bundling Module 720. These insights include user satisfaction scores, bundle success rates, and other relevant metrics that are critical for refining the bundling process.

At Operation 1005, the Personalized Bundling Module 720 utilizes these insights to adjust and improve its bundling algorithms. This step involves updating bundle recommendations, personalization strategies, and user interaction protocols to better align with user expectations and market demands.

At Operation 1006, the updated bundling strategies and recommendations are implemented in the SPoG UI 705. Users interact with these updated interfaces and offerings, providing a continuous loop of interaction and feedback.

At Operation 1007, user responses to the updated strategies are again captured by the SPoG UI 705. This includes both explicit feedback, such as user ratings or comments, and implicit feedback, like click patterns and time spent on different pages.

At Operation 1008, this new set of user data is sent back to the RTDM 710 and subsequently to the AAML Module 715, perpetuating the cycle of feedback and improvement. This ongoing process ensures that the system adapts and evolves in response to user interactions.

At Operation 1009, performance metrics and user satisfaction scores are periodically reviewed to measure the effectiveness of the iterative improvements. This could involve analyzing trends over time, comparing user engagement metrics before and after changes, and evaluating overall system performance.

Method 1000, as illustrated in FIG. 10, establishes a comprehensive feedback loop within System 700, integrating user interaction data from the SPoG UI 705 with the analytical capabilities of the AAML Module 715 and the operational adjustments in the Personalized Bundling Module 720. This method underscores the importance of user feedback in the continuous enhancement of the system, ensuring that the system remains responsive and adaptive to user needs and market changes. By capturing and utilizing real-time user interactions, System 700 dynamically evolves, offering increasingly refined and personalized bundle recommendations. This ongoing feedback loop not only improves user satisfaction but also contributes to the overall efficiency and effectiveness of the bundling process.

Thereby, method 1000 establishes a process for continuous learning and adaptation within System 700. By effectively integrating user feedback into the system's operational framework, it ensures that the SPoG UI 705, the Real-Time Data Mesh 710, the AAML Module 715, and the Personalized Bundling Module 720 are consistently aligned with user preferences and market dynamics. This adaptive approach is key to maintaining the relevance and effectiveness of the personalized bundling process, ultimately enhancing user experience and system performance. Alternative embodiments of method 1000 could include variations in data collection methods, feedback processing algorithms, and user interaction interfaces, providing adaptability and scalability to the user interaction and feedback loop operations within System 700.

Figure 11:
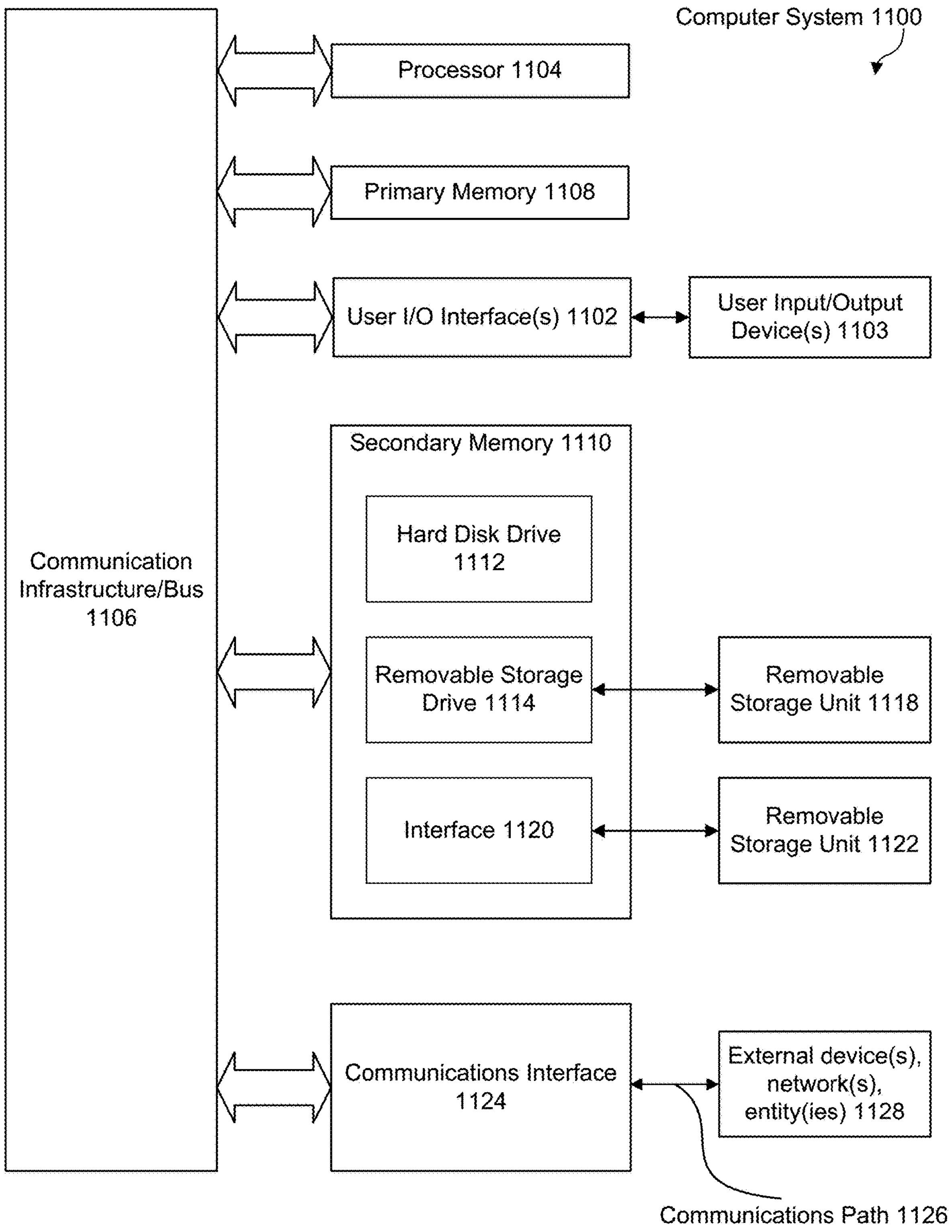
FIG. 11 is a block diagram of example components of device, according to some embodiments of the present disclosure.

FIG. 11 depicts a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Figure 12A:
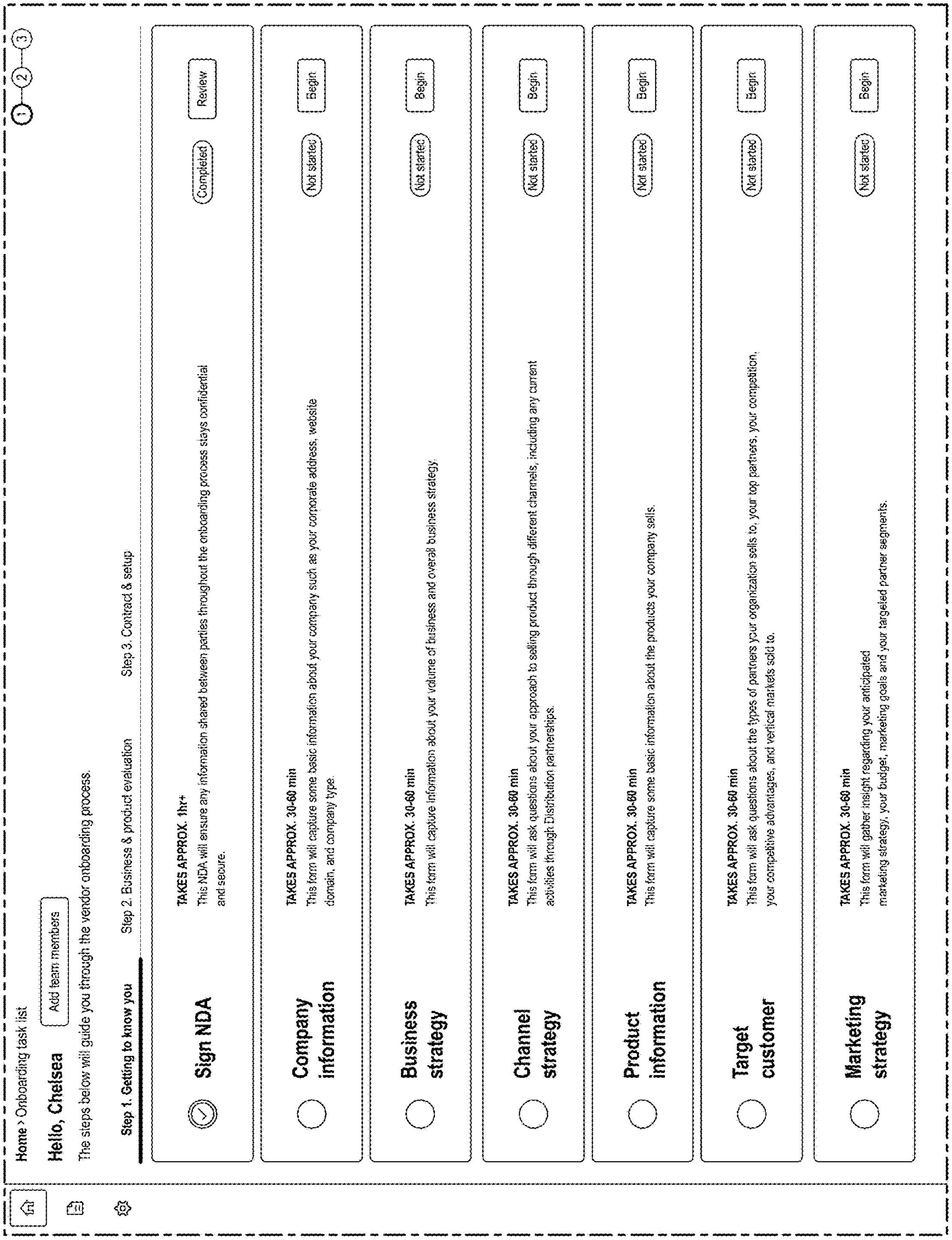
FIGS. 12A to 12Q depict various screens and functionalities of the SPoG UI, according to some embodiments.
Figure 12B:
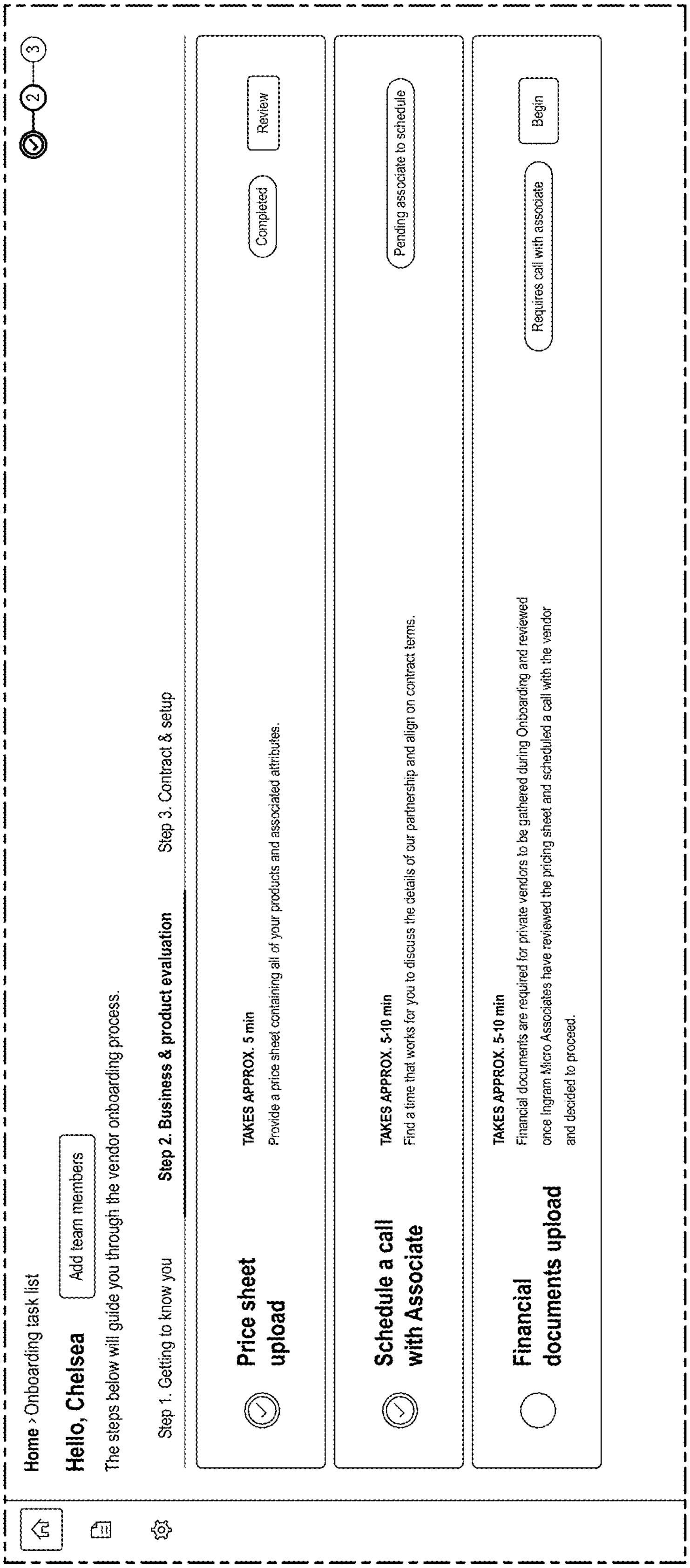
Figure 12C:
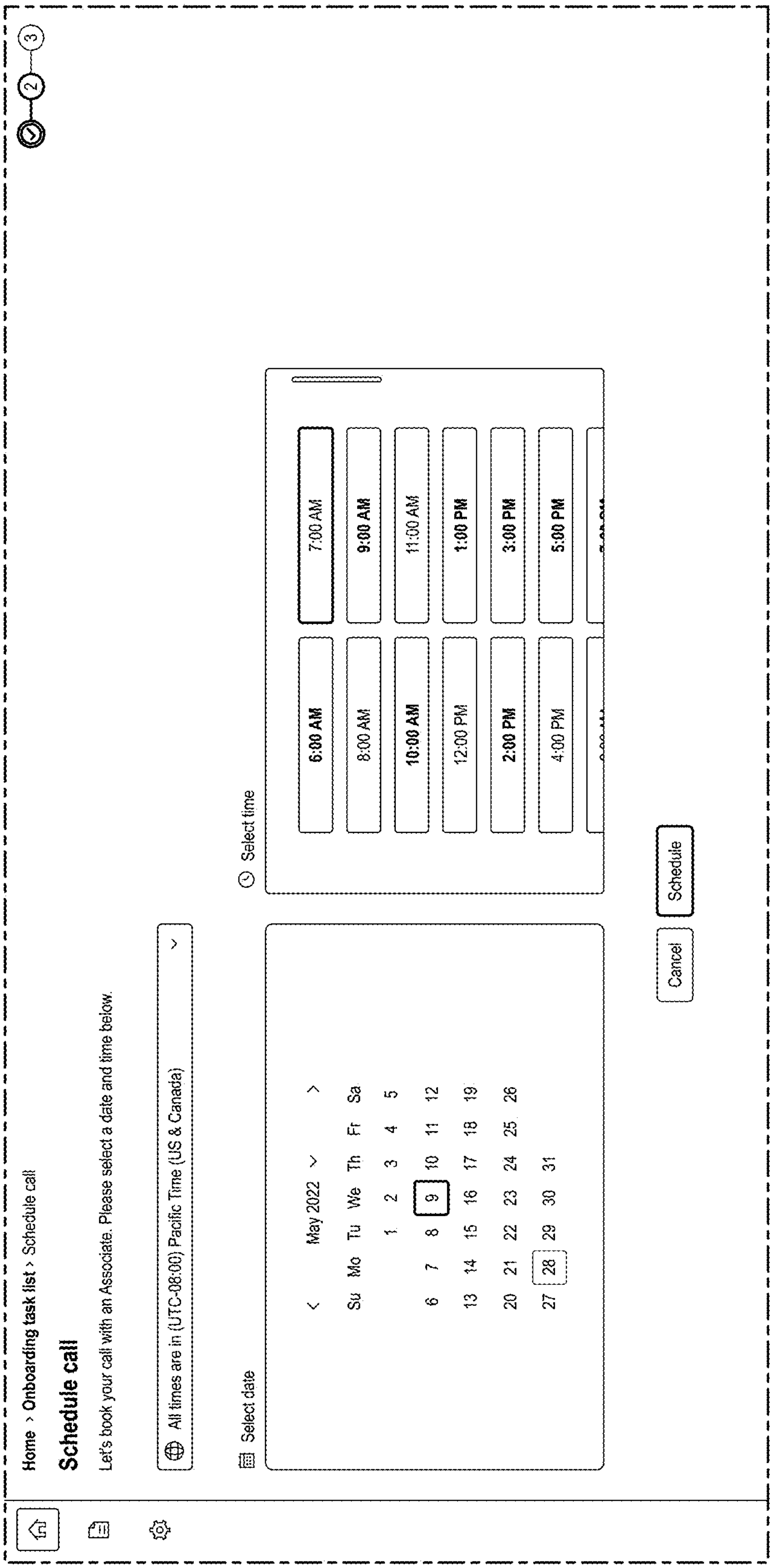
Figure 12D:
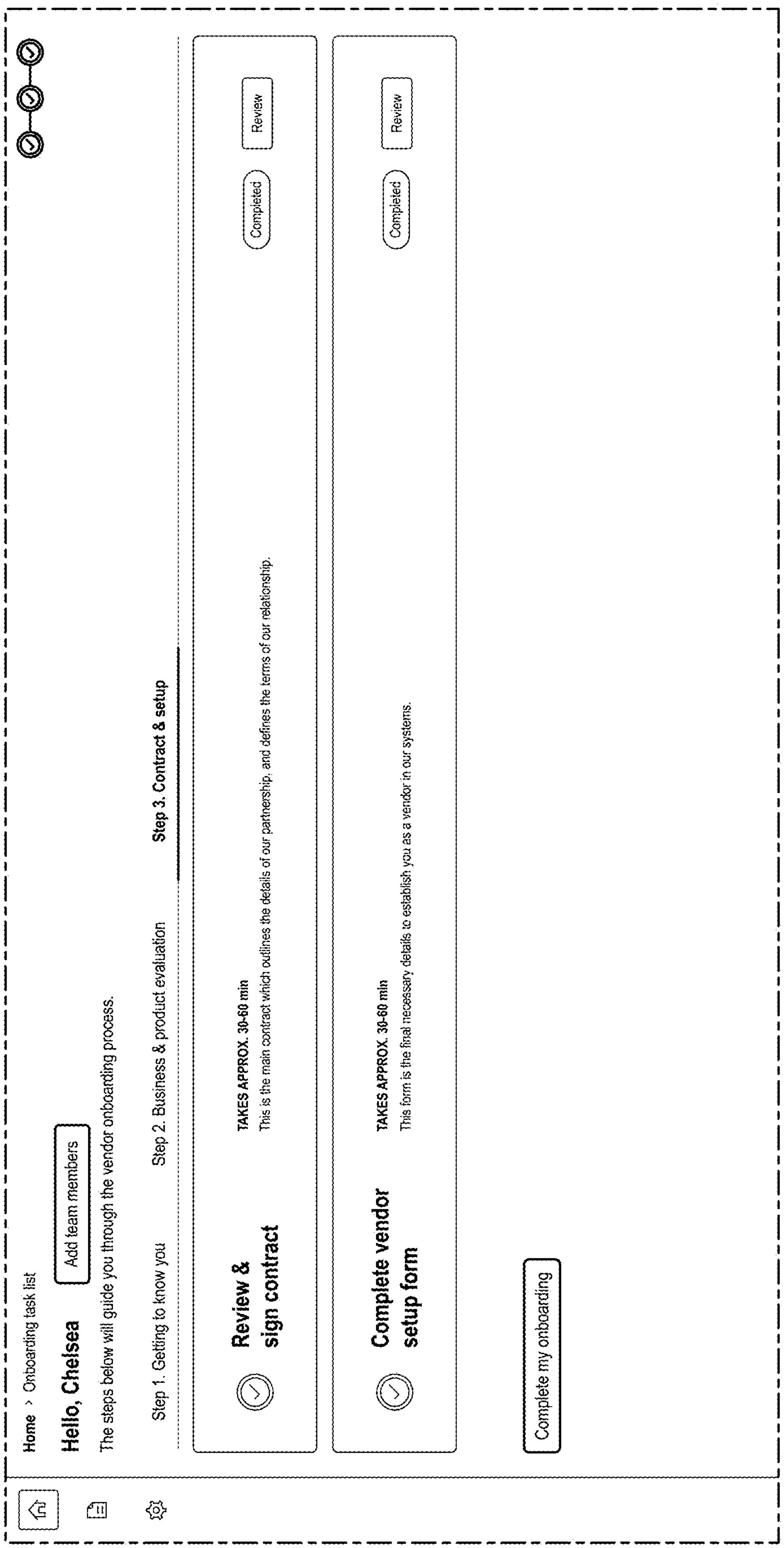
Figure 12E:
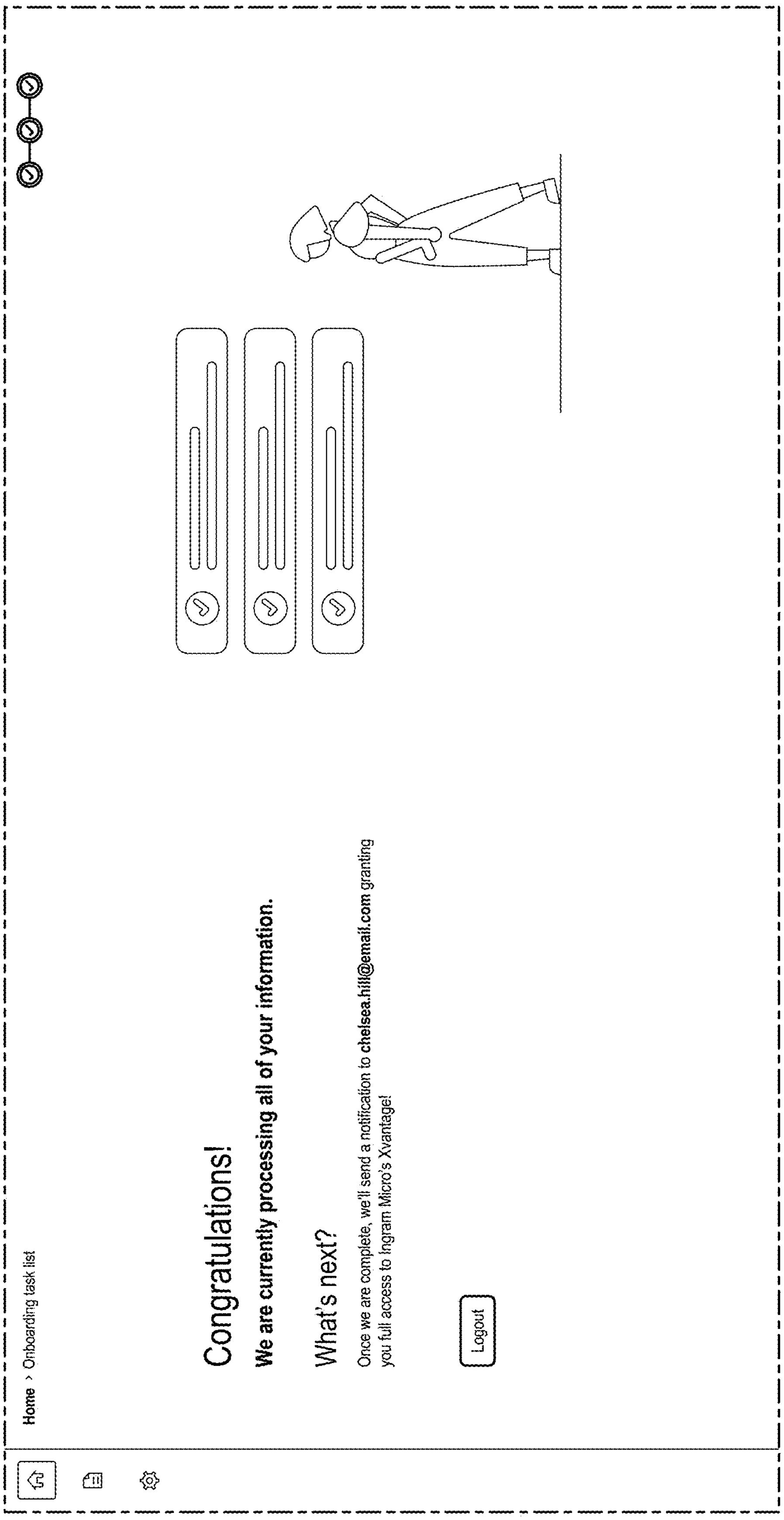
Figure 12F:
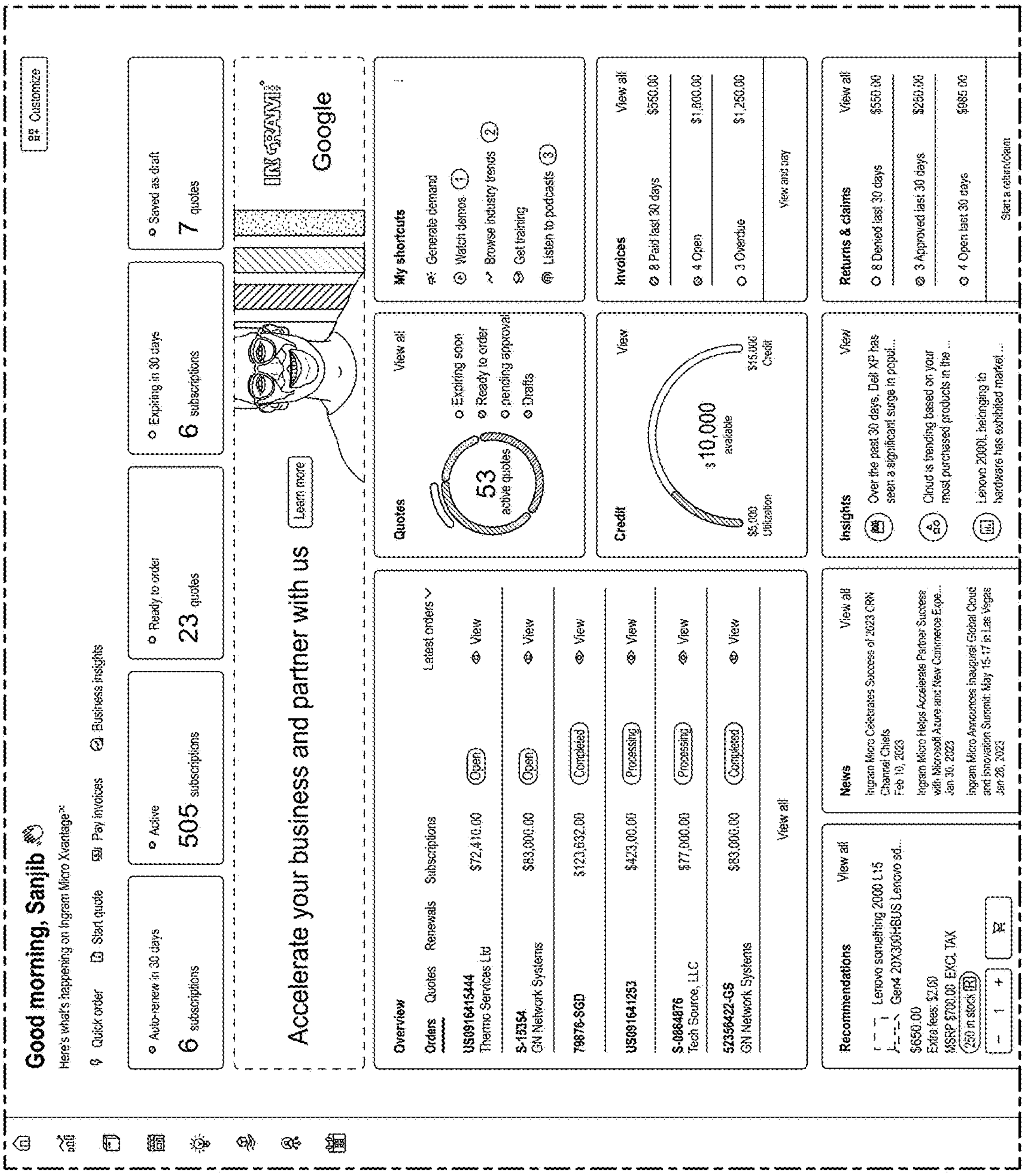
Figure 12G:
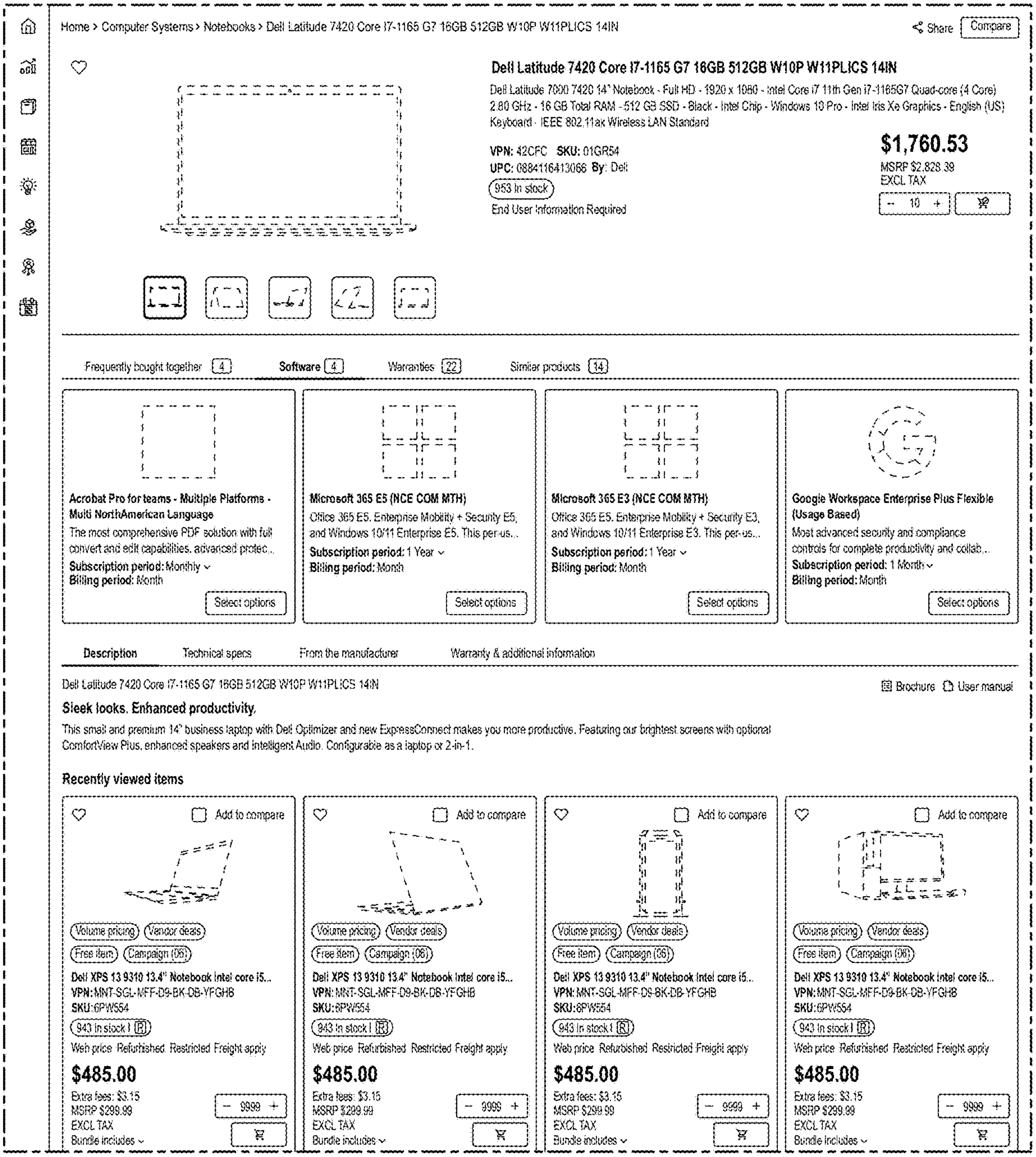
Figure 12I:
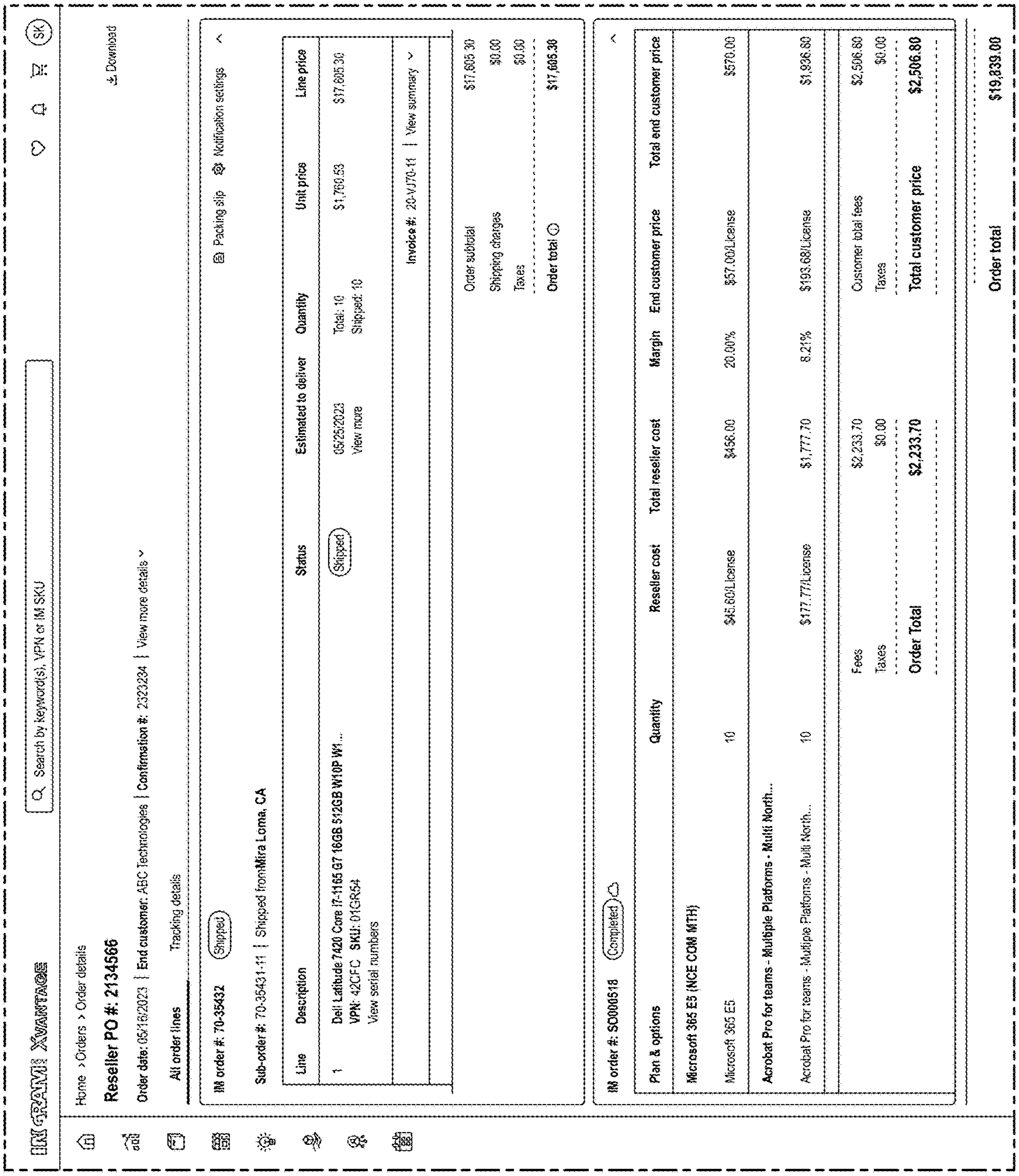
Figure 12J:
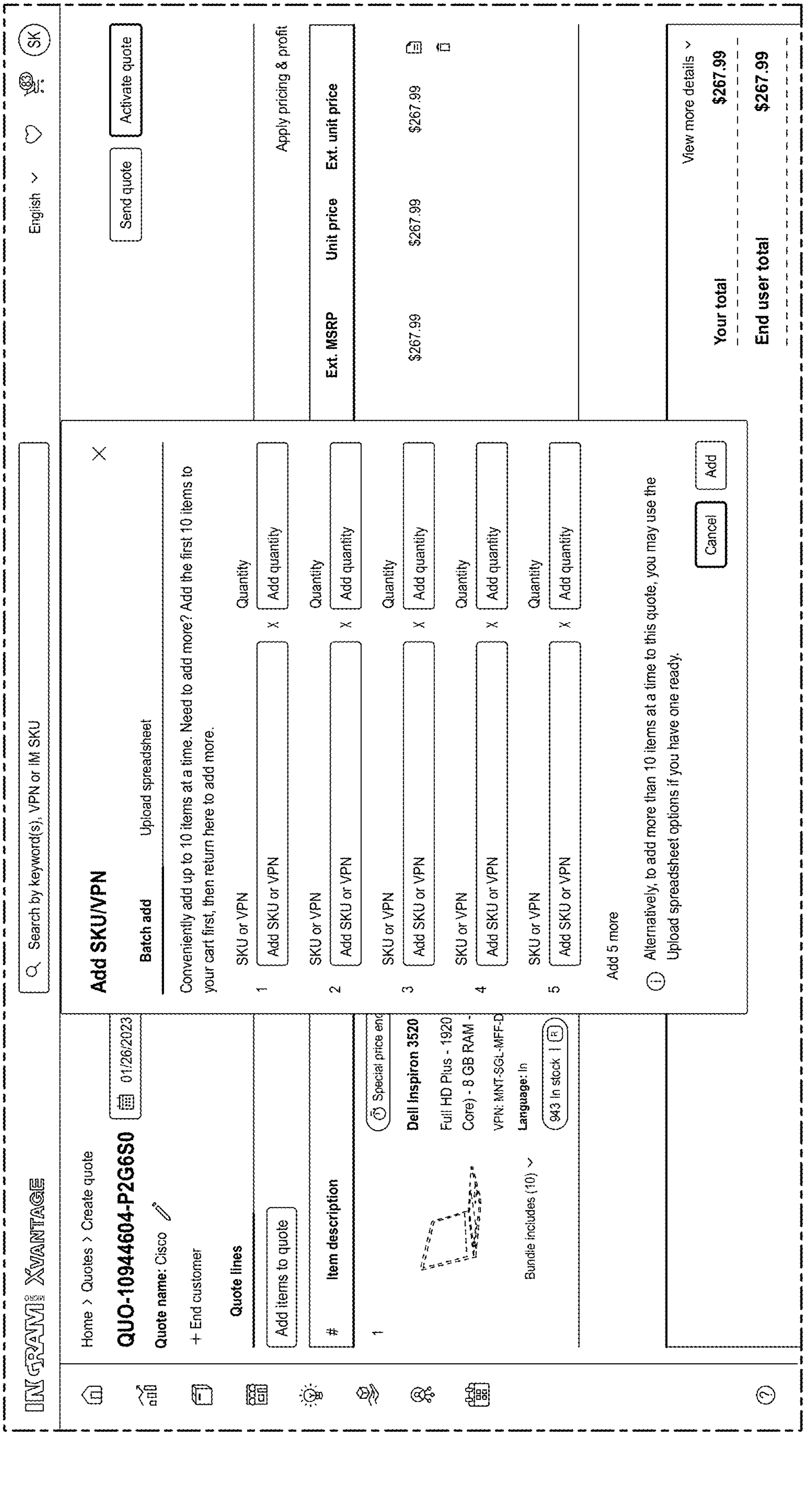
Figure 12K:
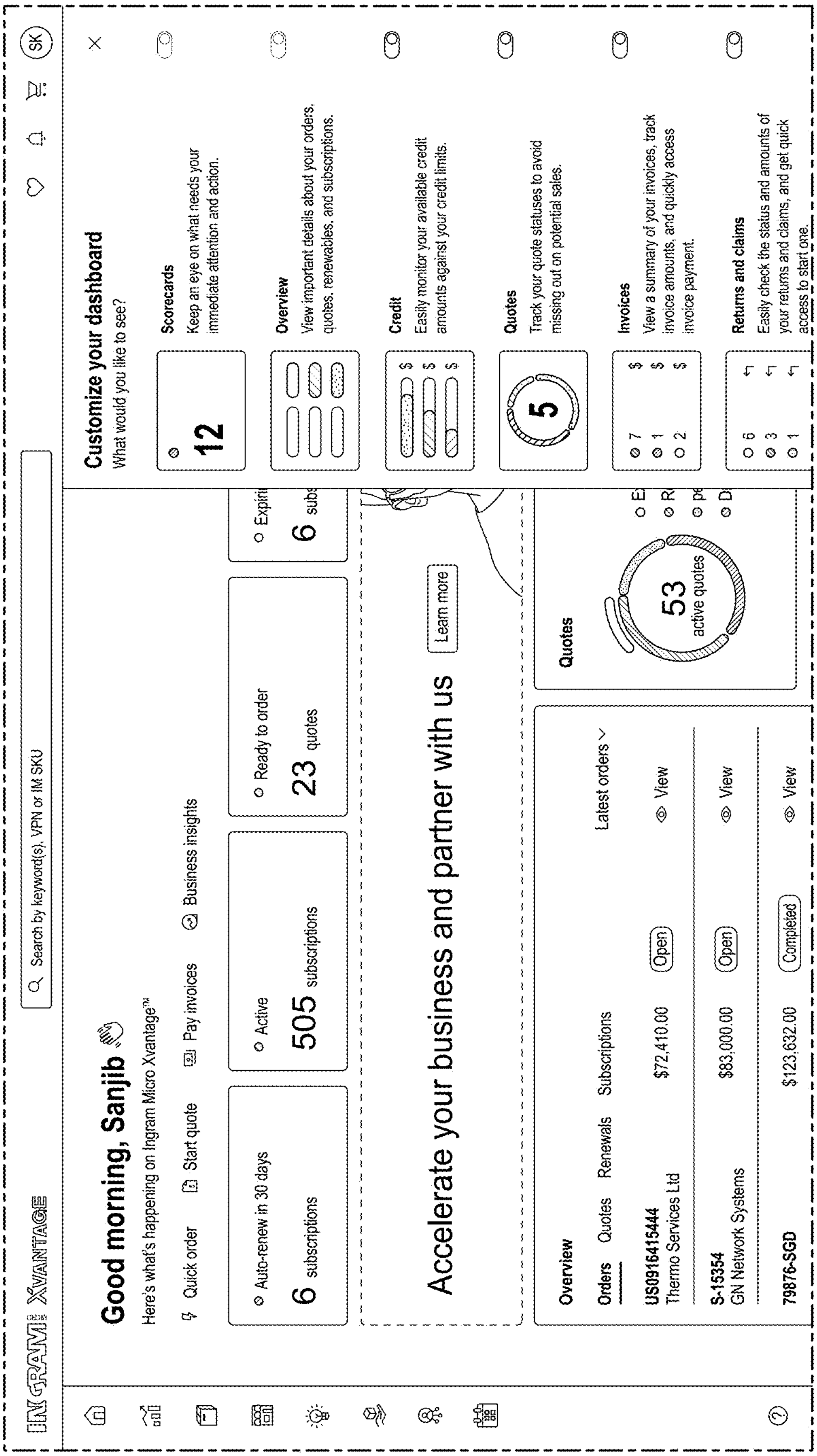
Figure 12L:
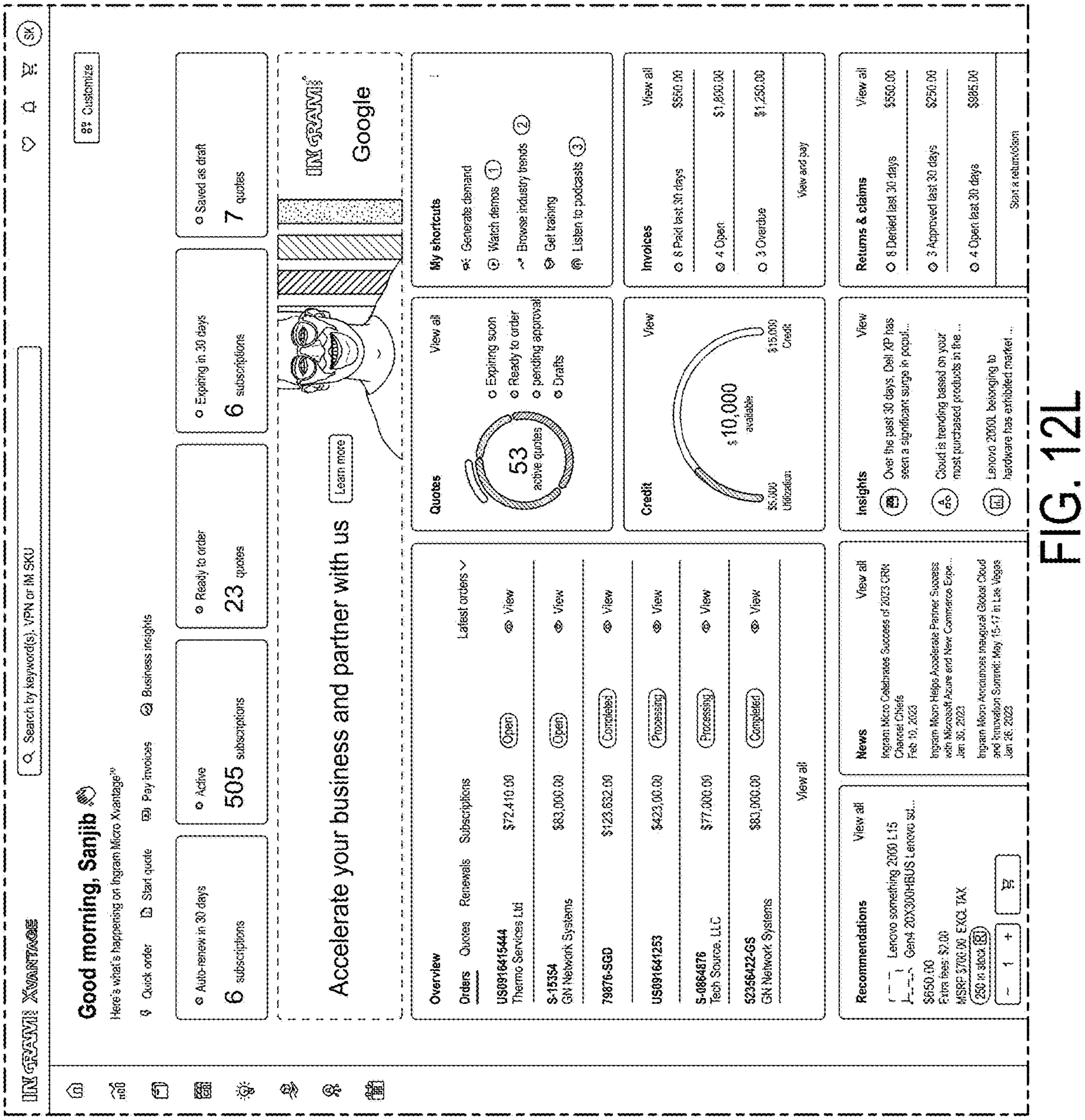
Figure 12M:
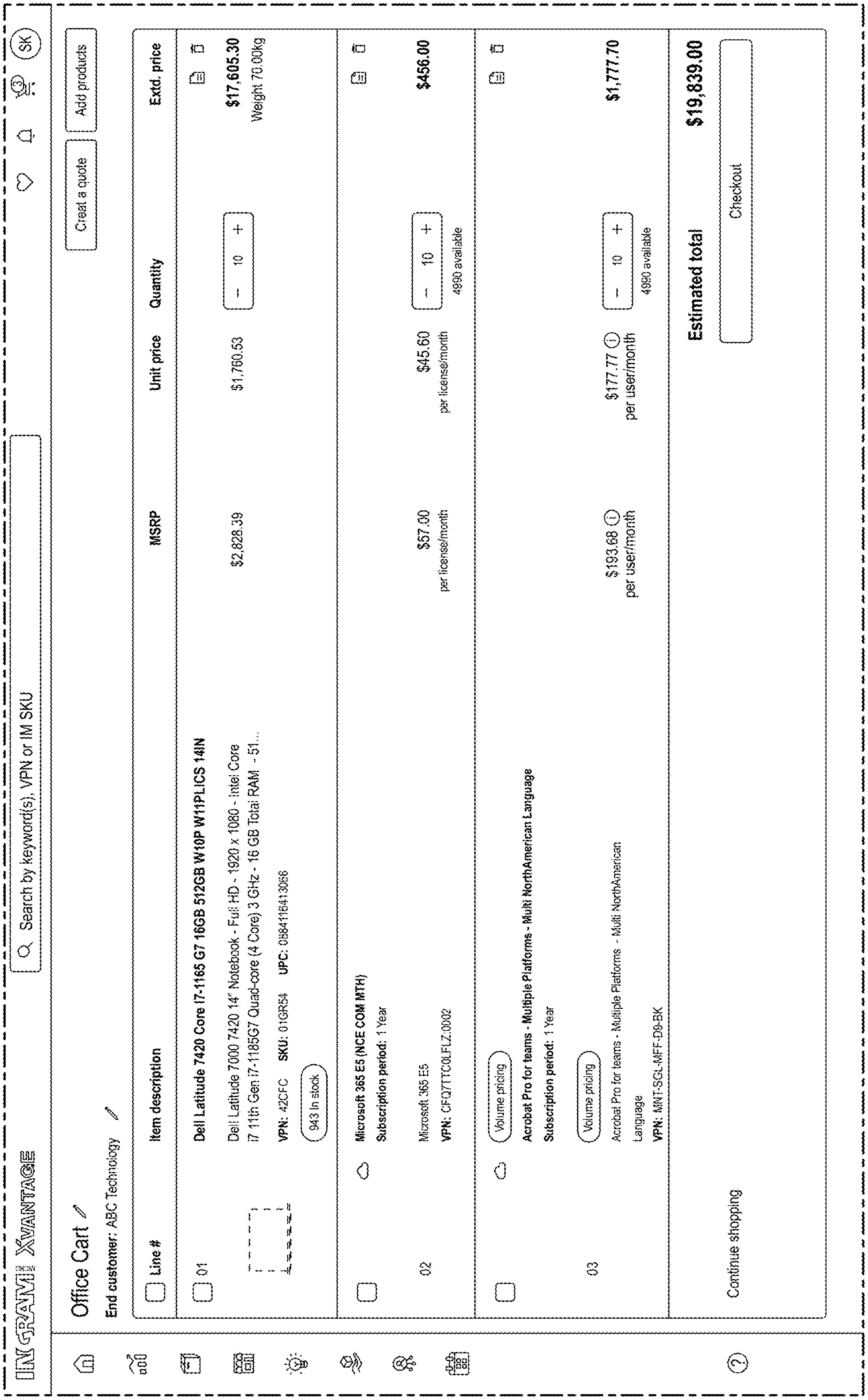
Figure 12O:
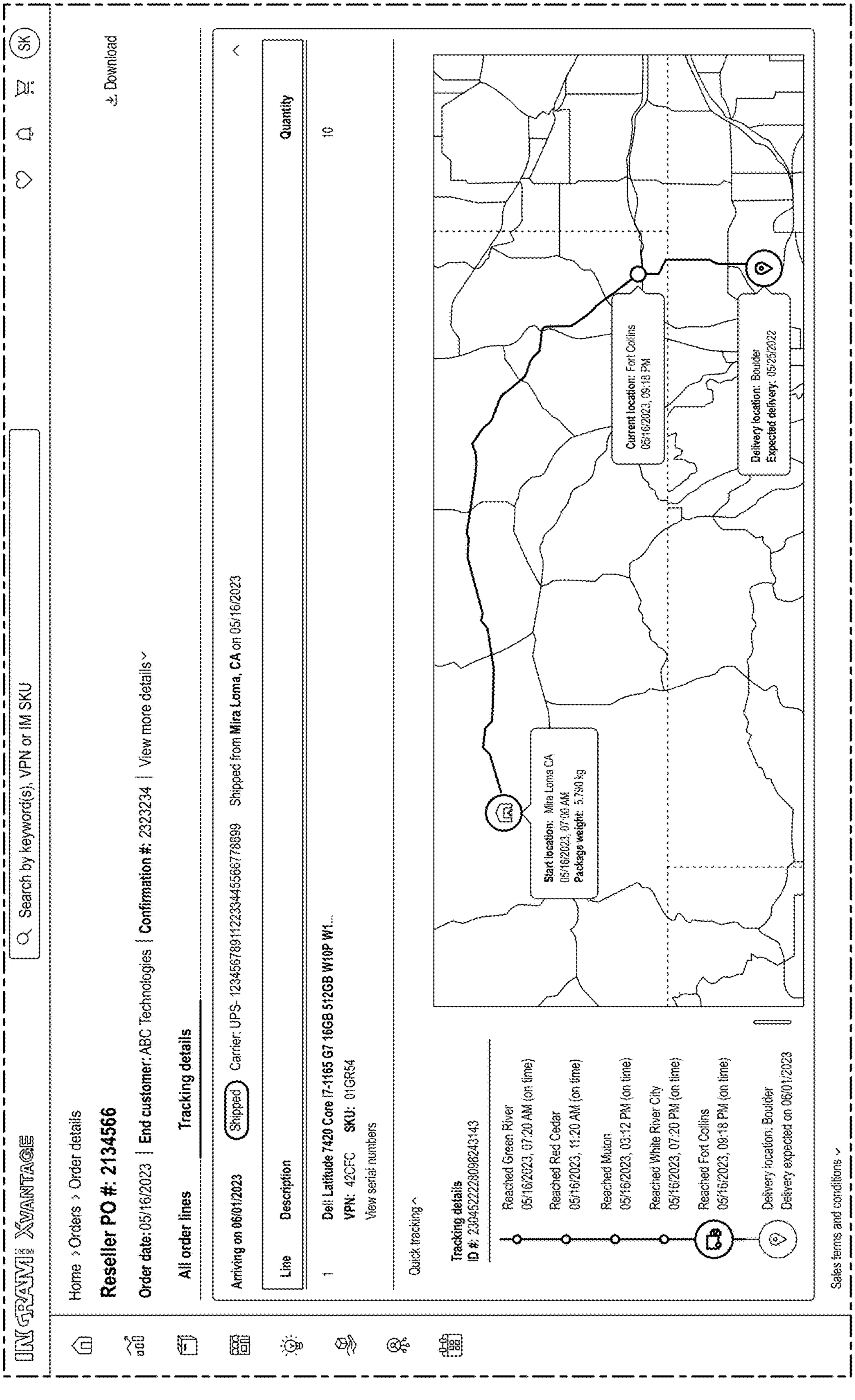
Figure 12Q:
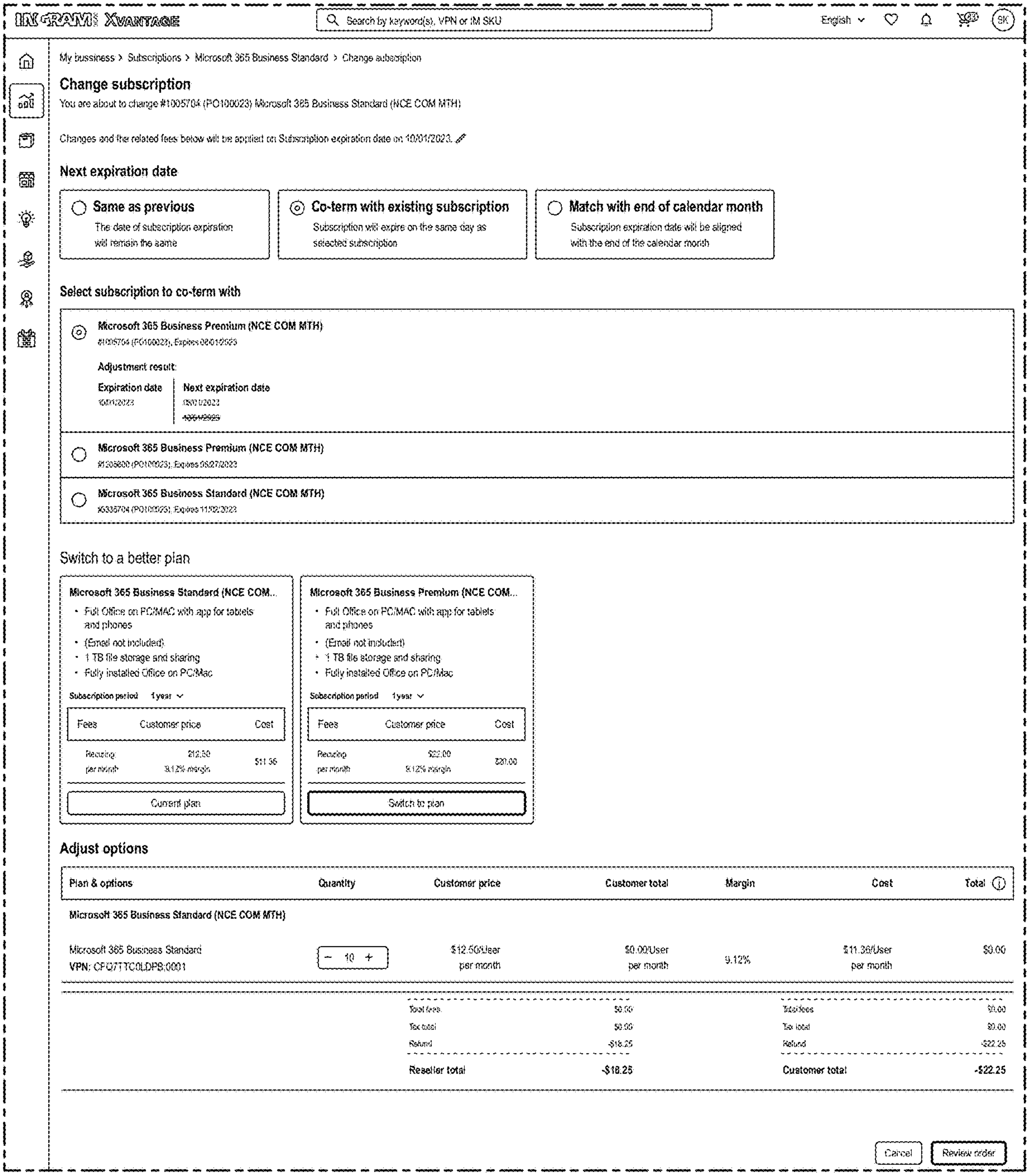

FIGS. 12A to 12Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 12A depicts a Vendor Onboarding Initiation screen that represents the initial step of the vendor onboarding process. It provides a form or interface where vendors can express their interest in joining the distribution ecosystem. Vendors can enter their basic information, such as company details, contact information, and product catalogs.

FIG. 12B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

FIG. 12C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 12D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

FIG. 12E depicts a Vendor Onboarding Completion Screen that confirms the successful completion of the vendor onboarding process. It may display a congratulatory message or summary of the completed tasks, indicating that the vendor is now officially onboarded into the distribution ecosystem.

FIG. 12F depicts a Partner Dashboard that offers partners or users a centralized view of relevant information and metrics related to their partnership with the distribution ecosystem. It provides an overview of performance indicators, key data points, and actionable insights to facilitate effective collaboration and decision-making.

FIG. 12G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 12H depicts a Customer Subscription Cart that allows customers to manage their subscription-based purchases. It displays the selected subscription plans, pricing, and duration. Customers can review and modify their subscription details before finalizing their choices.

FIG. 12I depicts a Customer Order Summary that provides a summary of the customer's order, including details such as the products or subscriptions purchased, quantities, pricing, and any applied discounts or promotions. It allows customers to review their order before confirming the purchase.

FIG. 12J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

FIGS. 12K and 12L depicts Dashboard Order Summary to display summarized information about orders placed within the distribution ecosystem. They present key order details, such as order number, customer name, product or subscription information, quantity, and order status. The dashboard provides an overview of order activity, enabling users to track and manage orders efficiently.

FIG. 12M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 12N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

FIG. 12O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 12P depicts a Customer Subscription History, that presents a historical record of the customer's subscription activities. It displays a list of previous subscriptions, including the subscription plan, duration, and status. Customers can review their subscription history, track past payments, and refer to previous subscription details.

FIG. 12Q depicts a Customer Subscription Modifications dialog, that allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 12A to 12Q collectively represent the diverse functionalities and features offered by the SPoG UI, providing users with a comprehensive and user-friendly interface for vendor onboarding, partnership management, customer interaction, order management, subscription management, and tracking within the distribution ecosystem.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computerized method for executing a personalized bundling process, comprising:

receiving user inputs specifying preferences for product bundling;

retrieving, from a Real-Time Data Mesh (RTDM), real-time data relevant to a user's preferences;

retrieving and processing data from one or more vendor systems via the RTDM, the RTDM comprising a distributed data architecture including a plurality of Purposive Datastores (PDSes) deployed within a cloud-native data mesh, each PDS configured for optimized retrieval based on at least one of data classification, access frequency, or computational workload;

dynamically harmonizing, by the RTDM, the retrieved data into a federated data layer comprising the plurality of PDSes, the federated data layer enabling parallelized query execution over the distributed data architecture;

analyzing, by an Advanced Analytics and Machine Learning (AAML) Module, one or more vendor-specific bundle recommendation information comprising one or more user inputs, a vendor-specific data, and a historical user interaction data;

generating the one or more vendor-specific bundle recommendations through a Personalized Bundling Module by applying a decision tree algorithm to select one or more optimal product combinations based on structured data attributes retrieved from the RTDM, the structured data attributes including at least one of the vendor-specific data, and the historical user interaction data, wherein the vendor-specific data comprises product availability information and compatibility constraint information, to generate personalized bundle recommendations based on market data and the analyzed one or more user input;

displaying the personalized bundle recommendations to the user via a Single Pane of Glass User Interface (SPoG UI);

receiving input from the user to perform completion of a personalized bundle;

transferring a personalized bundle order to at least one vendor system of the one or more vendor systems based on the completed personalized bundle;

executing the personalized bundle order by integrating data from the SPoG UI, RTDM, and the at least one vendor system, wherein executing the personalized bundle order comprises querying, by a configure-to-order engine in communication with the RTDM and SPoG UI, the federated data layer of the RTDM to retrieve harmonized bundle configuration data from the PDSes, and generating a hierarchical bundle composition using a recursive Depth-First Search (DFS) traversal based on the harmonized data and user-selected configuration parameters;

storing computed decision tree adjustments based on the decision tree algorithm in the RTDM to refine future bundle recommendations based on iterative machine learning processes, wherein the method is executed by a computer system with a unified platform that integrates data from multiple sources for real-time personalization.

2. The method of claim 1, further comprising validating the personalized bundle using rules and algorithms by the AAML Module to ensure relevance of the personalized bundling recommendations.

3. The method of claim 1, wherein the AAML Module utilizes dynamic machine learning algorithms to adapt the personalized bundling recommendations based on changing user preferences and market conditions.

4. The method of claim 1, wherein the RTDM is continuously updated with real-time inventory, user behavior data, and market trends.

5. The method of claim 1, further comprising generating one or more real-time reports related to the personalized bundling process, wherein the one or more real-time reports comprise user engagement metrics and/or personalized bundle success rates.

6. The method of claim 1, wherein the vendor system for fulfilling the personalized bundle order is selected based on criteria including product availability and/or delivery capabilities.

7. The method of claim 1, further comprising sending a notification to the user based on a successful completion of the personalized bundle order.

* * * * *